US007281527B1

(12) United States Patent
Bryant

(10) Patent No.: US 7,281,527 B1
(45) Date of Patent: Oct. 16, 2007

(54) INTERNAL COMBUSTION ENGINE AND WORKING CYCLE
(76) Inventor: Clyde C. Bryant, 410 Trammell Dr., Alpharetta, GA (US) 30201
( * ) Notice: Subject to any disclaimer, the term of this patent is extended or adjusted under 35 U.S.C. 154(b) by 622 days.
(21) Appl. No.: 09/632,739
(22) Filed: Aug. 4, 2000

Related U.S. Application Data

(63) Continuation of application No. 08/863,103, filed on May 23, 1997, now Pat. No. 6,279,550, and a continuation-in-part of application No. 08/841,488, filed on Apr. 23, 1997, now abandoned
(60) Provisional application No. 60/040,630, filed on Mar. 7, 1997, provisional application No. 60/029,260, filed on Oct. 25, 1996, provisional application No. 60/023,460, filed on Aug. 6, 1996, and provisional application No. 60/022,102, filed on Jul. 17, 1996.

(51) Int. Cl.
F02B 33/00 (2006.01)
(52) U.S. Cl. .................. 123/559.1; 60/609; 123/316; 123/432; 123/562
(58) Field of Classification Search ............. 123/559.1, 123/563, 564, 316, 432, 433, 542; 60/609
See application file for complete search history.

(56) References Cited

U.S. PATENT DOCUMENTS 883,240 A 3/1908 Sabathe (Continued)

FOREIGN PATENT DOCUMENTS

AT 003 134 10/1999

(Continued)

OTHER PUBLICATIONS

Communication/European Search Report dated Apr. 21, 2005 from EP Patent Application No. 04029382.1 of Clyde C. Bryant.

(Continued)

Primary Examiner—Michael Koczo, Jr.
(74) Attorney, Agent, or Firm—Womble Carlyle Sandridge & Rice, PLLC

(57) ABSTRACT

The invention is concerned with a method of deriving mechanical work from a combustion gas in internal combustion engines and reciprocating internal combustion engines for carrying out the method. The invention includes methods and apparatuses for managing combustion charge densities, temperatures, pressures and turbulence in order to produce a true mastery within the power cylinder in order to increase fuel economy, power, and torque while minimizing polluting emissions. In its preferred embodiments, the method includes the steps of (i) producing an air charge, (ii) controlling the temperature, density and pressure of the air charge, (iii) transferring the air charge to a power cylinder of the engine such that an air charge having a weight and density selected from a range of weight and density levels ranging from below atmospheric weight and density to heavier-than-atmospheric weight and density is introduced into the power cylinder, and (iv) then compressing the air charge at a lower-than-normal compression ratio, (v) causing a pre-determined quantity of charge-air and fuel to produce a combustible mixture, (vi) causing the mixture to be ignited within the power cylinder, and (vii) allowing the combustion gas to expand against a piston operable in the power cylinders with the expansion ratio of the power cylinders being substantially greater than the compression ratio of the power cylinders of the engine. In addition to other advantages, the invented method is capable of producing mean effective cylinder pressures ranging from lower-than-normal to higher-than-normal. In the preferred embodiments, the mean effective cylinder pressure is selectively variable (and selectively varied) throughout the mentioned range during the operation of the engine. In an alternate embodiment related to constant speed-constant load operation, the mean effective cylinder pressure is selected from the range and the engine is configured, in accordance with the present invention, such that the mean effective cylinder pressure range is limited, being varied only in the amount required for producing the power, torque and speed of the duty cycle for which the engine is designed.

39 Claims, 34 Drawing Sheets

U.S. PATENT DOCUMENTS

| | | | |
|---|---|---|---|
| 982,251 A | 1/1911 | Coffee | |
| 1,033,939 A | 7/1912 | Welch Robb | |
| 1,316,977 A | 9/1919 | Ricardo | |
| 1,562,692 A * | 11/1925 | De Rochefort-Lucay | ... 123/432 |
| 1,610,888 A | 12/1926 | Sauer | |
| 1,629,327 A | 5/1927 | Waldo | |
| 1,781,147 A | 11/1930 | Zaikowsky | |
| 1,825,817 A | 10/1931 | Patterson | ... 123/559.1 |
| 1,963,780 A | 6/1934 | Du Bois | ... 60/605.1 |
| 2,126,616 A | 8/1938 | Cayabyab | |
| 2,170,974 A | 8/1939 | Parkins | |
| 2,202,227 A | 5/1940 | Noland | |
| 2,292,233 A * | 8/1942 | Lysholm | ... 123/316 |
| 2,344,993 A | 3/1944 | Lysholm | |
| 2,391,176 A * | 12/1945 | Mallory | ... 123/432 |
| 2,400,247 A | 5/1946 | Miller et al. | |
| 2,453,377 A * | 11/1948 | Lozivit | ... 123/432 |
| 2,484,009 A | 10/1949 | Barber | |
| 2,484,109 A | 10/1949 | Meinecke | |
| 2,522,456 A * | 9/1950 | Mallory | ... 123/432 |
| 2,594,845 A | 4/1952 | Baumann | |
| 2,614,547 A | 10/1952 | Meinecke | |
| 2,633,698 A | 4/1953 | Nattel | |
| 2,644,436 A | 7/1953 | Berlyn | |
| 2,670,595 A | 3/1954 | Miller | |
| 2,739,440 A | 3/1956 | Seifert et al. | |
| 2,768,615 A | 10/1956 | Taylor et al. | |
| 6,768,615 B2 | 10/1956 | Fayette et al. | |
| 2,773,490 A | 12/1956 | Miller | ... 123/316 |
| 2,780,053 A | 2/1957 | Cowland | |
| 2,780,912 A | 2/1957 | Miller | |
| 2,817,322 A | 12/1957 | Miller | |
| 2,832,324 A | 4/1958 | Barber | |
| 2,910,826 A | 11/1959 | Mansfield | |
| 2,991,616 A | 7/1961 | Miller | |
| 3,015,934 A | 1/1962 | Miller | ... 123/316 |
| 3,029,594 A | 4/1962 | Miller | |
| 3,113,561 A | 12/1963 | Heintz | |
| 3,144,749 A | 8/1964 | Miller | |
| 3,180,327 A | 4/1965 | Neir | |
| 3,182,645 A | 5/1965 | O.E Wilson | |
| 3,186,388 A | 6/1965 | Bricout | ... 60/605.1 |
| 3,232,042 A | 2/1966 | Sarra | |
| 3,250,068 A | 5/1966 | Vulliamy | |
| 3,257,797 A | 6/1966 | Lieberherr | |
| 3,266,234 A | 8/1966 | Cook | ... 60/605.1 |
| 3,336,911 A | 8/1967 | Steiger | |
| 3,355,877 A | 12/1967 | Chafflotte | |
| 3,405,692 A | 10/1968 | Hanns | |
| 3,413,965 A | 12/1968 | Gavasso | |
| 3,416,502 A | 12/1968 | Weiss | |
| 3,591,958 A | 7/1971 | Nebgen | |
| 3,595,013 A | 7/1971 | Brille | |
| 3,665,905 A | 5/1972 | Brille et al. | |
| 3,735,740 A | 5/1973 | Hunt | |
| 3,774,399 A | 11/1973 | Nohira et al. | |
| 3,795,231 A | 3/1974 | Brille | |
| 3,919,986 A | 11/1975 | Goto | |
| 3,921,403 A | 11/1975 | McInerney et al. | |
| 3,938,483 A | 2/1976 | Firey | |
| 3,963,006 A | 6/1976 | Firey | |
| 3,964,451 A * | 6/1976 | Goto | ... 123/432 |
| 3,977,195 A | 8/1976 | Treuil | |
| 3,986,351 A | 10/1976 | Woods et al. | |
| 3,995,606 A | 12/1976 | Firey | |
| 4,003,347 A | 1/1977 | Sasaki | |
| 4,009,574 A | 3/1977 | Melchior | |
| 4,009,694 A | 3/1977 | Firey | |
| 4,009,695 A | 3/1977 | Ule | |
| 4,020,809 A | 5/1977 | Kern et al. | |
| 4,022,167 A | 5/1977 | Kristiansen | |
| 4,033,304 A | 7/1977 | Luria | |
| 4,050,435 A | 9/1977 | Fuller, Jr. et al. | |
| 4,058,096 A * | 11/1977 | Brown | ... 123/542 |
| 4,075,986 A | 2/1978 | Keck | |
| 4,075,990 A | 2/1978 | Ribeton | |
| 4,084,557 A | 4/1978 | Luria | |
| 4,084,568 A | 4/1978 | Sato et al. | |
| 4,132,213 A | 1/1979 | Weaver | |
| 4,138,973 A | 2/1979 | Luria | |
| 4,149,493 A * | 4/1979 | Franke | ... 123/432 |
| 4,153,016 A | 5/1979 | Hausknecht | |
| 4,157,079 A | 6/1979 | Kristiansen | |
| 4,161,166 A | 7/1979 | Roznovsky | |
| 4,169,451 A | 10/1979 | Niggemeyer | |
| 4,174,683 A | 11/1979 | Vivian | |
| 4,180,035 A | 12/1979 | Saiki et al. | |
| 4,192,265 A | 3/1980 | Amano et al. | |
| 4,196,593 A | 4/1980 | Froeliger | |
| 4,206,728 A | 6/1980 | Trenne | |
| 4,215,659 A | 8/1980 | Lowther | |
| 4,231,225 A | 11/1980 | Aya | |
| 4,232,641 A | 11/1980 | Curtil | |
| 4,235,077 A | 11/1980 | Bryant | |
| RE30,565 E | 4/1981 | Kristiansen | |
| 4,261,307 A | 4/1981 | Oldberg | |
| 4,276,865 A | 7/1981 | Hamai | |
| 4,280,451 A | 7/1981 | Moore | |
| 4,283,933 A | 8/1981 | Wiener | |
| 4,299,090 A | 11/1981 | Deutschmann | |
| 4,305,352 A | 12/1981 | Oshima et al. | |
| 4,315,488 A | 2/1982 | Tadokoro et al. | |
| 4,327,676 A | 5/1982 | McIntire et al. | |
| 4,344,289 A | 8/1982 | Curiel et al. | |
| 4,350,013 A | 9/1982 | Yoshiba | |
| 4,364,341 A | 12/1982 | Holtmann | |
| 4,387,672 A | 6/1983 | Crocker | |
| 4,400,945 A | 8/1983 | Deutschmann et al. | |
| 4,421,077 A | 12/1983 | Ruggeri | |
| 4,423,709 A | 1/1984 | Arrieta | |
| 4,424,790 A | 1/1984 | Curtil | |
| 4,426,848 A | 1/1984 | Stachowicz | |
| 4,426,985 A | 1/1984 | Kanesaka | |
| 4,438,737 A | 3/1984 | Burandt | |
| 4,446,821 A | 5/1984 | Cataldo | |
| 4,474,008 A | 10/1984 | Sakurai et al. | |
| 4,474,161 A | 10/1984 | Knapp et al. | |
| 4,490,971 A | 1/1985 | Hedelin | |
| 4,494,506 A | 1/1985 | Hayama et al. | |
| 4,520,774 A | 6/1985 | Sitter | |
| 4,527,534 A * | 7/1985 | Sakurai et al. | ... 123/432 |
| 4,530,318 A | 7/1985 | Semple | |
| 4,537,173 A | 8/1985 | Norris | |
| 4,539,946 A | 9/1985 | Hedelin | |
| 4,539,948 A | 9/1985 | Toepel | |
| 4,539,951 A | 9/1985 | Hara et al. | |
| 4,550,568 A | 11/1985 | Deutschmann et al. | |
| 4,552,112 A | 11/1985 | Nagao et al. | |
| 4,553,385 A | 11/1985 | Lamont | |
| 4,554,890 A * | 11/1985 | Okimoto et al. | ... 123/432 |
| 4,561,253 A | 12/1985 | Curtil | ... 60/606 |
| 4,563,132 A | 1/1986 | Grimmer | |
| 4,565,167 A | 1/1986 | Bryant | |
| 4,566,422 A * | 1/1986 | Tadokoro et al. | ... 123/432 |
| 4,570,442 A | 2/1986 | Deutschmann et al. | |
| 4,572,114 A | 2/1986 | Sickler | |
| 4,576,127 A | 3/1986 | Doi et al. | |
| 4,582,029 A | 4/1986 | Masuda et al. | |
| 4,584,974 A | 4/1986 | Aoyama et al. | |
| 4,589,380 A | 5/1986 | Coad | |
| 4,592,310 A | 6/1986 | Hitomi et al. | |

| | | | | | |
|---|---|---|---|---|---|
| 4,592,319 A | 6/1986 | Meistrick | 5,140,955 A | 8/1992 | Sono et al. |
| 4,592,329 A | 6/1986 | Yunick | 5,142,866 A | 9/1992 | Yanagihara et al. |
| 4,598,611 A | 7/1986 | Frank | 5,161,497 A | 11/1992 | Simko et al. |
| 4,608,951 A | 9/1986 | White | 5,186,139 A | 2/1993 | Matsura |
| 4,622,167 A | 11/1986 | Heath et al. | 5,189,998 A | 3/1993 | Hara |
| 4,633,403 A | 12/1986 | Asmus | 5,191,867 A | 3/1993 | Glassey |
| 4,633,844 A * | 1/1987 | Okimoto ............... 123/432 | 5,201,907 A | 4/1993 | Hitomi et al. |
| 4,643,049 A | 2/1987 | Nishikawa et al. | 5,203,311 A | 4/1993 | Hitomi et al. |
| 4,651,684 A | 3/1987 | Masuda et al. | 5,205,251 A | 4/1993 | Conklin |
| 4,667,636 A | 5/1987 | Oishi et al. | 5,205,265 A | 4/1993 | Kashiyama et al. |
| 4,700,684 A | 10/1987 | Pischinger et al. | 5,215,061 A | 6/1993 | Ogawa et al. |
| 4,702,218 A | 10/1987 | Yoshioka et al. | 5,216,987 A | 6/1993 | Clarke |
| 4,714,063 A | 12/1987 | Oda et al. | 5,230,320 A | 7/1993 | Hitomi et al. |
| 4,716,863 A | 1/1988 | Pruzan | 5,233,948 A | 8/1993 | Boggs et al. |
| 4,722,315 A | 2/1988 | Pickel | 5,235,940 A | 8/1993 | Nakatani |
| 4,730,457 A | 3/1988 | Yamada et al. ............. 60/609 | 5,239,960 A | 8/1993 | Sasaki et al. |
| 4,738,110 A | 4/1988 | Tateno | 5,251,595 A | 10/1993 | Wei-Min |
| 4,753,198 A | 6/1988 | Heath | 5,253,622 A | 10/1993 | Bornstein et al. |
| 4,756,285 A | 7/1988 | Pischinger | 5,255,637 A | 10/1993 | Schechter |
| 4,759,188 A | 7/1988 | Schatz | 5,255,641 A | 10/1993 | Schechter |
| 4,770,060 A | 9/1988 | Elrod et al. | 5,255,654 A | 10/1993 | Karlsson |
| 4,771,742 A | 9/1988 | Nelson et al. | 5,271,359 A | 12/1993 | Teramoto et al. |
| 4,777,916 A | 10/1988 | Holmer | 5,279,273 A | 1/1994 | Nakata et al. |
| 4,798,184 A | 1/1989 | Palko | 5,293,741 A | 3/1994 | Kashiyama et al. |
| 4,805,571 A | 2/1989 | Humphrey | 5,309,756 A | 5/1994 | Osawa et al. |
| 4,815,423 A | 3/1989 | Holmer | 5,327,856 A | 7/1994 | Schroeder et al. |
| 4,833,971 A | 5/1989 | Kubik | 5,327,858 A | 7/1994 | Hausknecht |
| 4,836,161 A | 6/1989 | Abthoff et al. | 5,333,456 A | 8/1994 | Bollinger |
| 4,841,936 A | 6/1989 | Takahashi | 5,335,633 A | 8/1994 | Thien |
| 4,852,353 A | 8/1989 | Holmer | 5,341,771 A | 8/1994 | Riley |
| 4,860,704 A | 8/1989 | Slaughter | 5,357,936 A | 10/1994 | Hitomi et al. |
| 4,862,841 A | 9/1989 | Stevenson | 5,363,816 A | 11/1994 | Yorita et al. |
| 4,864,984 A | 9/1989 | Blish | 5,365,895 A | 11/1994 | Riley |
| 4,876,988 A | 10/1989 | Paul et al. | 5,365,896 A | 11/1994 | Hara et al. |
| 4,878,464 A | 11/1989 | Richeson, Jr. et al. | 5,367,990 A | 11/1994 | Schechter |
| 4,885,911 A | 12/1989 | Woollenweber et al. | 5,377,631 A | 1/1995 | Schechter |
| 4,903,488 A | 2/1990 | Shibata ............. 60/609 | 5,379,743 A | 1/1995 | Stokes et al. |
| 4,916,903 A | 4/1990 | Holmer | 5,389,051 A | 2/1995 | Hirate et al. |
| 4,917,058 A | 4/1990 | Nelson et al. | 5,390,492 A | 2/1995 | Levendis |
| 4,928,648 A | 5/1990 | Schatz et al. | 5,392,740 A | 2/1995 | Teramoto et al. |
| 4,930,315 A | 6/1990 | Kanesaka | 5,396,874 A | 3/1995 | Hitomi et al. |
| 4,934,344 A | 6/1990 | Perr | 5,398,502 A | 3/1995 | Watanabe |
| 4,936,263 A | 6/1990 | Tamba et al. | 5,404,844 A | 4/1995 | Schechter |
| 4,945,870 A | 8/1990 | Richeson | 5,408,979 A | 4/1995 | Backlund et al. ............. 123/562 |
| 4,957,069 A | 9/1990 | Mederer | 5,417,186 A | 5/1995 | Elrod et al. |
| 4,959,961 A | 10/1990 | Hiereth ............. 60/612 | 5,417,189 A | 5/1995 | Regueiro |
| 4,961,406 A | 10/1990 | Burandt | 5,419,301 A | 5/1995 | Schechter |
| 4,964,375 A | 10/1990 | Takeyama et al. | 5,421,296 A | 6/1995 | Hitomi et al. |
| 4,982,567 A | 1/1991 | Hashimoto et al. | 5,421,308 A | 6/1995 | Hitomi et al. |
| 4,989,606 A | 2/1991 | Gehrich et al. | 5,425,239 A | 6/1995 | Gobert |
| 5,000,145 A | 3/1991 | Quenneville | 5,426,936 A | 6/1995 | Levendis et al. |
| 5,002,022 A | 3/1991 | Perr | 5,427,078 A | 6/1995 | Hitomi et al. |
| 5,005,652 A | 4/1991 | Johnson | 5,429,100 A | 7/1995 | Goto et al. |
| 5,012,778 A | 5/1991 | Pitzi | 5,433,180 A | 7/1995 | Hitomi et al. |
| 5,020,327 A | 6/1991 | Tashima et al. | 5,440,880 A | 8/1995 | Ceynow et al. |
| 5,033,268 A | 7/1991 | Hitomi et al. | 5,443,050 A | 8/1995 | Hitomi et al. |
| 5,036,663 A | 8/1991 | Akagi et al. | 5,445,116 A | 8/1995 | Hara |
| 5,050,378 A | 9/1991 | Clemmens | 5,445,128 A | 8/1995 | Letang et al. |
| 5,054,439 A | 10/1991 | Akagi et al. | 5,452,694 A | 9/1995 | Hara |
| 5,076,248 A | 12/1991 | Schatz | 5,456,222 A | 10/1995 | Hu et al. |
| 5,083,543 A | 1/1992 | Harada et al. | 5,456,224 A | 10/1995 | Riley |
| 5,090,202 A | 2/1992 | Hitomi et al. | 5,456,225 A | 10/1995 | Oikawa et al. |
| 5,103,645 A | 4/1992 | Haring | 5,465,702 A | 11/1995 | Ferrenberg |
| 5,107,802 A | 4/1992 | Yagi et al. | 5,469,818 A | 11/1995 | Yoshioka et al. |
| 5,117,790 A | 5/1992 | Clarke et al. | 5,479,890 A | 1/1996 | Hu et al. |
| 5,119,795 A * | 6/1992 | Goto et al. ............. 123/563 | 5,488,970 A | 2/1996 | Cippitani |
| 5,121,733 A | 6/1992 | Goto et al. | 5,492,103 A | 2/1996 | Goto ............. 123/564 |
| 5,131,229 A | 7/1992 | Kriegler et al. | 5,493,798 A | 2/1996 | Rocke et al. |
| 5,131,354 A | 7/1992 | Richeson | 5,494,008 A | 2/1996 | Ohkawa et al. |
| 5,138,839 A | 8/1992 | Hitomi et al. | 5,494,009 A | 2/1996 | Yamada et al. |
| 5,140,953 A | 8/1992 | Fogelberg | 5,495,830 A | 3/1996 | Wu |

| | | | | | | |
|---|---|---|---|---|---|---|
| 5,497,737 A | 3/1996 | Nakamura | | 5,819,702 A | 10/1998 | Mendler |
| 5,509,394 A | 4/1996 | Hitomi et al. | | 4,839,453 A | 11/1998 | Hu |
| 5,515,818 A | 5/1996 | Born | | 5,829,397 A | 11/1998 | Vorih et al. |
| 5,518,818 A | 5/1996 | Kidai et al. | | 5,839,400 A | 11/1998 | Vattaneo et al. |
| 5,520,161 A | 5/1996 | Klopp | | 5,839,453 A | 11/1998 | Hu |
| 5,531,193 A | 7/1996 | Nakamura | | 5,845,613 A | 12/1998 | Yoshikawa |
| 5,535,704 A | 7/1996 | Paul | | 5,848,529 A | 12/1998 | Katoh et al. |
| 5,535,716 A | 7/1996 | Sato et al. | | 5,854,988 A | 12/1998 | Davidson et al. |
| 5,546,914 A | 8/1996 | Scheinert | | 5,857,437 A | 1/1999 | Yoshioka |
| 5,549,080 A | 8/1996 | Uchikawa | | 5,862,790 A | 1/1999 | Dai et al. |
| 5,549,095 A | 8/1996 | Goto et al. | | 5,875,743 A | 3/1999 | Dickey |
| 5,553,573 A | 9/1996 | Hara et al. | | 5,924,395 A | 7/1999 | Moriya et al. |
| 5,557,983 A | 9/1996 | Hara et al. | | 5,927,075 A | 7/1999 | Khair |
| 5,558,060 A | 9/1996 | Horie et al. | | 5,937,807 A | 8/1999 | Peters et al. |
| 5,560,207 A | 10/1996 | Ramsden et al. | | 5,949,146 A | 9/1999 | VandenBerghe |
| 5,564,275 A | 10/1996 | Codan et al. | | 5,950,582 A | 9/1999 | Stein |
| 5,564,386 A | 10/1996 | Korte et al. | | 5,957,096 A | 9/1999 | Clarke et al. |
| 5,586,526 A | 12/1996 | Lindquist | | 5,960,755 A | 10/1999 | Diggs et al. |
| 5,586,527 A | 12/1996 | Kreuter | | 5,967,115 A | 10/1999 | Konopka et al. |
| 5,586,531 A | 12/1996 | Vittorio | | 5,970,929 A | 10/1999 | Tacquet |
| 5,588,411 A | 12/1996 | Kreuter et al. | | 5,992,361 A | 11/1999 | Murata et al. |
| 5,590,632 A | 1/1997 | Kato et al. | | 5,992,390 A | 11/1999 | Moyer |
| 5,606,942 A | 3/1997 | Tsuzuku et al. | | 5,996,560 A | 12/1999 | Schechter |
| 5,607,010 A | 3/1997 | Schonfeld et al. | | 6,000,374 A | 12/1999 | Cosma et al. |
| 5,611,202 A | 3/1997 | Sumser et al. | | 6,003,316 A | 12/1999 | Baert et al. |
| 5,611,204 A | 3/1997 | Radovanovic et al. | | 6,006,706 A | 12/1999 | Kanzaki |
| 5,611,303 A | 3/1997 | Izuo | | 6,012,424 A | 1/2000 | Meistrick |
| 5,615,554 A | 4/1997 | Gobert | | 6,020,651 A | 2/2000 | Nakamura et al. |
| 5,615,646 A | 4/1997 | Feucht | | 6,026,786 A | 2/2000 | Groff et al. ................. 123/501 |
| 5,617,726 A | 4/1997 | Sheridan et al. | | 6,035,639 A | 3/2000 | Kolmanovsky et al. |
| 5,619,965 A | 4/1997 | Cosma et al. | | 6,035,640 A | 3/2000 | Kolmanovsky et al. |
| 5,622,053 A | 4/1997 | Freen | | 6,041,602 A | 3/2000 | Dickey |
| 5,622,144 A | 4/1997 | Nakamura et al. | | 6,058,348 A | 5/2000 | Ohyama et al. |
| 5,623,896 A | 4/1997 | Kato et al. | | 6,067,800 A | 5/2000 | Kolmanovsky et al. |
| 5,626,109 A | 5/1997 | Yasumura et al. | | 6,067,946 A | 5/2000 | Freudenberg et al. |
| 5,632,255 A | 5/1997 | Ferrenberg | | 6,076,353 A | 6/2000 | Meistrick et al. |
| 5,645,020 A | 7/1997 | Yamada | | 6,079,378 A | 6/2000 | Taue et al. |
| 5,645,030 A | 7/1997 | Letsche | | 6,082,328 A | 7/2000 | Meistrick et al. ........... 123/321 |
| 5,649,516 A * | 7/1997 | Laveran ..................... 123/563 | | 6,085,705 A | 7/2000 | Vorih |
| 5,657,630 A | 8/1997 | Kjemtrup et al. | | 6,095,127 A | 8/2000 | Kolmanovsky et al. |
| 5,660,155 A | 8/1997 | Taue et al. | | 6,101,998 A | 8/2000 | Tamura et al. |
| 5,661,835 A | 8/1997 | Kato et al. | | 6,112,523 A | 9/2000 | Kamo et al. |
| 5,664,528 A | 9/1997 | Kato et al. | | 6,128,902 A | 10/2000 | Kolmanovsky et al. |
| 5,664,529 A | 9/1997 | Kato et al. | | 6,135,073 A | 10/2000 | Feucht et al. |
| 5,671,600 A | 9/1997 | Pischinger et al. | | 6,148,778 A | 11/2000 | Sturman |
| 5,678,515 A | 10/1997 | Kato et al. | | 6,170,441 B1 | 1/2001 | Haldeman et al. |
| 5,680,841 A | 10/1997 | Hu | | 6,178,749 B1 | 1/2001 | Kolmanovsky et al. |
| 5,682,854 A | 11/1997 | Ozawa ....................... 123/316 | | 6,189,504 B1 | 2/2001 | Israel et al. |
| 5,692,464 A | 12/1997 | Kimura | | 6,209,516 B1 | 4/2001 | Yamashita |
| 5,704,316 A | 1/1998 | Fujimoto et al. | | 6,223,846 B1 | 5/2001 | Schechter |
| 5,711,154 A | 1/1998 | Baechle et al. | | 6,234,123 B1 | 5/2001 | Iiyama et al. |
| 5,713,317 A | 2/1998 | Yoshioka | | 6,234,144 B1 | 5/2001 | Yamaguchi et al. |
| 5,713,330 A | 2/1998 | Hitomi et al. | | 6,237,551 B1 | 5/2001 | Macor et al. |
| 5,713,331 A | 2/1998 | Eisenbacher et al. | | 6,244,257 B1 | 6/2001 | Hu |
| 5,718,199 A | 2/1998 | Hu et al. | | 6,260,523 B1 | 7/2001 | Nakamura et al. |
| 5,724,927 A | 3/1998 | Suzuki | | 6,266,957 B1 | 7/2001 | Nozawa et al. |
| 5,724,939 A | 3/1998 | Faletti et al. | | 6,267,107 B1 | 7/2001 | Ward |
| 5,732,554 A | 3/1998 | Sasaki et al. | | 6,273,076 B1 | 8/2001 | Beck et al. |
| 5,732,678 A | 3/1998 | Lindquist et al. | | 6,276,316 B1 | 8/2001 | Arai et al. |
| 5,762,480 A | 6/1998 | Adahan | | 6,279,550 B1 | 8/2001 | Bryant |
| 5,771,868 A | 6/1998 | Khair | | 6,286,482 B1 | 9/2001 | Flynn et al. |
| 5,775,099 A | 7/1998 | Ito et al. | | 6,295,816 B1 | 10/2001 | Gallagher et al. |
| 5,775,283 A | 7/1998 | Sawai et al. | | 6,298,300 B1 | 10/2001 | Ohyama et al. |
| 5,778,674 A | 7/1998 | Kimura | | 6,301,887 B1 | 10/2001 | Gorel et al. |
| 5,787,859 A | 8/1998 | Meistrick et al. | | 6,301,889 B1 | 10/2001 | Gladden et al. |
| 5,791,146 A | 8/1998 | Dungner | | 6,302,076 B1 | 10/2001 | Brady |
| 5,794,445 A | 8/1998 | Dungner | | 6,311,493 B1 | 11/2001 | Kurihara et al. |
| 5,806,308 A | 9/1998 | Khair et al. | | 6,332,447 B1 | 12/2001 | Kimura et al. |
| 5,809,964 A | 9/1998 | Meistrick et al. | | 6,338,244 B1 | 1/2002 | Guenther et al. |
| 5,813,231 A | 9/1998 | Faletti et al. | | 6,338,245 B1 | 1/2002 | Shimoda et al. |
| 5,816,216 A | 10/1998 | Egashira et al. | | 6,343,473 B1 | 2/2002 | Kanesaka |

| | | | | | |
|---|---|---|---|---|---|
| 6,354,254 B1 | 3/2002 | Usko | DE | 34 18 361 | 10/1984 |
| 6,394,051 B1 | 5/2002 | Filipe et al. | DE | 33 47 567 | 7/1985 |
| 6,405,694 B2 | 6/2002 | Sato | DE | 35 26 532 | 2/1986 |
| 6,439,195 B1 | 8/2002 | Warner | DE | 37 16 947 C1 | 3/1988 |
| 6,460,337 B1 | 10/2002 | Olofsson | DE | 37 25 448 | 2/1989 |
| 6,467,452 B1 | 10/2002 | Duffy et al. | DE | 37 30 001 A1 | 3/1989 |
| 6,474,323 B1 | 11/2002 | Beck et al. | DE | 3737 822 | 5/1989 |
| 6,502,551 B2 | 1/2003 | Antonioli et al. | DE | 37 37 820 C2 | 8/1989 |
| 6,513,319 B2 | 2/2003 | Nozawa et al. | DE | 37 37 823 | 8/1989 |
| 6,516,264 B2 | 2/2003 | Ohyama et al. | DE | 39 08 475 | 9/1989 |
| 6,571,765 B2 | 6/2003 | Kuboshima et al. | DE | 38 24 133 | 1/1990 |
| 6,575,129 B2 | 6/2003 | Almkvist et al. | DE | 39 31 379 | 3/1990 |
| 6,591,795 B2 | 7/2003 | Janak | DE | 38 35 333 A1 | 4/1990 |
| 6,609,315 B1 | 8/2003 | Hendron et al. | DE | 40 04 806 | 8/1991 |
| 6,637,386 B2 | 10/2003 | Murata et al. | DE | 40 07 516 | 9/1991 |
| 6,640,754 B1 | 11/2003 | Iida | DE | 41 15 008 A1 | 11/1992 |
| 6,651,618 B1 | 11/2003 | Coleman et al. | DE | 42 16 759 | 2/1993 |
| 6,662,552 B1 | 12/2003 | Gunther et al. | DE | 692 06 718 | 3/1993 |
| 6,679,207 B1 | 1/2004 | Leman | DE | 42 12 205 | 10/1993 |
| 6,688,280 B2 | 2/2004 | Weber et al. | DE | 43 12 085 | 10/1993 |
| 6,722,349 B2 | 4/2004 | Leman et al. | DE | 43 32 604 | 3/1994 |
| 6,725,647 B2 | 4/2004 | Pfeifer et al. | DE | 44 16 670 | 2/1995 |
| 6,732,507 B1 | 5/2004 | Stanglmaier et al. | DE | 195 11 320 | 10/1995 |
| 6,732,685 B2 | 5/2004 | Leman | DE | 196 10 277 | 10/1995 |
| 6,739,125 B1 | 5/2004 | Mulligan | DE | 07-324610 | 12/1995 |
| 6,925,976 B2 | 8/2005 | Israel et al. | DE | 44 39 940 | 5/1996 |
| 6,928,807 B2 | 8/2005 | Jacob et al. | DE | 44 40 289 A1 | 5/1996 |
| 6,951,211 B2 | 10/2005 | Bryant | DE | 44 43 169 A1 | 6/1996 |
| 6,955,144 B2 | 10/2005 | Sakai et al. | DE | 195 14 500 A1 | 10/1996 |
| 7,004,122 B2 | 2/2006 | Cornell et al. | DE | 195 15 325 | 10/1996 |
| 7,007,650 B2 | 3/2006 | Harmon | DE | 195 17 590 | 11/1996 |
| 2001/0002379 A1 | 5/2001 | Schechter | DE | 196 16 555 | 11/1996 |
| 2001/0023671 A1 | 9/2001 | Vorih | DE | 196 48 337 A1 | 6/1998 |
| 2002/0011233 A1 | 1/2002 | Shiraishi et | DE | 199905636 | 3/2000 |
| 2002/0026913 A1 | 3/2002 | Ariga | DE | 100 09 180 | 9/2001 |
| 2002/0062799 A1 | 5/2002 | Murata et al. | DE | 101 29 801 | 4/2003 |
| 2002/0117126 A1 | 8/2002 | Kaneko | EP | 0 096 252 A2 | 11/1983 |
| 2002/0157623 A1 | 10/2002 | Turner et al. | EP | 0 275 244 | 1/1988 |
| 2003/0106542 A1 | 6/2003 | Aoyama et al. | EP | 0 291 792 A2 | 11/1988 |
| 2003/0145810 A1 | 8/2003 | Leman et al. | EP | 0 344 780 A2 | 12/1989 |
| 2003/0164163 A1 | 9/2003 | Lei et al. | EP | 0 440 314 A2 | 8/1991 |
| 2004/0020204 A1 | 2/2004 | Callas et al. | EP | 0 269 125 B1 | 8/1992 |
| 2004/0118118 A1 | 6/2004 | Weber et al. | EP | 0 560 476 | 9/1993 |
| 2004/0206331 A1 | 10/2004 | Leman | EP | 0 560 476 A1 | 9/1993 |
| 2004/0237507 A1 | 12/2004 | Duvinage et al. | EP | 0 568 214 | 11/1993 |
| 2005/0087159 A1 | 4/2005 | Harmon | EP | 0 596 860 A2 | 5/1994 |
| 2005/0098162 A1 | 5/2005 | Bryant | EP | 0 596 855 | 6/1994 |
| 2005/0183692 A1 | 8/2005 | Weber et al. | EP | 0 646 703 A2 | 4/1995 |
| | | | EP | 718481 A2 | 6/1996 |
| FOREIGN PATENT DOCUMENTS | | | EP | 0 718 481 A2 | 6/1996 |
| AT | 003 205 | 11/1999 | EP | 0 761 950 | 3/1997 |
| AU | B1-33 707/78 | 4/1982 | EP | 0 646 703 B1 | 12/1997 |
| AU | A-15966/83 | 6/1983 | EP | 0 857 866 A1 | 8/1998 |
| DE | 286050 | 7/1915 | EP | 0 690 214 B1 | 10/1999 |
| DE | 1 001 049 | 1/1957 | EP | 0 961 018 A1 | 12/1999 |
| DE | 1 576 255 | 4/1970 | EP | 1 022 446 | 7/2000 |
| DE | 2 125 368 | 12/1971 | EP | 1 116 870 A2 | 7/2001 |
| DE | 24 57 208 | 6/1976 | EP | 1 178 192 A2 | 2/2002 |
| DE | 28 09 473 | 9/1978 | EP | 1 234 960 A2 | 8/2002 |
| DE | 27 34 715 | 2/1979 | FR | 1 066 038 | 6/1954 |
| DE | 78 03 641 U1 | 8/1979 | FR | 2 221 021 | 10/1974 |
| DE | 28 14 343 | 10/1979 | FR | 2 242 884 | 3/1975 |
| DE | 29 24 926 | 1/1980 | FR | 2 269 282 | 11/1975 |
| DE | 29 26 327 A1 | 1/1981 | FR | 2 355 997 | 1/1978 |
| DE | 29 30 124 | 2/1981 | FR | 2 393 937 | 1/1979 |
| DE | 29230124 | 2/1981 | FR | 2 417 014 | 9/1979 |
| DE | 29 42 326 A1 | 4/1981 | FR | 2 476 741 | 8/1981 |
| DE | 30 06 619 A1 | 8/1981 | FR | 2 485 622 | 12/1981 |
| DE | 30 22 688 | 12/1981 | FR | 253108 | 6/1985 |
| DE | 34 37 330 | 4/1983 | FR | 2 583 108 A2 | 12/1985 |
| DE | 32 28 680 | 2/1984 | FR | 2 674 285 | 3/1991 |

| | | | | | | |
|---|---|---|---|---|---|---|
| FR | 2 703 107 | 9/1994 | | JP | 363057822 A | 3/1988 |
| FR | 2 757 211 | 6/1998 | | JP | 63-51121 | 4/1988 |
| FR | 2 780 093 A3 | 12/1999 | | JP | 63-124828 | 5/1988 |
| GB | 1 303 080 | 1/1973 | | JP | 63-176616 | 7/1988 |
| GB | 1 321 452 | 6/1973 | | JP | 363176616 A | 7/1988 |
| GB | 1 437 171 | 5/1976 | | JP | 63198728 | 8/1988 |
| GB | 1 467 969 | 3/1977 | | JP | 63-61717 B2 | 11/1988 |
| GB | 2018352 | 10/1979 | | JP | 63-168221 | 11/1988 |
| GB | 2 072 957 | 10/1981 | | JP | 63-268942 | 11/1988 |
| GB | 2 129 055 | 5/1984 | | JP | 363268926 A | 11/1988 |
| GB | 2 165 567 | 4/1986 | | JP | 363268927 A | 11/1988 |
| GB | 2 180 298 | 3/1987 | | JP | 363268942 A | 11/1988 |
| GB | 2 202 001 | 9/1988 | | JP | 64-315 | 1/1989 |
| GB | 2 253 881 | 9/1992 | | JP | 64-24118 | 1/1989 |
| GB | 2 301 389 | 4/1996 | | JP | 64-87828 | 3/1989 |
| GB | 2300226 A | 10/1996 | | JP | 64-87829 | 3/1989 |
| GB | 2 366 328 | 3/2002 | | JP | 401083820 A | 3/1989 |
| GB | 2 366 330 | 3/2002 | | JP | 0124414 | 9/1989 |
| GB | 2 366 331 | 3/2002 | | JP | 02-140521 | 5/1990 |
| GB | 2 367 147 | 3/2002 | | JP | 03-37318 | 3/1991 |
| GB | 2 367 148 | 3/2002 | | JP | 03-96624 | 4/1991 |
| GB | 2 368 614 | 5/2002 | | JP | 03-138419 | 6/1991 |
| GP | 1 331 348 | 4/1971 | | JP | 03-156123 | 7/1991 |
| JP | 51-13024 | 2/1976 | | JP | 04-31653 | 2/1992 |
| JP | 56-18030 | 2/1981 | | JP | 04031653 A | 2/1992 |
| JP | 56-101022 | 8/1981 | | JP | 04-103967 | 4/1992 |
| JP | 56-101031 | 8/1981 | | JP | 04-136467 | 5/1992 |
| JP | 355153820 A | 12/1982 | | JP | 04-287859 | 10/1992 |
| JP | 58-30416 | 2/1983 | | JP | 04-129812 | 11/1992 |
| JP | 58-51221 | 3/1983 | | JP | 05-1575 | 1/1993 |
| JP | 58-53634 | 3/1983 | | JP | 05-5430 | 1/1993 |
| JP | 58-53635 | 3/1983 | | JP | 05-71426 | 3/1993 |
| JP | 58-57019 | 4/1983 | | JP | 05-71428 | 3/1993 |
| JP | 58-59317 | 4/1983 | | JP | 05-86913 | 4/1993 |
| JP | 58-62314 | 4/1983 | | JP | 05-86989 | 4/1993 |
| JP | 58-65932 | 4/1983 | | JP | 05086989 A | 4/1993 |
| JP | 358062314 A | 4/1983 | | JP | 05-099007 | 4/1993 |
| JP | 56-122315 | 7/1983 | | JP | 05106415 A2 | 4/1993 |
| JP | 58-117319 | 7/1983 | | JP | 05-149118 | 6/1993 |
| JP | 58-119920 | 7/1983 | | JP | 05-149136 | 6/1993 |
| JP | 58-122314 | 7/1983 | | JP | 05-179966 | 7/1993 |
| JP | 58-122318 | 7/1983 | | JP | 05-187279 | 7/1993 |
| JP | 58-131311 | 8/1983 | | JP | 05-187329 | 7/1993 |
| JP | 58-133422 | 8/1983 | | JP | 05-202810 | 8/1993 |
| JP | 58-133450 | 8/1983 | | JP | 05-215002 | 8/1993 |
| JP | 58-180722 | 10/1983 | ................. 123/316 | JP | 05-340290 | 12/1993 |
| JP | 58-187540 | 11/1983 | | JP | 06-33775 | 2/1994 |
| JP | 58-211526 | 12/1983 | ................. 123/432 | JP | 06-74038 | 3/1994 |
| JP | 59-7744 | 1/1984 | | JP | 06-108860 | 4/1994 |
| JP | 59-60034 | 4/1984 | | JP | 06-108861 | 4/1994 |
| JP | 59 060034 A | 4/1984 | | JP | 06-117280 | 4/1994 |
| JP | 59-60034 | 5/1984 | | JP | 6-119933 | 4/1994 |
| JP | 59-99025 | 6/1984 | | JP | 6-129271 | 5/1994 |
| JP | 59-119007 | 7/1984 | | JP | 06-200763 | 7/1994 |
| JP | 59-158321 | 9/1984 | | JP | 06-235305 | 8/1994 |
| JP | 60-184918 | 9/1984 | | JP | 06-235307 | 8/1994 |
| JP | 359188031 A | 10/1984 | | JP | 06-241097 | 8/1994 |
| JP | 59-211720 | 11/1984 | | JP | 06-346711 | 12/1994 |
| JP | 60-19916 | 2/1985 | | JP | 07-4287 | 1/1995 |
| JP | 60090926 | 5/1985 | | JP | 07-26994 | 1/1995 |
| JP | 61070130 | 4/1986 | | JP | 07-27022 | 1/1995 |
| JP | 61-89132 | 5/1986 | | JP | 07-34883 A | 2/1995 |
| JP | 61-106918 | 5/1986 | | JP | 07-54664 | 2/1995 |
| JP | 61-106919 | 5/1986 | | JP | 07-34883 B2 | 4/1995 |
| JP | 61-106920 | 5/1986 | | JP | 07-091265 | 4/1995 |
| JP | 61-164036 | 7/1986 | | JP | 7-145740 | 6/1995 |
| JP | 61-182421 | 8/1986 | | JP | 07-156692 | 6/1995 |
| JP | 62-174513 | 7/1987 | | JP | 07-156696 | 6/1995 |
| JP | 62-288333 | 12/1987 | | JP | 07-158473 | 6/1995 |
| JP | 63-38620 | 2/1988 | | JP | 07-166829 | 6/1995 |
| JP | 63055324 | 3/1988 | | JP | 07-166926 | 6/1995 |

| | | |
|---|---|---|
| JP | 07-224626 | 8/1995 |
| JP | 07-224671 | 8/1995 |
| JP | 07-224678 | 8/1995 |
| JP | 07-180514 | 9/1995 |
| JP | 7-233744 | 9/1995 |
| JP | 07-247859 | 9/1995 |
| JP | 07-259655 | 10/1995 |
| JP | 07-269361 | 10/1995 |
| JP | 07-301107 | 11/1995 |
| JP | 07-310564 | 11/1995 |
| JP | 07-310603 | 11/1995 |
| JP | 08-28280 | 1/1996 |
| JP | 08-42381 | 2/1996 |
| JP | 08-61070 | 3/1996 |
| JP | 08-82218 | 3/1996 |
| JP | 08-100662 | 4/1996 |
| JP | 08-158901 | 6/1996 |
| JP | 08-158957 | 6/1996 |
| JP | 08158957 A | 6/1996 |
| JP | 08-170551 | 7/1996 |
| JP | 08-177432 | 7/1996 |
| JP | 08-177433 | 7/1996 |
| JP | 08-177434 | 7/1996 |
| JP | 08-177435 | 7/1996 |
| JP | 08-177436 | 7/1996 |
| JP | 08-291715 | 11/1996 |
| JP | 08-326548 | 12/1996 |
| JP | 09-151737 | 6/1997 |
| JP | 02645942 | 8/1997 |
| JP | 10-141068 | 5/1998 |
| JP | 10-169513 | 6/1998 |
| JP | 10-238354 | 9/1998 |
| JP | 11-62639 | 3/1999 |
| JP | 11-315726 | 11/1999 |
| JP | 2000 120457 | 4/2000 |
| JP | 2000-145484 | 5/2000 |
| JP | 03-96624 B2 | 8/2000 |
| JP | 2000-220480 | 8/2000 |
| JP | 2000-256911 | 9/2002 |
| JP | 2003-262137 | 9/2003 |
| JP | 2003-269202 | 9/2003 |
| RU | 1247573 | 7/1986 ................ 123/432 |
| SU | 248375 | 7/1966 |
| SU | 914788 | 3/1982 |
| SU | 1195026 A | 11/1985 |
| SU | 1195027 A | 11/1985 |
| SU | 1668713 A1 | 8/1991 |
| SU | 1701953 A1 | 12/1991 |
| WO | WO 81/03200 | 11/1981 |
| WO | WO 83-04280 | 12/1983 |
| WO | WO 90-10141 | 9/1990 |
| WO | WO 90/15917 | 12/1990 |
| WO | WO 91-05152 | 4/1991 |
| WO | WO 92-04536 | 3/1992 |
| WO | WO 92/13178 | 8/1992 |
| WO | WO 94-28288 A3 | 12/1994 |
| WO | WO 94-28288 A2 | 12/1994 |
| WO | WO 95/08705 | 3/1995 |
| WO | WO 59-15429 | 6/1995 |
| WO | WO 95-16106 | 6/1995 |
| WO | WO 95/18294 | 7/1995 |
| WO | WO 95-23280 | 8/1995 |
| WO | WO 95-24549 | 9/1995 |
| WO | WO 95/33131 | 12/1995 |
| WO | WO 96/01939 | 1/1996 |
| WO | WO 96/15362 | 5/1996 |
| WO | WO 96-30635 | 10/1996 |
| WO | WO 97-11260 | 3/1997 |
| WO | WO 98-07973 | 2/1998 |
| WO | WO 98-34014 | 8/1998 |
| WO | WO 98-55744 | 12/1998 |
| WO | WO 99/42718 | 8/1999 |
| WO | WO 00-23698 | 4/2000 |
| WO | WO 00-28197 | 5/2000 |
| WO | WO 00-68565 A1 | 11/2000 |
| WO | WO 01/20150 | 3/2001 |
| WO | WO 01/46574 | 6/2001 |
| WO | WO 01-69062 A1 | 9/2001 |
| WO | WO 01/86125 A1 | 11/2001 |
| WO | WO 04/081356 | 9/2004 |

OTHER PUBLICATIONS

Effect of Variable Engine Valve Timing on Fuel Economy–T.H. Ma –Ford Motor Co., Ltd. England –Society of Automotive Engineers, Inc. –1988–pp. 1–8.

SAE Technical Paper Series–800794–Controlling Engine Load by Means of Late Intake–Valve Closing–James H. Tuttle–Society of Automotive Engineers, Inc. –Jun. 17, 1980.

Inter Partes Reexamination Communication, mailed Sep. 22, 2005, entitled "Action Closing Reexamination" In Reexamination application No. 95/000,049, of U.S. patent No. 6,651,618.

Inter Partes Reexamination Communication, mailed Sep. 22, 2005, entitled "Action Closing Reexamination" In Reexamination application No. 95/000,050, of U.S. Appl. No. 6,688,280.

Internal Combustion Engines & Air Pollution; E.F. Obert; Based on Internal Combustion Engines, Third Edition; May, 2005.

Notas de prensa–Delphi Lanuches World's Most Advanced Common Rail Diesel System With Ford–Mar. 16, 2001.

Isuzu New Direct Injection Diesel Lineup–Oct. 19, 1999–Press Release.

An Experimental Investigation of the Effects of Common Rail Injection Parameters on Emissions and Performance in a High Speed Direct Injection Small Bore Diesel Engine. Paul J. Tennision–Aug. 21, 2004.

Diesel Engine Reference Book–LCR Lilly–Butterworths–1984.

Controlling Engine Load by Means of Late Intake–Valve Closing–James H. Tuttle–SAE Technical Paper Series 800794 –Jun. 9–13, 1980.

Effect of Variable Engine Valve Timing on Fuel Economy–T.H. Ma–SAE Technical Paper Series 880390–Feb. 29–Mar. 4, 1988.

Communication/European Search Report dated Apr. 21, 2005 from EP Patent Application No. 04029382.1 of Clyde C. Bryant.

Office Action dated Jun. 2, 2003, for U.S. Appl. No. 10/370,852; Amendment filed Jul. 10, 2003, for U.S. Appl. No. 10/370,852.

InterPartes Reexamination Communication, mailed Oct. 24, 2005, entitled "Patent Owner's Rsp to Action Closing Prosecution" In Reexam appl. no. 95/000,049 of U.S. Pat. No. 6,651,618 (with Partial Exhibits).

InterPartes Reexamination Communication, mailed Oct. 24, 2005, entitled "Patent Owner's Rsp to Action Closing Prosecution" In Reexam appl. no. 95/000,050 of U.S. Pat. No. 6,688,280 (With Partial Exhibits).

The Internal–Combustion Engine in Theory & Practic–vol. 1: Thermodynamics, Fluid Flow, Performance–Second Edition, Revised–Charles Fayette Taylor–1985.

The Internal–Combustion Engine in Theory & Practice–vol. 2: Combustion, Fuels, Materials, Design–Revised Edition––Charles Fayette Taylor–1985.

http://www.mazda.com.au/corpora/209.html; Oct. 16, 2001, pg. 1–6.

Challen et al., "Diesel Engine Reference Book, Second Edition," SAE International, 1999, pp. 75, 81, 84, 146, and 263–305.

Edwards et al. "The Potential of a Combined Miller Cycle & Internal EGR Engine for Future Heavy Duty Truck Apps" SAE Int'l, Int'l Congress & Expo, Feb. 23–Feb. 26, 1998.

Yorihiro Fukuzawa et al., "Development of High Efficiency Miller Cycle Gas Engine", Mitsubishi Heavy Industries, Ltd. Technical Review, vol. 38, No. 3, Oct. 2001, pp. 146–150.

Pending Application NO. 10/992,198; Title: Combustion Engine Including Fluidically–Driven Engine Valve Actuator–Filing Date: Nov. 19, 2004.

Pending Application No. 10/992,137; Title: Combustion Engine Including Fluidically–Controlled Engine Valve Actuator–Filing Date: Nov. 19, 2004.

Office Action dated May 28, 2004, for pending application No. 10/733,570; Amendment filed Nov. 24, 2004, for application No. 10/733,570.

Pending Application No. 10/933,300; Title: Air & Fuel Supply System for Combustion Engine–Filing Date: Nov. 19, 2004.

Pending Application No. 10/992,074; Title: Combustion Engine Including Cam Phase–Shifting–Filing Date: Nov. 19, 2004.

Pending Application No. 10/992,866; Title: Air & Fuel Supply System for Combustion Engine With Particulate Trap–Filing Date: Nov. 19, 2004.

Pending Application No. 10/992,857; Title: Air & Fuel Supply System for Combustion Engine Operating at Optimum Engine Speed–Filing Date: Nov. 19, 2004.

Pending Application No. 10/992,897; Title: Air & Fuel Supply System for Combustion Engine–Filing Date: Nov. 19, 2004.

Pending Application No. 10/933,065; Title: Air & Fuel Supply System for Combustion Engine Operating in HCCI Mode–Filing Date: Nov. 19, 2004.

Pending Application No. 10/992,070; Title: Combustion Engine Including Exhaust Purification with On–Board Ammonia Production–Filing Date: Nov. 19, 2004.

Pending Application No. 10/992,071; Title: Combustion Engine Including Engine Valve Actuation System–Filing Date Nov. 19, 2004.

Pending Application No. 10/992,069; Title: Air & Fuel Supply System for Combustion Engine–Filing Date: Nov. 19, 2004.

Pending Application No. 10/992,125; Title: Air & Fuel Supply System for A Combustion Engine–Filing Date: Nov. 19, 2004.

NOX Control in Heavy–Duty Diesel Engines–What is the Limit?–Dickey, Ryan III & Matheaus–International Congress & Exposition–Feb. 23–26, 1998–pp. 1–14.

Office Action dated Jun. 2, 2003, for U.S. Appl. No. 10/143,908; Reply to Office Action filed Sep. 2, 2003, for application No. 10/143,908.

Requester's Comments Subsequent to Patent Owner's Response to Office Action for Inter Partes ReExamination Control No. 95/000,135, Patent No. 6,951,211, dated Feb. 15, 2007.

Information Disclosure Statement Under 37 C.F.R. §1.555 filed Nov. 15, 2006, for ReExamination of U.S. Pat. No. 6,651,618–ReExamination No. 95/000,049.

Information Disclosure Statement Under 37 C.F.R. §1.555 filed Nov. 15, 2006, for ReExamination of U.S. Pat. No. 6,688,280–ReExamination No. 95/000,050.

Inter Partes ReExamination Communication dated Nov. 14, 2006 for Control No. 95/000,135, ReExamination Patent No. 6,951,211.

Ex Parte ReExamination Communication dated Nov. 15, 2006 for Control No. 90/007,971, ReExamination Patent No. 6,279,550.

Okamoto, Kazuhisa et al., "Development of a High–Performance Gas Engine Operating at a Stoichiometric Condition–Effect of Miller Cycle and EGR", CIMAC Congress 1998, pp. 1345–1360.

Okamoto, Kazuhisa et al., "Effect of EGR on The Late Intake–Valve Closing Miller Cycle for Natural Gas Engines" JSAE 983420 vol. 29, No. 2, Apr. 1998, pp. 17–22.

Roda, Franco, "Variable Valve Timing–A Means of Optimizing Tubrocharged Four–Stroke Diesel Engines", MTZ "Motortechnische Zeitschrift" (Engine Technology Magazine) 49, 1988, pp. 303–308.

Akiyama, Mamoru et al., "An Elegant Solution for Vehicular Diesel's Emission and Economy–Hybrid EGR System", SAE 960842, pp. 1–5.

Okamoto, Kazuhisa et al., "Development of a Late Intake–Valve Closing (LIVC) Miller Cycle for Stationary Natural Gas Engines–Effect of EGR Utilization", SAE 972948, 1997, pp. 87–99.

Zhang, Fu–Rong et al., "Methods of Increasing the BMEP (Power Output) for Natural Gas Spark Ignition Engines", SAE 981385, May 4–6, 1998, pp. 11–19.

Zhang, Fu–Rong et al., "Improvement of BMEP for Natural Gas Fueled Spark Ignition Engines by Using Miller Cycle and EGR", JSAE 9834196 vol. 29, No. 2, Apr. 1998, pp. 11–16.

Nagumo, Shinichi et al., "Study of Fuel Economy Improvement through Control of Intake Valve Closing Timing: Cause of Combustion Deterioration and Improvement", JSAE 9439311, JSAE Review 16 (1995), pp. 13–19.

"Optimierung von Arbeits–und Brennverfahren fur grobere Diseslmotoren mit Common–Rail–Einspritzung", MTZ Motortechnische Zietschrift 61(2000) 4, pp. 248–257.

Clarke, Damien et al., "The Simulation, Implementation and Analysis of the Miller Cycle Using an Inlet Control Rotary Valve", SAE Technical Paper Series 970336, Feb. 24–27, 1997, pp. 61–70.

Sakai, Hiroshi et al., "A New Type of Miller Supercharging System for High–Speed Engines–Part 1 Fundamental Considerations and Application to Gasoline Engines", SAE 851522; Sep. 9–12, 1985, pp. 1–7.

Narusawa, Kazuyuki, "An EGR Control Method for Heavy–Duty Diesel Engines under Transient Operations", SAE Technical Paper Series 900444, Feb. 26–Mar. 2, 1990, pp. 1–14.

Gould, Larrie et al., "Electronic Valve Timing: The impact of electronic valve timing on engine 'breathing' produces performance capability radically different from any traditional internal combustion engine", SAE Automotive Engineering vol. 99, No. 4, Apr. 1991, pp. 19–24.

Wadman, Bruce W., "Tandern Turbocharging Delivers 250 BMEP Rating", Diesel and Gas Turbine Progress, Jul. 1967, vol. No. 7, pp. 50–51.

Wadman, Bruce W., "Nordberg Centrifugal Gas Compressor Unit", Diesel and Gas Engine Progress, Apr. 1955, pp. 24–26.

Office Action dated Jul. 11, 2006 for U.S. Appl. No. 10/992,125.

Taylor, Charles Fayette, "The Internal–Combustion Engine in Theory & Practice: vol. 1:Thermodynamics, Fluid, Flow, Performance", Second Edition, Revised, 1985, pp. 8, 362, 392–394, 456–458, 489–491.

Taylor, Charles Fayette, "The Internal–Combustion Engine in Theory & Practice: vol. 2:Combustion, Fuels, Materials, Design", Revised Edition, 1985, pp. 7, 29–31, 71–72, 104, 117, 233–234, 367, 402–409, 422.

Order Granting Ex Parte ReExamination of Control No. 90/007,971, Pat. No. 6,279,550 dated Apr. 21, 2006.

Order Granting Inter Partes ReExamination of Control No. 95/000,135, Pat. No. 6,951,211 dated May 26, 2006.

Ansdale, R. F., "The Varimax Engine", Automobile Engineer, Sep. 1968, pp. 382–387.

Miller, R., "Nordberg Supairthermal Diesel, Duafuel and Gas Engines Operating on the Miller Supercharging System", Petroleum Division Conference, ASME, Sep. 1951.

Brinson, L., "High Performance Gas Burning Engines", Seventh International Congress on Combustion Engines, CIMAC, Apr. 1965, pp. 603–622.

Azouz, M. R. et al., "Digital Control of Engine Valve Timing", Military Techinical College, Egypt, Isala, 1987, pp. 193, 195–205.

D'Yachenko, V.G., "Internal Combustion Engines Operation Theory", Kiev, 1988.

"Valve Timing by Tensioner", Engineering Magazine, May 1986, pp. 343–359.

Hutten, H., "Schnelle Motoren Seziert und frisiert", MotorbuchverLag ISBN 3–87943–974–5, 1994 2 pages.

Heywood, J., "Internal Combustion Engine Fundamentals", McGraw Hill International Editions, Automotive Technology Series, 1989, pp. 6–10.

Hilliard, J., and Springer, George S., "Fuel Economy in Road Vehicles Powered by Spark Ignition Engines", 1988, pp. 182–187.

"Internal Combustion Engines", Moscow, 1990, pp. 12–23.

Khutziev, A.I., "Internal Combustion Engines with Controlled Compression Mode", Moscow, 1986, pp. 64–69, 102–103.

Lenin, I. M., "Theory of Automotive and Tractor Engines", Moscow, 1969, pp. 34–41, 62–65, 364–367.

Miller, R., "A Low Temperature Supercharging System for Compression, Pilot Oil and Spark Ignition Engines", ASME, paper No. 57–A–250, 1957, pp. 1–10.

"High Powered Medium Speed Engines", The Motor Ship, Jul. 1975, pp. 135–173.

"Two–stage Turbocharging for GMT's B230 High Speed Engine", The Motor Ship, Sep. 1978, pp. 27–32, 67–68.

O'Flynn, G. et al., "Combustion Characteristics of an Otto–Atkinson Engine Using Late Intel Valve Closing and Multi–Point Eletronic Fuel Injection", C389/041 IMechE, Paper No. 925107, 1992, pp. 329–338.

Petrov, A. K. et al., "Structural Design of Foreign Cars Produced at 1983", Annual Review, Part III, Automotive Engines, Moscow, 1983, pp. 3–19.

Rajikov, I. et al., "Automotive and Tractor Engines Structural Design", Moscow, 1986, pp. 18–27, 104–107.

Rannev, A. V., "Internal Combustion Engines for Construction Site and Road–Building Engines", Moscow, 1986, pp. 10–17.

Boggs, D. L. et al., "The Otto–Atkinson Cycle Engine–Fuel Economy and Emissions Results and Hardware Design", SAE Technical Paper Series 950089, Feb. 27–Mar. 2, 1995, pp. 1–13.

Scott, D., "Variable Valve Timing Has Electronic Control", SAE Automotive Engineering, May 1984, pp. 86–87.

Kentfield, J., "Diesel Engines with Extended Expansion Strokes", SAE Technical Paper Series 891866, Sep. 11–14, 1989, pp. 1–10.

Herzog, P. et al., "NOx Reduction Strategies for DI Diesel Engines", SAE Technical Paper Series 920470, Feb. 24–28, pp. 1–17.

Durnholz, M. et al., "Exhaust–Gas Recirculation–A Measure to Reduce Exhaust Emissions of DI Diesel Engines", SAE Paper Technical Series 920725, Feb. 24–28, 1992.

Stebler, H. et al., "Reduction of NOx Emissions of D.I. Diesel Engines by Application of the Miller–System: An Experimental and Numerical Investigation", SAE Technical Paper Series 960844, Feb. 26–29, 1996, pp. 1–11.

Kamo, R. et al., "Emissions Comparisions of an Insulated Turbocharged Multi–Cylinder Miller Cycle Diesel Engine", SAE Technical Paper Series 980888, Feb. 23–26, 1998, pp. 1–7.

Sapojhnikov, E. N., "International Combustion Engines", Klev, 1979, pp. 8–17.

Torazza, G., "A Variable Lift and Event Control Device for Piston Engine Valve Operation", pp. 59–68, Italy.

Wallace, W., and Lux, F., "A Variable Compression Ratio Engine Development", SAE Transactions, Paper No. 762A, Oct. 1963, pp. 680–707.

"Volvo D6A250 Supercharger–Med Hog Prestanda Redan Fran Start", Volvo. 1996.

Vzorov, B. A., and Mordukhovich, M. M., "Forcing of Tractor Engines", Moscow, 1974, pp. 24–31.

Stojek, D., and Stwiorok, A., "Valve Timing with Variable Overlap Conrol", XX Fisita Congress SAE 845026, May 1984, pp. 2.8–2.14.

Nagumo, S., et al., "Study of Fuel Economy Improvement Through Control of Intake Valve Closing Timing", 1994, pp. 169–172.

Zhang, F. et al., "Study on Miller Cycle Gas Engine for Generation–A Verification of Miller Cycle Effect", JSAE Convention, May 1995, vol. 951, No. 5, pp. 277–280, Paper No. 9534621.

Najajima, Y., et al., "Study of Improving Fuel Economy by Early Intake–Valve–Closing Concept", No. 24, 1982, pp. 19–26.

Sakono, T., et al., "Mazda 2.5/ Inline 4W–T Type Turbo Diesel Engine", Mazda Motor Corporation, Dec. 1995, vol. 34, No. 435, pp. 93–99.

Sasaki, Y., "Komatsu Turbo and Turbo Diesel Engine Two Stage Turbocharging for Small Highspeed Diesel Engine", Komatsu Ltd., Dec. 1984, vol. 23 No. 301, pp. 19–24.

Kouich, H., et al., "Development of Miller Cycle Gasoline Engine–Miller Cycle Engine with Late Intake Valve Closing and Lysholm Compressor", May 1993, Paper No. 9302088, pp. 201–204.

Ichimaru, K., et al., "A HIgh Expansion Ratio Gasoline Engine with Intake Control Rolary Valve Installation", Oct. 1992, Paper No. 924008, pp. 29–32.

Koichi, H., et al., "KJ–ZEM Type Miller Cycle DOHC/2254 cc", Ser. No. 0005, pp. 118–163.

Suzuki, T., et al., "Application of a Miller System to a Diesel Engine", Nov. 1991, Paper No. 912183, pp. 1.13–2.16.

Zhang, F., et al., "Effect of Miller Cycle on Gas Engine for Generation", JSAE Spring Convention, Jan. 1996, vol. 27, No. 1, Paper No. 9630723, pp. 79–83.

Ichimaru, K., et al., "Computer Simulation of Miller Cycle Gasoline Engines", JSAE Spring Convention, May 1995, vol. 951, No. 5, Paper No. 9534612, pp. 273–276.

Heuser, F., "Von der Fakuitat fur Maschinenwesen der Rheinisch–Westfallschen Technischen Hochschule Aachen genshmigte Dissertation zur Eriangung des akademischen Grades eines", A Dissertation Submitted to the Jul. 8, 1988, pp. 1–99.

Haas, A. et al., "Mesures Pour Reduire Les Emissions NOx Des Moteurs Pour Vehicules Utilitaires" Le Moteur Diesel: Evolution Et Mutations, SIA–Societe Des Ingenieurs De L'Automobile, Apr. 10–11, 1996, pp. 1–16.

Montagne, X. et al., "Analyse De La Sensibilite Aux Parametres Gazole D'Un Moteur Diesel D'Automobile A Injection Directe" Le Moteur Diesel: Evolutions Et Mutations, SIA–Societe Des Ingenieurs De L'Automobile, Apr. 10–11, 1996, pp. 1–16.

Herzog, P., "HSDI–Diesel–Euro III Technologies", Le Moteur Diesel: Evolution Et Mutations, SIA–Societe Des Ingenieurs De L'Automobile, Apr. 1996, pp. 1, 4, 8.

Feucht, H. et al., "Development Of The New Turbocharged 2.5I Four Valves Prechamber Diesel Engine For The Mercedes Benz Compact Class", Le Moteur Diesel: Evolution Et Mutations, SIA–Societe Des Ingenieurs De L'Automobile, Apr. 10–11, 1996, 15 pages.

Brun, R., "Science et technique du moteur diesel industriel et de transport", Institut Francais Du Petrole, 1981, 7 pages.

Briand, J., "Diesels marins description et fonctionnement" Masson, Paris, 1992, pp. 137–138.

"Moteurs Diesel", E.T.A.I., 1990, p. 330.

Foy, H., "Technologie Du Turbocompresseur", E.T.A.I., pp. 62, 65, 140.

Suzuki, T., et al., "Development of diesel Combustion for Commercial Vehicles", Future Diesel Engines, Society of Automotive Engineers, Inc., SAE 972685, 1997, pp. 47–65.

Iwata, N., et al., "Improvement of anit–knocking performance by supercharged Miller–Cycle engine–RAM–Pulsation effects on anti–knocking performance by Miller––Cycle", Mazda Motor Corporation, May 1995, No. 9534603.

Haugen, D., "Performance And Combustion Effects Of Phased Late Intake Valve Closure On A Two Intake Valve Engine", A Thesis Submitted to the Faculty of the Graduate School of the University of Minnesota, Dec. 1995, pp. 1–84.

Boggs, D. et al., "A Small Displacement DI Diesel Engine Concept for High Fuel Economy Vehicles", Future Diesel Engines, Aug. 6–8, 1997, SAE SP–1287, SAE No. 972680, pp. 1–97.

Kesgin, Ugur, "Efficiency improvement and NOx emission reduction potentials of two–stage turbocharged Miller cycle for stationary natural gas engines", International Journal of Energy Research, 2005, vol. 29, pp. 189–216.

Communication from European Patent Office dated Apr. 21, 2005 and Feb. 23, 2005 from EP Patent Application Nos. 04029382.1 and 04029282.1–2311 including Partial Search Report Lack of Unity Opinion, and Annex to Search Report.

Office Action dated Feb. 17, 2006 for U.S. Appl. No. 10/733,570.

Reply to Office Action dated Feb. 22, 2006 for U.S. Appl. No. 10/933,300.

Office Action dated Apr. 7, 2006 for U.S. Appl. No. 10/992,069.

Office Action dated Mar. 16, 2006 for U.S. Appl. No. 10/992,070.

Office Action dated Mar. 15, 2006 for U.S. Appl. No. 10/992,071.

Office Action dated Mar. 29, 2006 for U.S. Appl. No. 10/992,.074.

Office Action dated Mar. 17, 2006 for U.S. Appl. No. 10/992,137.

Reply of Office Action dated Apr. 20, 2006 for U.S. Appl. No. 10/992,198.

Office Action dated Apr. 12, 2006 for U.S. Appl. No. 10/992,857.

Office Action dated Mar. 29, 2006 for U.S. Appl. No. 10/992,866.

Office Action dated Apr. 18, 2006 for U.S. Appl. No. 10/992,897.

Office Action dated Apr. 18, 2006 for U.S. Appl. No. 10/993,065.

Reply to Office Action dated Feb. 22, 2006 for U.S. Appl. No. 11/105,943.

Office Action dated Feb. 8, 2006 for U.S. Appl. No. 90/007,885.

Reply to Office Action dated May 25, 2006 for U.S. Appl. No. 10/992,125.

Office Action dated Feb. 17, 2006 in Application No. 10/733,570 (11 pages).

Amendment dated Jan. 27, 2006 in Application No. 10/733,570 (16 pages).

Obert, "Internal Combustion Engines, $2^{nd}$ Edition, Analysis and Practice" (pp. 142–153 and 154; Figs. 5–12 (1950).

Further translation of JP 07–091265, listed above; pp. 9–10, para. 15; pp. 11–12, para. 20; p. 13, para. 24 (30 pages).

Information Disclosure Statement filed Mar. 17, 2006 in ReExam of U.S. Pat. No. 6,651,618–Control No. 95/000,049.

Information Disclosure Statement filed Mar. 17, 2006 in ReExam of U.S. Pat. No. 6,688,280–Control No. 95/000,050.

Request for Inter Partes Reexamination of U.S. Pat. No. 6,951,211, filed Mar. 13, 2006–Control No. 95/000,135.

Request for Ex Partes Reexamination of U.S. Pat. No. 6,279,55, filed Mar. 13, 2006–Control No. 90/007,971.

Lilly, Diesel Engine Reference Book, 1984, pp. 2/29–34, 3/7, and 22/7–8.

T.H. Ma, "Recent Advances in Variable Valve Timing", 1986, pp. 235–253.

Heywood, Internal Combustion Engine Fundamentals, 1988, pp. 9–15.

Miller, R., "Supercharging and Internal Cooling Cycle for High Output", Oil and Gas Power Division proceedings of the National Conference, 1946, ASME 46–OGP–4, pp. 1–5.

Morel, T. et al., "Application of Several Variable Valve Timing Concepts to an LHR Engine", Journal of Engineering for Gas Turbines and Power, 1987, pp. 402–409, vol. 109, ASME 87–ICE–29.

Assanis, D. and Bolton, B., "Variable Valve Timing Strategies for Optimum Engine Performance and Fuel Economy", Jan. 23–27, 1994, ASME 94–ICE–5, pp. 1–11.

Zappa, G. and Franca, T., "A 4–Stroke High Speed Diesel Engine with Two–Stage of Supercharging and Variable Compression Ratio", 13 International Congress on Combustion Engines, 1979, pp. D19–1–D19–22.

Ahmad, T. and Theobald, M., "A Survey of Variable-Valve-Actuation Technology", SAE Technical Paper Series 891674, Aug. 7–10, 1989, pp. 1–27.

Ma, T. and Rajabu, H., "Computer Simulation of an Otto-Atkinson Cycle Engine with Variable Timing Multi-Intake Valves and Variable Compression Ratio", IMechE C53/88, 1988, pp. 273–277.

Porter, B. et al., "Control Technology for Future Low Emissions Diesel Passenger Cars", C517/035/96, 12 pages.

Charlton, S. et al., "Application of Variable Valve Timing To a Highly Turbo Charged Diesel Engine", C405/044, IMechE, 1990, pp. 189–195.

Ladommatos, N. and Stone, C., "Developments for Direct Injection Diesel Engines", Mechanical Engineering Publications Limited, 1986, pp. 41–53.

Roe, G., "Variable Valve-Timing Unit Suitable for Internal Combustion Engines", vol. 186 23/72, pp. 301–306 and D103–D105.

Payri, F. et al., "Reduction of Pumping Losses By the Use of a Variable Valve Timing System", IMechE 105/84, 1984, pp. 295–300.

Charlton, S., "A Continuously Variable Poppet Valve Actuator for Internal Combustion Engines", IMechE 82/86, 1985, pp. 157–195.

Thring, R., "The Flexible Diesel Engine", SAE Technical Paper Series 900175, Feb. 26–Mar. 2, 1990, pp. 31–39.

Mavinahally, N. et al., "Insulated Miller Cycle Diesel Engine", SAE Technical Paper Series 961050, Feb. 26–29, 1995, pp. 1–9.

Schecther, M. and Levin, M., "Camless Engine", SAE Technical Paper Series 960581, Feb. 25–29, 1996, pp. 17–31.

Miller, R., "Supercharging and Internal Cooling Cycle for High Output", ASME, 1947, pp. 453–464, vol. 69.

Mardell, J. and Cross, R., "An Integrated, Full Authority, Electrohydraulic Engine Valve and Diesel Fuel Injection System", SAE Technical Paper Series 880602, Feb. 29–Mar. 4, 1988, pp. 1–10.

Gray, C., "A Review of Variable Engine Valve Timing", SAE Technical Series 880386, Feb. 29–Mar. 4, 1988, pp. 1–11.

ASmus, T., "Perspective on Applications of Variable Valve Timing", SAE Technical Series 910445, Feb. 25–Mar. 1, 1991, pp. 1–13.

Vormstein, W. and Pleimling, H., "Valve Timing and its Effect on the Performance of Medium-Speed Diesel Engines", 12$^{th}$ International Congress on Combustion Engines, 1977, pp. 1–41.

Chute, R., "Pressure Compounding a Four Cycle Diesel Engine", SAE Technical Paper Series 851520, Sep. 9–12, 1985, pp. 1–15.

Ishizuki, et al., "A New Type of Miller Supercharging System for High Speed Engines Part 2–Realization of High BMEP Diesel Engines", SAE Technical Series 851523, Sep. 9–12, 1985, pp. 1–10.

Leonard, H. et al., "Parametric Investigation of Variable Valve Timing Applied to a Turbocharged Diesel Engine", SAE Technical Paper Series 910453, Feb. 25–Mar. 1, 1991, pp. 1–9.

Leonard, H. et al., "Design and Analysis of a Roller Follower Variable Valve Timing System", SAE Technical Paper Series 930824, Mar. 1–5, 1993, pp. 61–70.

Bata, R. et al., "Variable Valve Timing for Diesel Compression Ratio Control", American Society of Mechanical Engineers, Internal Combustion Engine Division ICE, vol. 13, New Technology in Large Bore Engines, 1990, pp. 89–93.

Meier, E. and Baden, "The Miller System–a Possible Solution to Present Problems with Highly Charged Four-Stroke Engines", Brown Boveri Review, Apr. 1977, pp. 235–242, vol. 64, No. 4.

Bolton, B. and Assanis, D., "Optimum Breathing Strategies for Turbocharsed Diesel Engines Based on the Miller Cycle Concept", American Society of Mechanical Engineers, Petroleum, Division, Engineering Systems Design and Analysis, ASME, 1994, pp. 253–262, vol. 8: Part B "Internal-Combustion Engines," The New Encyclopedia Britannica, 1987, pp. 474–485, Fifteenth edition, Chicago, IL.

"Internal-Combustion Engines," The New Encyclopedia Britannica, 1987, pp. 474–485, Fifteenth edition, Chicago, IL.

Drei, V., "B230 Engines: Research and Experiments for Widening the Speed and Output Range and for Utilizing Atlernative Fuels", Tech Paper 41336, 1983, pp. 703–728

"Camlobe Phasing May Be the Key to Controlling Emissions", Automotive Engineer, Jun./Jul. 1990, pp. 26–27.

"Camlobe Phasing May Be the Key to Controlling Emissions", Automotive Engineer, Jun./Jul. 1990, pp. 26–27.

Berchtold, M. "Two Stage Supercharging with Comprex", 14th International Congress on Combustion Engines, 1981, pp. D111–1–D111–15.

Frankle, G., "Potential for Reducing Internal Engine Emissions in Modern Commercial Vehicle Diesel Engines", ACEA, Jul. 1–2, 1996, 28 pages.

Sakai, H. et al., "A New Type of Miller Cycle Diesel Engine", JSAE Review, Apr. 1988, pp. 4–9.

Choshi, M. et al., "Development of V6 Miller Cycle Engine", JSAE Review 15 9434154, 1994, pp. 195–200.

Nagao, F. et al., "Relation between Intel Valve Closing Angle and Volumetric Efficiency of a Four-Stroke Engine", Bulletin of JSME 621,43.05, 1969, pp. 894–901.

Ma, T., "Recent Advances in Variable Valve Timing", pp. 235–252.

Hara, S. et al., "Effects of Intake-Valve Closing Timing on Spark-Ignition Engine Combustion", SAE Technical Paper Series 850074, Feb. 25–Mar. 1, 1985, pp. 1–10.

Stone, R. and Kwan, E., "Variable Valve Actuation Mechanisms and the Potential for their Application", SAE Technical Paper Series 890673, Feb. 27–Mar. 3, 1989, pp. 1–18.

Meacham, G., "Variable Cam Timing as an Emission Control Tool", ASE 700673, Aug. 24–27, 1970, pp. 1–16.

Siewert, A., "How Individual Valve Timing Events Affects Exhaust Emissions", ASE 710609, Jun. 7–11, 1971, pp. 1–17.

Freeman, M. and Nicholson, A., "Valve Timing for Control of Oxides of Nitrogen (NO)", ASE 720121, Jan. 10–14, 1972, pp. 1–10.

Schiele, C., "Design and Development of a Variable Valve Timing (WT) Camshaft", ASE 740102, Feb. 25–Mar. 1, 1974, pp. 1–9.

Bates, B. et al., "Variable Displacement by Engine Valve Control", ADE Technical Paper Series 780145, Feb. 27–Mar. 3, 1978, pp. 1–12.

Siegla, D. and Siewert, R., "The Variable Stroke Engine–Problems and Promises", ASE Technical Paper Series 780700, Aug. 7–10, 1978, pp. 1–12.

Luria, D. et al., "The Otto–Atkinson Engine–A New Concept in Automotive Economy", SAE Technical Paper Series, 820352, Feb. 22–26, 1982, pp. 1–8.

Tuttle, J., "Controlling Engine Load by Means of Early Intake Valve Closing", SAE Technical Paper Series–820408, Feb. 22–26, 1982, pp. 1–17.

Asmus, T., "Valve Events and Engine Operation", SAE Technical Paper Series 820749, Jun. 7–10, 1982, pp. 1–14.

Herrin, R. and Pozniak D., "A Lost Motion, Variable–Valve–Timing System for Automotive Piston Engines", SAE Technical Paper Series 840335, Feb. 27–Mar. 2, 1984, pp. 1–15.

Richman, A. and Reynolds, W., "A Computer–Controlled Poppet–Valve Actuation System for Application on Research Engines", SAE Technical Paper Series 840340, Feb. 27–Mar. 2, 1984, pp. 1–9.

Elrod, A., and Nelson, M., "Development of a Variable Valve Timed Engine of Eliminated the Pumping Losses Associated with Throttled Operation", SAE Technical Paper Series 860537, Feb. 24–28, 1986, pp. 1–8.

Nelson, M. and Elrod, A., "Continuous–Camlobe Phasing: An Advanced Valve–Timing Approach", SAE Technical Paper Series 870612, Feb. 23–27, 1987, pp. 1–10.

Freudenstein F. et al., "The Synthesis and Analysis of Variable–Valve–Timing Mechansims for Internal–Combustion Engines", SAE Technical Paper Series 880387, Feb. 29–Mar. 4, 1988, pp. 1–10.

Lenz, H. et al., "Variable Valve Timing–A Possibility to Control Engine Load without Throttle", SAE Technical Paper Series 880388, Feb. 29–Mar. 4, 1988, pp. 1–7.

Sapienza, S. et al., "An Electronically Controlled Cam Phasing System", SAE Technical Paper Series 880391, Feb. 29–Mar. 4, 1988, pp. 1–7.

Griffiths, P. and Mistry, K, "Variable Valve Timing for Fuel Economy Improvement–The Mitchell System", SAE Technical Paper Series 880392, Feb. 29–Mar. 4, 1988, pp. 1–9.

Entzminger, W., "Variable Valve Action (WA) Through Variable Ratio Rocker Arms", SAE Technical Paper Series 880730, Feb. 29–Mar. 4, 1988, pp. 1–11.

Saunders, R. and Abdul–Wahab, E., "Variable Valve Closure Timing for Load Control and the Otto Atkinson Cycle Engine", SAE Technical Paper Series 890677, Feb. 27–Mar. 3, 1989, pp. 1–11.

Lenz, H. et al., "Initial Test Results of an Electro–Hydraulic Variable–Valve Actuation System on a Firing–Engine", SAE Technical Paper Series 890678, Feb. 27–Mar. 3, 1989, pp. 1–8.

Grohn, M., "The New Camshaft Adjustment System by Mercedes–Benz–Design and Application in 4–Valve Engines", SAE Technical Paper Series 901727, Feb. 17–20, 1990, pp. 1–6.

Gould, L. et al., "Performance Evaluation of a Camless Engine Using Valve Actuators with Programmable Timing", SAE Technical Paper Series 910450, Feb. 25–Mar. 1, 1991, pp. 1–13.

Nagesh, M. et al., "Experimental Investigation on Extended Expansion Engine (EEE)", SAE Technical Paper Series 920452, Feb. 24–28, 1992, pp. 1–14.

Wilson, N. et al., "Asymmetric Valve Strategies and Their Effect on Combustion", SAE Technical Paper Series 930821, Mar. 1–5, 1993, pp. 29–40.

Hatano, K. et al., "Development of a New Multi–Mode Variable Valve Timing Engine", SAE Technical Paper Series 930878, Mar. 1–5, 1993, pp. 137–143.

Saunders, A. and Rabia, S., "Part Load Efficiency in Gasoline Engines", 1986, pp. 55–62, Mechanical Engineering Publications Limited, Suffolk, UK.

Dresner, T. and Barkan, P., "A Review and Classification of Variable Valve Timing Mechanisms", SAE Technical Paper Series 890674, Feb. 27–Mar. 3, 1989, pp. 1–14.

Stone, C. and Kwan, E., "Variable Valve Timing for IC Engines", Automotive Engineer, pp. 54–58.

Dresner, T., "Multi–input CAM–Actuated Mechanisms and their Application to IC Engine Variable Valve–Timing", A Dissertation Submitted to the Department of Mechanical Engineering and the Committee of Graduated Studies of Stanford University, Sep. 1988, No. 8906655, pp. 1–277.

Office Action dated Jul. 28, 2005 for U.S. Appl. No. 10/773, 570.

Office Action dated Aug. 22, 2005 for U. S. Appl. No. 10/933,300.

Office Action dated Aug. 22, 2005 for U.S. Appl. 11/105, 943.

Office Action dated Nov. 25, 2005 for U.S. Appl. No. 10/992,125.

Office Action dated Nov. 23, 2005 for U.S. Appl. No. 10/992,198.

English Language JPO Abstract of JP Publication No. 05106415 AI. Apr. 27, 1993.

English Language JPO Abstract of JP Publication No. 200145484 A, May 26, 2000.

English Language JPO Abstract of JP Publication No. 200120457 A, Apr. 25, 2000.

Communication from European Patent Office dated May 18, 2005 from EP Patent Application No. 03006344.0–2311 including Partial Search Report, Lack of Unity Opinion and Annex to Search Report.

Request for Ex Parte Reexamination for U.S. Pat. No. 6,688,280, filed Jan. 20, 2006, including Declaration of Dr. Joel Hiltner with each Exhibit referred to in the Declaration. See Reexamination 90/007,885, filed Jan. 20, 2006.

Sakai, H. et al., "A Miller System Application for Efficient Diesel Power Units," The American Chemical Society, 1986, pp. 355–360.

Eaton Automotive –Engine Products, Variable Valve Actuation Devices, http://www.automotive.eaton.com/product/engine_controls/VVA.html, page 1.

Hara et al., "Effects of Intake–Valve Closing Timing on Spark–Ignition Engine Combustion", SAE Technical Paper Series 850074, Feb. 25–Mar. 1, 1985, pp. 1–10.

"Internal Combustion Engine Fundamentals" John B. Heywood–McGraw–Hill Book Company.

Paper entitled "The Miller Supercharging System for Diesel & Gas Engines Operating Characteristics", presented by Ralph Miller & H.U. Lieberherr, (continued below). Jun. 22, 1957 at the 4th Congress of the International Council on Combustion Engines.

"Complaint for Declaratory Relief", Caterpillar vs. Entec Engine Corp. and Clyde C. Bryant, Dec. 21, 2005 (excluding exhibits).

Zhang et al.; Study on Miller Cycle Gas Engine For Generation–A Veritfication of Miller Cycle Effect–Tokyo Gas Co., Ltd. vol. No. 951, Issue No. 5, Year. 1995, pp. 277–280.

Zhang et al; Effect of Miller–Cycle on Gas Engine for Power Generation–Energy Technology Research Institute, Tokyo Gas Co., Ltd. –Proceedings of JSAE Spring Convention––vol. 27, No. 1, Jan. 1996–Article No. 0014.

Ichimaru et al; 71. Computer Simulation of Miller Cycle Gasoline Engines–The University of Tokyo–Proceedings of JSAE Spring Convention, 951–pp. 273–276.

Jacobs Vehicle Systems, VVA–Variable Actuation Systems–pp. 1–2.

Paxman Diesel Engines since 1934, pp. 1 and 9, Aug. 23, 2004.

Alstom Engines Paxman VP185–pp. 1–6.

The 8$^{th}$ Annual Automobile & Engine Technology Colloquium in Aachen–An Overview–Dipl.–Ing. Jörg Ballauf–pp. 1–5, Oct. 1999.

Communication/European Search Report dated 21 Apr. 2005 from EP Patent Application No. 04029382.1 of Clyde C. Bryant.

Office Action dated Jun. 2, 2003, for application No. 10/370,852; Amendment filed Jul. 10, 2003, for application No. 10/370,852.

Diesel Engine Reference Book–LCR Lilly–Butterworth & Co.–1984.

SAE Technical Paper Series–A Review & Classification of Variable Valve Timing Mechanisms–Dresner et al.–Feb. 27, 1989–Mar. 03, 1989–pp. 1–14.

SAE Technical Paper Series–A Review of Variable Valve Timing Benefits & Modes of Operation–Dresner et al.–Aug. 07, 1989–Aug. 10, 1989–pp. 1–9.

Sturman Industries–Hydraulic Valve Actuation–Sep. 5, 2004.

"Development of High Efficiency Miller Cycle Gas Engine" Fukuzawa et al. –Mitsubishi Heavy Industries, Ltd. Technical Review vol. 38 No. 3 (Oct. 2001)–pp. 146–150.

"Technology–The Unside Story on the Miller–Cycle Engine"–Mazda Australia–Corporate–Oct. 16, 2001–pp. 1–6.

\* cited by examiner

A – COMPRESSION BEGINS IN 2-STROKE AND 4-STROKE DIESEL CYCLE ENGINE
B – COMPRESSION BEGINS IN 2-STROKE AND 4-STROKE NEW CYCLE ENGINE
C – EXPANSION ENDS IN 4-STROKE DIESEL CYCLE ENGINE
D – EXPANSION ENDS IN 2-STROKE AND 4-STROKE NEW CYCLE ENGINE
E – EXPANSION ENDS (AT EXHAUST BLOW-DOWN) IN 2-STROKE DIESEL CYCLE ENGINE
V – SEE NOTE 1 IN DESCRIPTION

COMPARISON OF OPERATING PARAMETERS OF A HEAVY DUTY TWO-STROKE DIESEL ENGINE (A) WITH THE ENGINE OF THIS INVENTION (B)

| ENGINE | COMPRESSION RATIO OR NOMINAL COMPRESSION RATIO | EFFECTIVE COMP RATIO | COMPRESSION PRESSURE (PSI) | TEMP @ END COMP (DEG F.) | TEMP @ END COMB (DEG F.) | CHARGE DENSITY (LB./CU. FT.) | EXPANSION RATIO | E.R. C.R. | CHARGE WEIGHT PER REVOLUTION (GRAMS) |
|---|---|---|---|---|---|---|---|---|---|
| A | 19:1 | 19:1 | 907 | 1300 | 3400 | 1.45 | *10:1 | 0.5 | 2.06 |
| B(ic) | 13:1 | 2:1 | 533 | 250 | 3000 | 2.03 | **19:1 | 1.5 | 2.86 |
| B(bp) | 13:1 | 13:1 | 533 | 992 | ^3100 | 1.01 | **19:1 | 1.5 | 1.43 |
| B2(ic) | 10:1 | 2:1 | 369 | 250 | ^2800 | 1.40 | **19:1 | 1.9 | 1.98 |
| B2(bp) | 10:1 | 10:1 | 369 | 871 | ^2900 | 0.75 | **19:1 | 1.9 | 1.06 |

\* Exhaust valve opens midstroke
\*\* Exhaust valve opens near BDC
(ic) Air charge intercooled except for last stage of compression
(bp) Intercoolers bypassed
^ Estimated

E.R. = EXPANSION RATIO
C.R.   COMPRESSION RATIO

*FIG 13*

COMPARISON OF OPERATING PARAMETERS OF A HEAVY DUTY FOUR-STROKE DIESEL ENGINE (A)
WITH THE ENGINE OF THIS INVENTION (B)

| ENGINE | COMPRESSION RATIO OR NOMINAL COMPRESSION RATIO | EFFECTIVE COMP RATIO | COMPRESSION PRESSURE (PSI) | TEMP @ END COMP (DEG F.) | TEMP @ END COMB (DEG F.) | CHARGE DENSITY (LB./CU. FT.) | EXPANSION RATIO | E.R. C.R. | CHARGE WEIGHT PER REVOLUTION (GRAMS) |
|---|---|---|---|---|---|---|---|---|---|
| A | 19:1 | 19:1 | 907 | 1300 | 3400 | 1.45 | 19:1 | 1.0 | *1.03 |
| B(ic) | 13:1 | 2:1 | 533 | 250 | 3000 | 2.03 | 19:1 | 1.5 | **2.86 |
| B(bp) | 13:1 | 13:1 | 533 | 992 | ^3100 | 1.01 | 19:1 | 1.5 | **1.43 |
| B2(ic) | 10:1 | 2:1 | 369 | 250 | ^2800 | 1.40 | 19:1 | 1.9 | **1.98 |
| B2(bp) | 10:1 | 10:1 | 369 | 871 | ^2900 | 0.75 | 19:1 | 1.9 | **1.06 |

\* Per revolution, not per firing stroke
\*\* Per revolution and per firing stroke
(ic) Air charge intercooled except for last stage of compression
(bp) Intrecoolers bypassed
^ Estimated

E.R. = EXPANSION RATIO
C.R. = COMPRESSION RATIO

*FIG 14*

INTERNAL COMBUSTION ENGINE AND WORKING CYCLE

CROSS-REFERENCE TO RELATED APPLICATIONS

This application is a continuation of U.S. application Ser. No. 08/863,103, filed May 23, 1997 (now U.S. Pat. No. 6,279, 550), which claims the benefit of U.S. provisional application No. 60/022,102, filed Jul. 17, 1996, provisional application No. 60/023,460, filed Aug. 6, 1996, provisional application No. 60/029,260, filed Oct. 25, 1996, and provisional application No. 60/040,630, filed Mar. 7, 1997, and which is a continuation-in-part of U.S. application Ser. No. 08/841,488, filed Apr. 23, 1997, now abandoned.

FIELD OF THE INVENTION

This invention relates to a method of deriving mechanical work from combusting gas in an internal combustion engine by means of a new thermodynamic working cycle and to reciprocating internal combustion engines for carrying out the method.

BACKGROUND OF INVENTION

It is well known that as the expansion ratio of an internal combustion engine is increased, more energy is extracted from the combustion gases and converted to kinetic energy and the thermodynamic efficiency of the engine increases. It is further understood that increasing air charge density increases both power and fuel economy due to further thermodynamic improvements. The objectives for an efficient engine are to provide a high-density charge, begin combustion at maximum density and then expand the gases as far as possible against a piston.

Conventional engines have the same compression and expansion ratios, the former being limited in spark-ignited engines by the octane rating of the fuel used. Furthermore, since in these engines the exploded gases can be expanded only to the extent of the compression ratio of the engine, there is generally substantial heat and pressure in the exploding cylinder which is dumped into the atmosphere at the time the exhaust valve opens resulting in a waste of energy and producing unnecessarily high polluting emissions.

Many attempts have been made to reduce the compression ratio and to extend the expansion process in internal combustion engines to increase their thermodynamic efficiency, the most notable one being the "Miller" Cycle engine, developed in 1947.

Unlike a conventional 4-stroke cycle engine, where the compression ratio equals the expansion ratio in any given combustion cycle, the Miller Cycle engine is a variant, in that the parity is altered intentionally. The Miller Cycle uses an ancillary compressor to supply an air charge, introducing the charge on the intake stroke of the piston and then closing the intake valve before the piston reaches the end of the inlet stroke. From this point the gases in the cylinder are expanded to the maximum cylinder volume and then compressed from that point as in the normal cycle. The compression ratio is then established by the volume of the cylinder at the point that the inlet valve closed, being divided by the volume of the combustion chamber. On the compression stroke, no actual compression starts until the piston reaches the point the intake valve closed during the intake stroke, thus producing a lower-than-normal compression ratio. The expansion ratio is calculated by dividing the swept volume of the cylinder by the volume of the combustion chamber, resulting in a more-complete-expansion, since the expansion ratio is greater than the compression ratio of the engine.

In the 2-stroke engine the Miller Cycle holds the exhaust valve open through the first 20% or so of the compression stroke in order to reduce the compression ratio of the engine. In this case the expansion ratio is probably still lower than the compression ratio since the expansion ratio is never as large as the compression ratio in conventional 2-stroke engines.

The advantage of this cycle is the possibility of obtaining an efficiency higher than could be obtained with an expansion ratio equal to the compression ratio. The disadvantage is that the Miller Cycle has a mean effective pressure lower than the conventional arrangement with the same maximum pressure, but with no appreciable improvements in emissions characteristics.

The Miller Cycle is practical for engines that are not frequently operated at light-loads, because at light-load operation the mean cylinder pressure during the expansion stroke tends to be near to, or even looser than, the friction mean pressure. Under such circumstances the more-complete-expansion portion of the cycle may involve a net loss rather than a gain in efficiency.

This type of engine may be used to advantage where maximum cylinder pressure is limited by detonation or stress considerations and where a sacrifice of specific output is permissible in order to achieve the best possible fuel economy. The cycle is suitable only for engines that operate most of the time under conditions of high mechanical efficiency, that is, at relatively low piston speeds and near full load.

SUMMARY OF THE INVENTION

Briefly described, the present invention comprises an internal combustion engine system (including methods and apparatuses) for managing combustion charge densities, temperatures, pressures and turbulence in order to produce a true mastery within the power cylinder in order to increase fuel economy, power, and torque while minimizing polluting emissions. In its preferred embodiments, the method includes the steps of (i) producing an air charge, (ii) controlling the temperature, density and pressure of the air charge, (iii) transferring the air charge to a power cylinder of the engine such that an air charge having a weight and density selected from a range of weight and density levels ranging from atmospheric weight and density to a heavier-than-atmospheric weight and density is introduced into the power cylinder, and (iv) then compressing the air charge at a lower-than-normal compression ratio, (v) causing a predetermined quantity of charge-air and fuel to produce a combustible mixture, (vi) causing the mixture to be ignited within the power cylinder, and (vii) allowing the combustion gas to expand against a piston operable in the power cylinder with the expansion ratio of the power cylinder being substantially greater than the compression ratio of the power cylinders of the engine. In addition to other advantages, the invented method is capable of producing mean effective [cylinder] pressures ("mep") in a range ranging from lower-than-normal to higher-than-normal. In the preferred embodiments, the mean effective cylinder pressure is selectively variable (and selectively varied) throughout the mentioned range during the operation of the engine. In an alternate embodiment related to constant speed-constant load operation, the mean effective cylinder pressure is selected from the range and the engine is configured, in accordance with the present invention, such that the mean effective cylinder pressure range is limited, being varied only in the amount required for producing the power, torque and speed of the duty cycle for which the engine is designed.

In its preferred embodiments, the apparatus of the present invention provides a reciprocating internal combustion engine with at least one ancillary compressor for compressing an air charge, an intercooler through which the compressed air can be directed for cooling, power cylinders in which the combustion gas is ignited and expanded, a piston operable in each power cylinder and connected to a crankshaft by a connecting link for rotating the crankshaft in response to reciprocation of each piston, a transfer conduit communicating the compressor outlet to a control valve and to the intercooler, a transfer manifold communicating the intercooler with the power cylinders through which manifold the compressed charge is transferred to enter the power cylinders, an intake valve controlling admission of the compressed charge from the transfer manifold to said power cylinders, and an exhaust valve controlling discharge of the exhaust gases from said power cylinders. For the 4-stroke engine of this invention, the intake valves of the power cylinders are timed to operate such that charge air which is equal to or heavier than normal can be maintained within the transfer manifold when required and introduced into the power cylinder during the intake stroke with the intake valve closing at a point substantially before piston bottom dead center position or, alternatively, with the intake valve closing at some point during the compression stroke, to provide a low compression ratio. In some designs another intake valve can open and close quickly after the piston has reached the point the first intake valve closed in order to inject a temperature adjusted high pressure secondary air charge still at such a time that the compression ratio of the engine will be less than the expansion ratio, and so that ignition can commence at substantially maximum charge density. The 2-stroke engine of this invention differs in that the intake valves of the power cylinders are timed to operate such that an air charge is maintained within the transfer manifold and introduced into the power cylinder during the scavenging-compression (the 2nd) stroke at such a time that the power cylinder has been scavenged by low pressure air and the exhaust valve has closed, establishing that the compression ratio of the engine will be less than the expansion ratio of the power cylinders. Means are provided for causing fuel to be mixed with the air charge to produce a combustible gas, the combustion chambers of the power cylinders are sized with respect to the displaced volume of the power cylinder such that the exploded combustion gas can be expanded to a volume substantially greater than the compression ratio of the power cylinder of the engine.

The chief advantages of the present invention over existing internal combustion engines are that it provides a compression ratio lower than the expansion ratio of the engine, and provides, selectively, a mean effective cylinder pressure higher than the conventional engine arrangement with the same or lower maximum cylinder pressure than that of prior art engines.

This allows greater fuel economy, and production of greater power and torque at all RPM, with low polluting emissions. Because charge densities, temperatures and pressures are managed, light-load operation is practical even for extended periods, with no sacrifice of fuel economy. The new working cycle is applicable to 2-stroke or 4-stroke engines, both spark-ignited and compression-ignited. For spark-ignited engines the weight of the charge can be greatly increased without the usual problems of high peak temperatures and pressures with the usual attendant problem of combustion detonation and pre-ignition. For compression-ignited engines the heavier, cooler, more turbulent charge provides low peak cylinder pressure for a given expansion ratio and allows richer, smoke-limited air-fuel ratio giving increased power with lower particulate and $NO_x$ emissions. Compression work is reduced due to reduced heat transfer during the compression process. Engine durability is improved because of an overall cooler working cycle and a cooler than normal exhaust. It also provides a means of regenerative braking for storing energy for subsequent positive power cycles without compression work and for transient or "burst" power which further increases the overall efficiency of the engine.

All of the objects, features and advantages of the present invention cannot be briefly stated in this summary, but will be understood by reference to the following specifications and the accompanying drawings.

BRIEF DESCRIPTION OF THE DRAWINGS

Embodiments of internal combustion engines according to the invention will now be described, by way of example, with reference to the accompanying drawings, in which:

FIG. 4-B is a perspective view (with portions in cross-section) of an engine similar to the engine of FIG. 4 with the exception that there is only one atmospheric air intake which supplies charge-air to the power cylinders at two different pressure levels.

FIG. 4-C is a schematic view of an exhaust and an air intake system of an engine showing a means of re-burning exhaust gases in order to reduce polluting emissions.

FIG. 9-B is a schematic drawing of a six cylinder, 2-stroke engine representing yet another embodiment of the apparatus of the present invention, from which yet another method of operation can be performed and will be described, and depicting two alternative systems (one in phantom lines) of inducting a low pressure primary air charge. Among its other components, this embodiment is seen as having three air coolers and dual manifolds and the means of controlling the temperature, density and pressure of the charge by an engine control module and by valving variations.

FIG. 13 is a chart showing improvements possible in the engine of this invention in effective compression ratios, peak temperatures and pressures, charge densities and expansion ratios, in comparison with a popular heavy-duty 2-stroke diesel engine.

FIG. 14 is a chart showing improvements possible in the engine of this invention in effective compression ratios, peak temperatures and pressures, charge densities and expansion ratios, in comparison with a popular heavy-duty, 4-stroke diesel engine.

FIG. 17 shows all shutter valves 5 and 3 and all air bypass valves 6 and 4 closed completely so that the primary stage of compression is operative and a second stage of compression is operative and the entire air charge, with the exception of any going through conduit 32 to intake valve 16-B, is being passed through the intercoolers 10, 11 and 12 to produce a very high density air charge to manifolds 13 and 14 and to the engines power cylinders for heavy-load operation.

FIG. 27 and FIG. 28 also show a schematic drawing for an engine control module (ECM) and valving to control charge-air and scavenging air at a pressure, density, and temperature deemed appropriate for each.

DETAILED DESCRIPTION OF THE DRAWINGS

Figure 1:
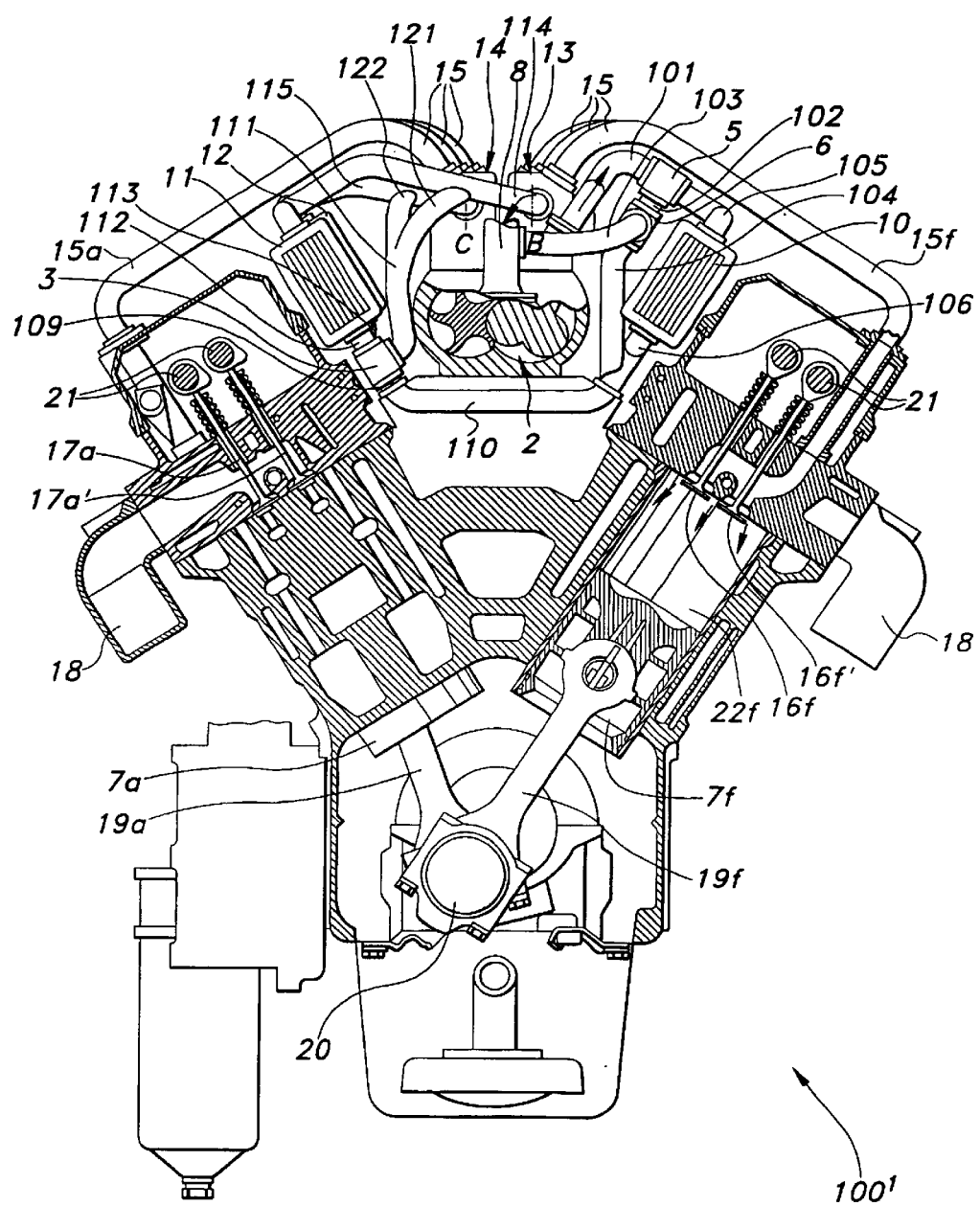
FIG. 1 is a perspective view (with portions in cross-section) of the cylinder block and head of a six cylinder internal combustion engine operating in a 4-stroke cycle, and representing a first embodiment of the apparatus of the present invention from which a first method of operation can be performed and will be described. Among its other components, this embodiment is seen as having one ancillary compressor, a cooling system and valves to control charge pressures, density and temperature.

With reference now in greater detail to the drawings, a plurality of alternate, preferred embodiments of the apparatus of the Improved Internal Combustion Engine 100 of the present invention are depicted. Like components will be represented by like numerals throughout the several views; and, in some but not all circumstances, as the writer might deem necessary (due to the large number of embodiments), similar but alternate components will be represented by superscripted numerals (e.g., $100^1$). When there are a plurality of similar components, the plurality is often times referenced herein (e.g., six cylinders 7a–7f), even though fewer than all components are visible in the drawing. Also, components which are common among multiple cylinders are sometimes written with reference solely to the common numeral, for ease of drafting—e.g. piston 22a–2f→piston 22. In an effort to facilitate the understanding of the plurality of embodiments, (but not to limit the disclosure) some, but not all, sections of this Detailed Description are sub-titled to reference the system or sub-system detailed in the subject section.

The invented system of the present invention is, perhaps, best presented by reference to the method(s) of managing combustion charge densities, temperatures, pressures and turbulence; and the following description attempts to describe the preferred methods of the present invention by association with and in conjunction with apparatuses configured for and operated in accordance with the alternate, preferred methods.

Some, but not necessarily all, of the system components that are common to tee o or more of the herein depicted embodiments include a crankshaft 20, to which are mounted connecting rods 19a–19f, to each of which is mounted a piston 22a–22f; each piston traveling within a power cylinder 7a–7f; air being introduced into the cylinders through inlet ports controlled by intake valves 16, and air being exhausted from the cylinders through exhaust ports controlled by exhaust valves 17. The interaction, modification and operation of these and such other components as are deemed necessary to an understanding of the various embodiments of the present invention are expressed below.
The Engine 100 of FIG. 1

Referring now to FIG. 1, there is shown a six cylinder reciprocating internal combustion engine $100^1$ in which all of the cylinders 7a–7f (only one of which is shown in a sectional view) and associated pistons 22a–22f operate in a 410 stroke cycle and all power cylinders are used for producing power to a common crankshaft 20 via connecting rods 19a–19f, respectively. An ancillary compressor 2 (herein depicted as a Lysholm rotary compressor) selectably supplies air which has been compressed, or allows delivery of air therethrough at atmospheric pressure, to manifolds 13 and 14 and to cylinders 7a–7f, which cylinders operate in a 4-stroke cycle. Valves 3, 5 and 6 and intercoolers 10, 11 and 12 are used, in the preferred embodiments, to control air charge density, weight, temperature and pressure. The intake valves 16a–16f, 16a'–16f' are timed to control the compression ratio of the engine $100^1$. The combustion chambers are sized to establish the expansion ratio of the engine.

Figure 2:
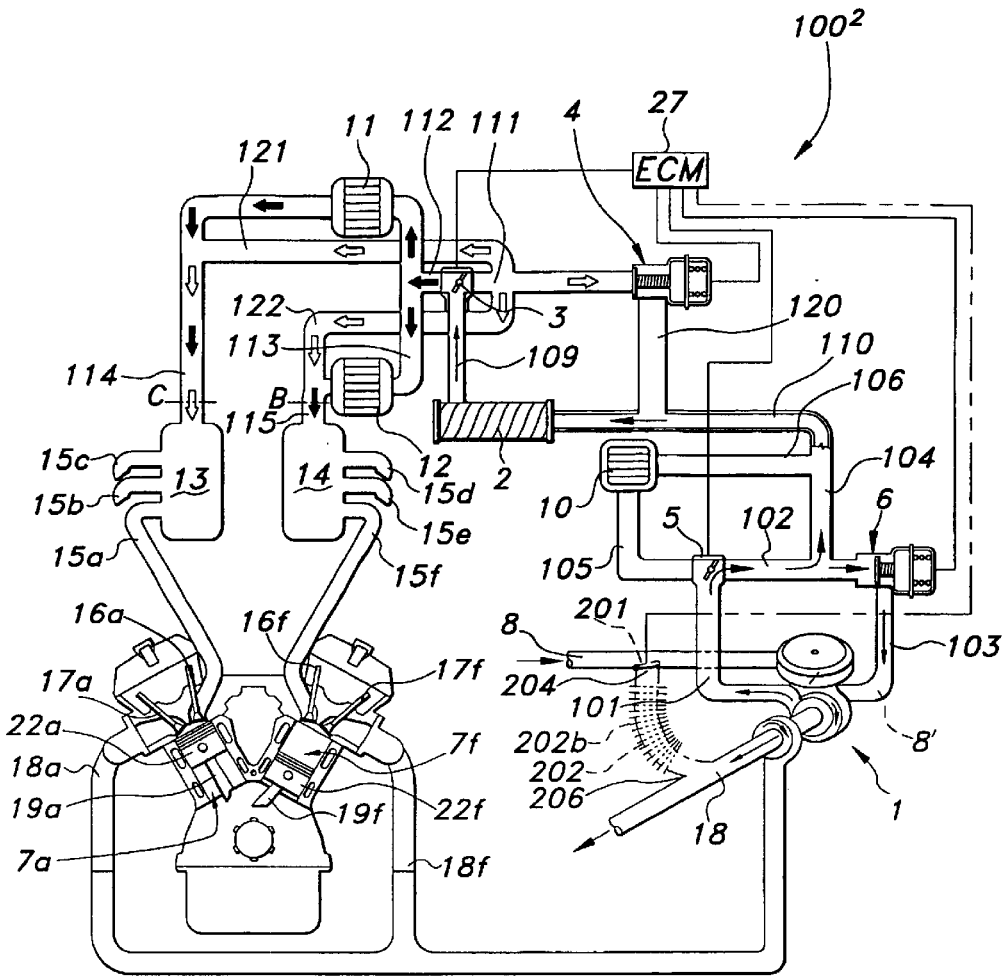
FIG. 2 is a schematic drawing of a six cylinder internal combustion engine similar to the engine of FIG. 1, operating in a 4-stroke cycle, and representing a second embodiment of the apparatus of the present invention from which a second method of operation can be performed and will be described. Among its other components, this embodiment is seen as having two compressors, three intercoolers, four control valves, dual air paths for both the primary and the ancillary compressors, dual manifolds and showing a means of controlling charge-air pressures, density and temperatures.
Figure 3:
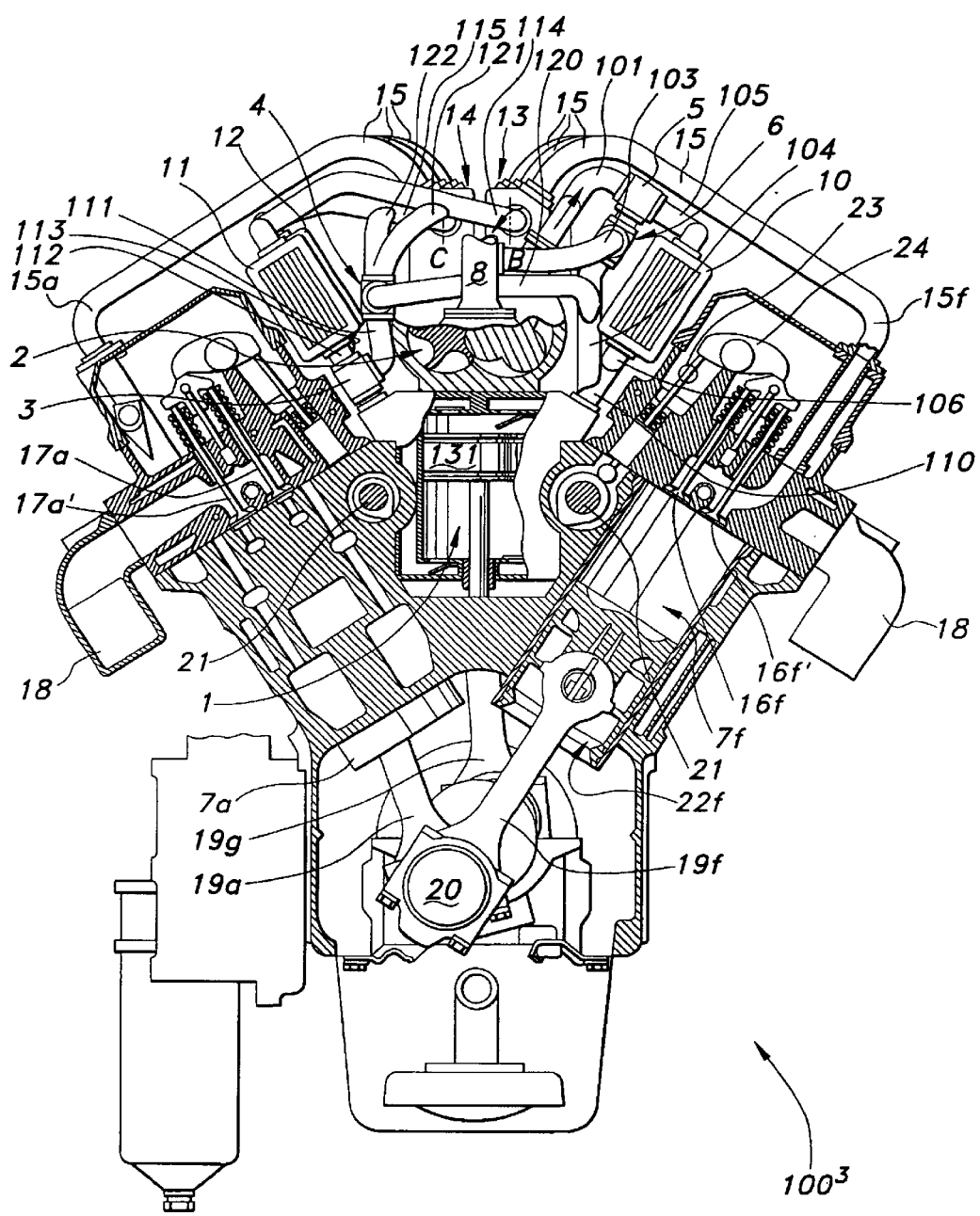
FIG. 3 is a perspective view (with portions in cross-section) of the cylinder block and head of a six cylinder internal combustion engine operating in a 4-stroke cycle, and representing a third embodiment of the apparatus of the present invention from which a third method of operation can be performed and will be described.

The engines $100^1$–$100^5$, $100^7$ of FIG. 1, FIG. 2, FIG. 3, FIG. 4, FIG. 5, and FIG. 7, respectively, have camshafts 21 fitted with cams and are arranged to be driven at one-half the speed of the crankshaft in order to supply one power stroke for every two revolutions of the crankshaft, for each power piston. The rotary compressors 2 of FIG. 1, FIG. 2, FIG. 3, FIG. 4, FIG. 4-B, FIG. 5, FIG. 7 and FIG. 33 can be driven by a ribbed V-belt and would have a step-up gear between the V pulley and the compressor drive shaft, the rotary compressors could also be fitted with a variable-speed step-up gear as in some aircraft engines. The reciprocating compressor 1 of FIG. 3 is shown as having double-acting cylinders linked to the crankshaft 20 by a connecting rod 19g; and the crankshaft 20 to which it is linked by connecting rod 19g would supply two working strokes for each revolution of the crankshaft 20. In one alternate approach, the reciprocating compressor 1 is driven by the connecting rod 19g being connected to a short crankshaft above the main crankshaft 20 to which the ancillary crankshaft (not shown) would be geared by a step-up gear in order to provide more than two working strokes per revolution of the main crankshaft 20. Alternatively, the compressor system can have multiple stages of compression for either rotary or reciprocating compressors. Whereas, the ancillary compressor 1 and second ancillary compressor 2 of the various embodiments are depicted throughout as a reciprocating compressor or a rotary compressor, it is noted that the invention is not limited by the type of compressor utilized for each; and the depicted compressors may be interchanged, or may be the same, or may be other types of compressors performing the functions described herein.

The engine $100^1$ shown in FIG. 1 is characterized by a more extensive expansion process, a low compression ratio and the capability of producing a combustion charge varying in weight from lighter-than-normal to heavier-than-normal, and capable of providing, selectively, a mean effective cylinder pressure higher than can the conventional arrangement of normal engines but capable of having a lower maximum cylinder pressure in comparison to conventional engines. An engine control module (ECM) (not shown in FIG. 1) and variable valves 3, 5 and 6 on conduits, as shown, provide a system for controlling the charge density, pressure, temperature, and the mean and peak pressure within the cylinder which allows greater fuel economy, production of greater torque and power at low RPM, with low polluting emissions for both spark and compression-ignited engines. In alternate embodiments, a variable valve timing system can be used and, with a control system such as an ECM, can control the time of opening and the time of closing of the intake valves 16 and 16' to further provide an improved management of conditions in the combustion chambers of cylinders 7a–7f of the engine $100^1$ to allow for a flatter torque curve and higher power, when needed, and with low levels of both fuel consumption and polluting emissions.
Brief Description of Operation of the Engine $100^1$ Shown in FIG. 1

The engine $100^1$ of this invention shown in FIG. 1 is a high efficiency engine that attains both high power and torque with low fuel consumption and low polluting emissions. The new working cycle is an external compression type combustion cycle. In this cycle, part of the intake air (all of which is compressed in the power cylinders in conventional engines) is, selectively, compressed by at least one ancillary compressor 2. The temperature rise during compression can be suppressed by use of air coolers 10, 11, 12 which cool the intake air, and by a shorter compression stroke.

One suggested, preferred method of operation of the new-cycle engine $100^1$ is thus:

1. Depending upon the power requirements of the engine (e.g. differing load requirements), either intake air at atmospheric pressure or intake air that has been compressed by at least one ancillary compressor 2 and has had its temperature and pressure controlled by bypass systems and charge-air coolers, is drawn into the power cylinder 7 by the intake stroke of piston 22.
2. (a) After the intake stroke is complete, the intake valve 16 (which can be single or multiple, 16, 16') is left open for a period of time after the piston 22 has passed bottom dead center, which pumps part of the fresh air charge back into the intake manifold 13, 14. The intake valve 16, 16' is then closed at a point which action seals the cylinder 7, thus establishing the compression ratio of the engine.
    (b) Alternatively, the intake valve 16, 16' is closed early, during the intake stroke, before the piston 22 has reached bottom dead center. The trapped air charge is then expanded to the full volume of the cylinder 7 and compression of the charge starts when the piston 22 returns to the point in the compression stroke at which the intake valve 16, 16' closed.

3. (a) During the compression stroke of piston 22, at the point the intake valve 16 closed, either in 2(*a*) or 2(*b*) operation, compression begins, producing a small compression ratio. This makes it possible to restrain the temperature rise during the compression stroke.

(b) During light-load operation, such as in vehicle cruising or light-load power generation, the shutter valve 5 is closed and the air bypass valve (ABV) 6 on the compressor is, preferably opened so that the intake air is returned to the intake conduit 8 of the compressor 2 without being compressed. Shutter valve 3 can then direct the air charge around or through intercoolers 11 and 12. During this time, the engine pistons 22*a*–22*f* are drawing in naturally aspirated air through the compressor 2. This reduces compressor drive work and improves fuel economy.

(c) When more power is required, the charge density and pressure can be increased by closing air bypass valve (ABV) 6 causing compressor 2 to raise the air pressure and, alternatively, this can be accomplished by either cutting in a second stage of compression by compressor 1, as shown in FIG. 2, or by increasing the speed of compressor 2. At the same time, control valves 5 and 3 preferably, direct some or all of the air charge through one or more of intercoolers 10, 11, and 12 in order to increase charge-air density.

4. Compression continues, fuel is added, if not already present, the charge is ignited and combustion produces a large expansion of the gases against the piston 22 producing great energy in either mode 3(*a*), (*b*) or (*c*). This energy produces a high mean effective cylinder pressure and is converted into high torque and power, especially in mode (c).

Detailed Description of Operation of the Engine 100[1] of FIG. 1

During the intake (1st) stroke of the piston 22 air flows through air conduits 15 from a manifold of air 13 or 14, which air (depending on power requirements) is either at atmospheric pressure or has been compressed to a higher pressure by compressor 2, through the intake valve 16 into the cylinder 7. During the intake stroke of piston 22 the intake valve 16 closes early (at point x). From this point, the cylinder 7 contents are expanded to the maximum volume of the cylinder. Then, during the compression (2nd) stroke, no compression takes place until the piston 22 has returned to the point x where the intake valve 16 was closed during the intake stroke. (At point x, the remaining displaced volume of the cylinder is divided by the volume of the combustion chamber, to establish the compression ratio of the engine.) Alternatively, during the intake (1st) stroke of piston 22, the intake valve 16 is held open through the intake stroke and past bottom dead center piston position, and through part of the compression (2nd) stroke for a significant distance, 10% or, to perhaps 50% or more of the compression stroke, thus pumping some of the charge-air back into intake manifold 13 or 14, and the intake valve 16 then closes to establish a low compression ratio in the cylinders of the engine. At the time of closure of intake valve 16, the density, temperature and pressure of the cylinder will be at approximate parity with the manifold 13 or 14 contents.

During light-load operation, such as in vehicle cruising or light-load power generation, the shutter valves 5 and 3 are closed and the air bypass valve (ABV) 6 on the compressor is, preferably, opened so that the intake air is returned to the intake conduit 8 of the compressor 2 without being compressed. During this time the engine pistons 22*a*–22*f* are drawing in naturally aspirated air through the compressor 2. This reduces compressor drive work and improves fuel economy.

When medium torque and power is needed, such as highway driving or medium electric power generation, preferably the shutter valve 5 to compressor 2 is closed and the air bypass valve (ABV) 6 is closed also. This causes the atmospheric pressure intake air to cease re-circulating through the compressor 2 and the compressor 2 begins to compress the charge-air to a higher-than-atmospheric pressure, while the closed shutter valves 5 and 3 direct the charge-air through conduits 104, 110, 111, and 121/122 bypassing the air coolers 10, 11 and 12, with the charge-air going directly to the manifolds 13 and 14 to power cylinders 7*a*–7*f* where the denser, but hot, charge increases the mean effective cylinder pressure of the engine to create greater torque.

When more power is needed, such as when rapid acceleration is needed or for heavy-load electric power generation, preferably the air bypass valve (ABV) 6 is closed and the shutter valves 3 or 5 or both are opened. This causes the compressor 2 to compress all of the air charge. Shutter valves 3 or 5 or both then supply (depending on the respective opened/closed conditions of valves 3 and 5), the conditioned air charge through conduits 105 or 104, to conduit 110, and then through conduits 111 or 112 to the manifolds, 13, 14 and to the cylinders 7*a*–7*f* via one, two, or all three of the charge coolers 10, 11 and 12. The very dense cooled air charge when mixed with fuel and ignited and expanded beyond the compression ratio of the engine produces great torque and power.

When greater power is needed the charge-air density and weight can be increased by increasing the speed of the compressor 2 or by cutting in a second compressor as in FIG. 2, for a second stage of pre-compression. The latter can be done by the engine control module 27 signaling air bypass valve (ABV) 6, FIG. 2. to close to-prevent re-circulation of part of the intake air into conduit 103 which negates, selectively, any second compression stage during light-load operation. At the time air density and pressure is increased, shutter valves 3 and 5 can direct part of all of the air charge through intercoolers 10, 11 and 12 in order to condense the charge and lessen the increase in the charge temperature and pressure, both accomplished by the cooling of the charge. This increases the mean effective cylinder pressure during combustion for high torque and power.

The heavier the weight of the air charge and the denser the charge, the earlier in the intake stroke (or the later in the compression stroke) the intake valve can be closed to establish a low compression ratio and retain power, and the less heat and pressure is developed during compression in the cylinder. In this 4-stroke engine the intake charge can be boosted in pressure by as much as 4–5 atmospheres and if the compression ratio is low enough, say 4:1 to 8:1 (higher for diesel fuel), even spark-ignited there would be no problem with detonation. The expansion ratio should still be large, 14:1 would be a preferred expansion ratio for spark ignition, perhaps 19:1 for diesel operation.

The compression ratio is established by the displaced volume of the cylinder 7 remaining after point x has been reached in the compression stroke (and intake valve 16 is closed) being divided by the volume of the combustion chamber. The expansion ratio in all cases is greater than the compression ratio. The expansion ratio is established by dividing the total displaced volume of the cylinder by the volume of the combustion chamber.

Fuel can be carbureted, or it can be injected in a throttle-body 56 (seen in FIG. 16), or the fuel can be injected into the inlet stream of air, injected into a pre-combustion chamber (FIG. 21) or, injected through the intake valve 16, or it may be injected directly into the combustion chamber. If injected, it should be at or after the piston 22 has reached point x and the intake valve is closed. The fuel can also be injected later, similar to diesel operation, and can be injected at the usual point for diesel oil injection, perhaps into a pre-combustion chamber or directly into the combustion chamber or directly onto a glow plug. Some fuel can be injected after top dead center even continuously during the first part of the expansion stroke for a mostly constant pressure combustion process.

Ignition can be by compression (which may be assisted by a glow plug), or by electric spark. Spark ignition can take place before top dead center, as normally done, at top dead center or after top dead center.

At an opportune time the air-fuel charge is ignited and the gases expand against the piston for the power (3rd) stroke. Near bottom dead center at the opportune time exhaust valve(s) 17 open and piston 22 rises in the scavenging (4th) stroke, efficiently scavenging the cylinder by positive displacement, after which exhaust valve(s) 17 closes.

This completes one cycle of the 4-stroke engine.

The Engine $100^1$ of FIG. 2

Referring now to FIG. 2, there is shown a six cylinder reciprocating internal combustion engine $100^2$ in which all of the cylinders 7a–7f (only two 7a, 7f of which are shown in a schematic drawing) and associated pistons 22a–22f operate in a 4-stroke cycle and all power cylinders are used for producing power to a common crankshaft 20 via connecting rods 19a–19f, respectively. An ancillary compressor 2 (herein depicted as a rotary compressor) supplies air which has been compressed, or allows delivery of air therethrough at atmospheric pressure, to manifolds 13 and 14 and to cylinders 7a–7f which cylinders operate in a 4-stroke cycle. A second ancillary compressor 1 is used, selectively, to boost the air pressure to compressor 2. Valves 3, 4, 5 and 6 and intercoolers 10, 11 and 12 are used in the preferred embodiments, to control air charge density, weight, temperature and pressure. The intake valves 16a–16f are timed to control the compression ratio of the engine $100^2$. The combustion chambers are sized to establish the expansion ratio of the engine.

The engine $100^2$ shown in FIG. 2 is characterized by a more extensive expansion process, a low compression ratio and the capability of producing a combustion charge varying in weight from lighter-than-normal to heavier-than-normal, and capable of selectively providing a mean effective cylinder pressure higher than can the conventional arrangement of normal engines but having similar or lower maximum cylinder pressure in comparison to conventional engines. An engine control module (ECM) 27 and variable valves 3, 4, 5 and 6 on conduits, as shown, provide a system for controlling the charge density, pressure, temperature, and the mean and peak pressure within the cylinder which allows greater fuel economy, production of greater torque and power at low RPM, with low polluting emissions for both spark and compression-ignited engines. In alternate embodiments, a variable valve timing) system can be used and, with a control system such as an engine control module (ECM) 27, can control the time of opening, and the time of closing of the intake valves 16 to further provide an improved management of conditions in the combustion chambers of cylinders 7a–7f of the engine $100^2$ to allow for a flatter torque curve and higher power, and with low levels of both fuel consumption and polluting emissions.

Brief Description of Operation of the Engine $100^2$ of FIG. 2

The engine $100^2$ of this invention shown in FIG. 2 is a high efficiency engine that attains both high power and torque with low fuel consumption and low polluting emissions. The new working cycle is an external compression type combustion cycle. In this cycle, part of the intake air (all of which is compressed in the power cylinders in conventional engines) is compressed, selectively, by at least one ancillary compressor 1, 2. The temperature rise during compression can be suppressed by use of air coolers 10, 11, 12, which cool the intake air, and by a shorter compression stroke.

One suggested, preferred method of operation of the new-cycle engine $100^2$ is thus:

1. Depending upon the power requirements of the engine (e.g., differing load requirements), either intake air at atmospheric pressure or intake air that has been compressed by at least one ancillary compressor and has had its temperature and pressure adjusted by bypass systems and charge-air coolers, is drawn into the power cylinder 7 by the intake stroke of piston 22.

2. (a) After the intake stroke is complete, the intake valve 16 (which can be single or multiple) is left open for a period of time after the piston 22 has passed bottom dead center which pumps part of the fresh air charge back into the intake manifold 13,14. The intake valve 16 is then closed at a point which action seals cylinder 7, thus establishing the compression ratio of the engine.

(b) Alternatively, the intake valve 16 is closed early, during the intake stroke, before the piston 22 has reached bottom dead center. The trapped air charge is then expanded to the full volume of the cylinder 7 and compression of the charge starts when the piston 22 reaches the point in the compression stroke at which the intake valve 16 closed.

3. (a) During the compression stroke of piston 22, at the point the intake valve 16 closed, either in 2(a) or 2(b) operation, compression begins, producing a small compression ratio. This makes it possible to lessen the temperature rise during the compression stroke.

(b) During light-load operation, such as in vehicle cruising or light-load power generation, the shutter valves 3 and 5 are closed and the air bypass valves (ABV) 4 and 6 to both compressors 1 and 2 are, preferably, opened so that the intake air is returned to the intake conduits 110 and 103 of the compressors 2 and 1 without being compressed. During this time, the engine pistons 22a–22f are drawing in naturally aspirated air past the compressor(s). This reduces compressor drive work and further improves fuel economy.

(c) When greater power is required, the charge density and pressure can be increased by closing air bypass valve (ABV) 4 causing compressor 2 to raise the charge-air pressure and, in addition, by either cutting in the second stage of compression by compressor 1 in the same manner, that of closing air bypass valve ABV 6, or by increasing the speed of compressor 2 or of both compressors. At the same time, shutter valves 3 and 5 would be opened to direct some or all of the air charge through intercoolers 10, 11 and 12 in order to increase charge-air density.

4. Compression continues, fuel is added if not already present, the charge is ignited and combustion produces a large expansion of the gases against piston 22 producing great energy in either mode 3(*a*), (*b*) or (*c*). This energy produces a high mean effective cylinder pressure and is converted into high torque and power, especially in mode (c).

Detailed Description of Operation of the Engine $100^2$ of FIG. 2

During the intake (1 st) stroke of the piston 22 air flows through air conduits 15 from the manifold 13 or 14 of air which air (depending on power requirements) is either at atmospheric pressure or has been compressed to a higher pressure by compressor 2 and/or compressor 1, through the intake valve 16 into the cylinder 7. During the intake stroke of piston 22 the intake valve 16 closes at point x sealing cylinder 7. From this point the air charge is expanded to the maximum volume of the cylinder. Then during the compression (2nd) stroke, no compression takes place until the piston 22 has returned to the point x where the intake valve 16 was closed during the intake stroke. (At point x, the remaining displaced volume of the cylinder is divided by the volume of the combustion chamber, to establish the compression ratio of the engine.) Alternatively, during the intake (1st) stroke of piston 22, the intake valve 16 is held open through the intake stroke and passed bottom dead center, and through part of the compression (2nd) stroke for a significant distance, 10% or, to perhaps 50% or more of the compression stroke, thus pumping some of the charge-air back into intake manifold 13 or 14, and the intake valve 16 then closes, sealing cylinder 7, to establish a low compression ratio in the cylinders of the engine. At the time of closure of intake valve 16, the density, temperature and pressure of the cylinder 7 contents will be approximately the same as that of the air charge in the intake manifolds 13 and 14.

During light-load operation, such as in vehicle cruising or light-load power generation, the shutter valves 3 and 5 are closed and the air bypass valves (ABV) 4 and 6 to both compressors 1 and 2 are, preferably opened so that the intake air is returned to the intake conduits 110 and 103 of the compressors 2 and 1 without being compressed. During this time the engine pistons 22a–22f are drawing in naturally aspirated air past the compressor(s). This reduces compressor drive work and further improves fuel economy.

When medium torque and power is needed, such as highway driving or medium electric power generation, preferably the shutter valves 3 and 5 are closed and the air bypass valves (ABV) 4 and 6 are closed. This causes the atmospheric pressure intake air to cease re-circulating through the compressor 2 and 1 and both compressors begin to compress the charge-air to a higher-than-atmospheric pressure, while the closed shutter valves 3 and 5 direct the charge-air through conduits 104, 110, 111, and 121/122 bypassing the air coolers 10, 11 and 12, in FIG. 2, with the charge-air going directly to the manifold 13 and 14 and to power cylinders 7a–7f where the denser, but hot, charge increases the mean effective cylinder pressure of the engine to create greater torque and power.

When more power is needed, such as when rapid acceleration is needed or for heavy-load electric power generation, preferably the air bypass valve (ABV) 4 is closed and the shutter valve 3 is opened. This causes the compressor 2 to compress all of the air charge and shutter valve 3 directs the air charge through conduits 112 and 113 and the compressed charge-air is supplied to the manifolds 13 and 14 and to the cylinders 7a–7f via the charge coolers 11 and 12. For even greater power the shutter valve 5 is opened and the air bypass valve 6 is closed and compressor 1 begins a second stage of compression, and all of the air charge is now directed through intercoolers 10, 11 and 12 for high charge density. The very dense cooled air charge when mixed with fuel and ignited and expanded beyond the compression ratio of the engine produces great torque and power.

The heavier the weight of the air charge and the denser the charge, the earlier (or later) the intake valve can be closed to establish a low compression ratio and retain power, and the less heat and pressure is developed during compression in the cylinder. In this 4-stroke engine the intake charge can be boosted in pressure by as much as 4–5 atmospheres and if the engine's compression ratio is low enough, say 4:1 to 8:1 (higher for diesel fuel), even spark-ignited there would be no problem with detonation. The expansion ratio would still be very large, 14:1 would be a preferable expansion ratio for spark ignition, perhaps 19:1 for diesel operation.

The compression ratio is established by the displaced volume of the cylinder 7 remaining after point x has been reached in the compression stroke (and intake valve 16 is closed) being divided by the volume of the combustion chamber. The expansion ratio in all cases is greater than the compression ratio. The expansion ratio is established by dividing the total displaced volume of the cylinder by the volume of the combustion chamber.

Figure 21:
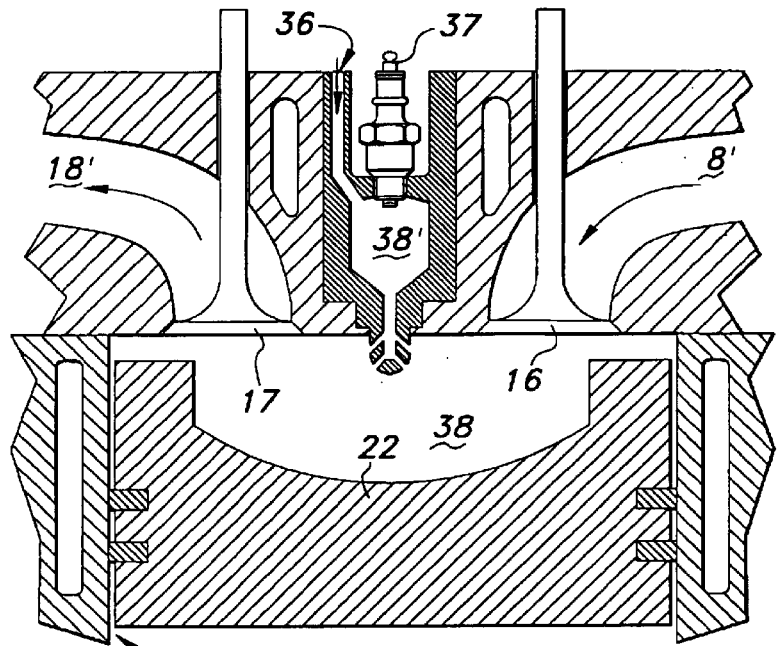
FIG. 21 is a schematic transverse sectional view of a pre-combustion chamber, a combustion chamber and associated fuel inlet ducts and valving suggested for gaseous or liquid fuel operation for the engines of this invention or for any other internal combustion engine.

Fuel can be carbureted, or it can be injected in a throttle-body 56 (seen in FIG. 16), or the fuel can be injected into the inlet stream of air, injected into a pre-combustion chamber as in FIG. 21 or, injected through the intake valve 16, or it may be injected directly into the combustion chamber. If injected, it should be at or after the piston 22 has reached point x and the intake valve is closed. The fuel can also be injected later and in the case of diesel operation can be injected at the usual point for diesel oil injection, perhaps into a pre-combustion chamber or directly into the combustion chamber or directly onto a glow plug.

At an opportune time the air-fuel charge is ignited and the gases expand against the piston for the power (3rd) stroke. Near bottom dead center at the opportune time exhaust valve(s) 17 open and piston 22 rises in the scavenging (4th) stroke, efficiently scavenging the cylinder by positive displacement, after which the exhaust valve(s) closes.

This completes one cycle of the 4-stroke engine.

The Engine $100^3$ of FIG. 3

Referring now to FIG. 3, there is shown a six cylinder reciprocating internal combustion engine $100^3$ in which all of the cylinders 7a–7f (only one of Which is shown in a sectional view) and associated pistons 22a–22f operate in a 4-stroke cycle and all power cylinders are used for producing power to a common crankshaft 20 via connecting rods 19a–19f, respectively. An ancillary reciprocating compressor 1 and an ancillary rotary compressor 2 supply pressurized charge air which has been compressed, or allow deliver of air therethrough at atmospheric pressure, to manifolds 13, 14 and to cylinders 7a–7f, which cylinders operate in a 4-stroke cycle. Valves 3, 4, 5 and 6 and intercoolers 10, 11 and 12 are used, in the preferred embodiments, to control air charge density, weight, temperature and pressure. The intake valves 16 are timed to control the compression ratio of the engine $100^3$. The combustion chambers are sized to establish the expansion ratio of the engine.

The engine $100^3$ shown in FIG. 3 is characterized by a more extensive expansion process, a low compression ratio and the capability of producing a combustion charge varying in weight from lighter-than-normal to heavier-than-normal, and capable of selectively providing a mean effective cylinder pressure higher than can the conventional arrangement of normal engines but having similar or lower maximum cylinder pressure in comparison to conventional a engines. An engine control module (ECM) 27 and variable valves 3, 4, 5 and 6 on conduits, as shown, provide a system for controlling the charge density, pressure, temperature, and the mean and peak pressure within the power cylinder 7 which allows greater fuel economy, torque and power at low RPM, with low polluting emissions for both spark and compression-ignited engines. In alternate embodiments, a variable valve timing system can be used and, with a control system such as an engine control module (ECM) 27, can control the time of opening and the time of closing of the intake valves 16 to further provide an improved management of conditions in the combustion chambers of cylinders 7a–7f of the engine $100^3$ to allow for a flatter torque curve and high power and with low levels of both fuel consumption and polluting emissions.

Brief Description of Operation of the Engine $100^3$ of FIG. 3

The engine $100^3$ of this invention shown in FIG. 3 is a high efficiency engine that attains both high power and torque with low fuel consumption and low polluting emissions. The new working cycle is an external compression type combustion cycle. In this cycle part of the intake air (all of which is compressed in the power cylinders in conventional engines) is selectively compressed by at least one ancillary compressor 1, 2. The temperature rise during compression can be suppressed by use of air coolers 10, 11, 12, which cool the intake air, and by a shorter compression stroke.

One suggested, preferred method of operation of the new-cycle engine $100^3$ is thus:

1. Depending upon the power requirements of the engine (e.g., differing load requirements), either intake air at atmospheric pressure or intake air that has been compressed by at least one ancillary compressor and has had its temperature and pressure adjusted by bypass systems and charge-air coolers, is drawn into the power cylinder 7 by the intake stroke of piston 2. (a) After the intake stroke is complete the intake valve 16 (which can be single or multiple, 16, 16') is left open for a period of time after the piston 22 has passed bottom dead center which pumps part of the fresh air charge back into the intake manifolds 13, 14. The intake valve 16 is then closed at a point which seals cylinder 7, thus establishing the compression ratio of the engine.

(b) Alternatively, the intake valve 16 is closed early, during the intake stroke, before the piston 22 has reached bottom dead center. The trapped air charge is then expanded to the full volume of the cylinder 7 and compression of the charge starts when the piston 22 reaches the point in the compression stroke at which the intake valve 16 closed.

3. (a) During the compression stroke of piston 22, at the point the intake valve 16 closed, either in 2(a) or 2(b) operation, compression begins, producing a small compression ratio. This makes it possible to lessen the temperature rise during the compression stroke.

(b) During light-load operation, such as in vehicle cruising or light-load power generation, the shutter valves 3 and 5 are closed and the air bypass valves (ABV) 4 and 6 on both compressors 1 and 2 are, preferably, opened so that the intake air is returned to the intake conduits 110 and 8 of the compressors 1 and 2 without being compressed. During this time the engine pistons 22a–22f are drawing in naturally aspirated air past the compressor(s). This reduces compressor drive work and further improves fuel economy.

(c) When greater power is required, the charge density and pressure can be increased by closing air bypass valve (ABV) 4 causing compressor 1 to raise the charge-air pressure and, in addition, by either cutting in the second stage of compression by compressor 2, if needed, in the same manner, that of closing ABV valve 6, or by increasing the speed of compressors 1 or 2, or both. At the same time, shutter valves 3 and 5 would direct some or all of the air charge through intercoolers 10, 11, and 12 in order to increase charge-air density.

4. Compression continues, fuel is added if not already present, the charge is ignited and combustion produces a large expansion of the gases against piston 22 producing great energy in either mode 3(a), (b) or (c). This energy produces a high mean effective cylinder pressure and is converted into high torque and power, especially in mode (c).

Detailed Description of Operation of the Engine $100^3$ of FIG. 3

During the intake (1st) stroke of the piston 22 air flows through air conduits 15 from the manifold 13 or 14 of air which air (depending on power requirements) is either at atmospheric pressure or has been compressed to a higher pressure by compressor 1 or 2 through the intake valve 16 into the cylinder 7. During the intake stroke of piston 22 the intake valve 16 closes (at point x). From this point the cylinder contents are expanded to the maximum volume of the cylinder. Then during the compression (2nd) stroke, no compression takes place until the piston 22 has returned to the point x where the intake valve 16 was closed, sealing the cylinder 7, during the intake stroke. (At point x, the remaining displaced volume of the cylinder is divided by the volume of the combustion chamber, to establish the compression ratio of the engine.) Alternatively, during the intake (1st) stroke of piston 22, the intake valve 16 can be held open through the intake stroke passed bottom dead center, and through part of the compression (2nd) stroke for a significant distance, 10% to perhaps 50% or more of the compression stroke pumping some of the charge-air back into intake manifold, and the intake valve 16, 16' then closes to establish a low compression ratio in the cylinders of the engine.

During light-load operation, such as in vehicle cruising or light-load power generation, the shutter valves 3 and 5 are closed and the air bypass valves (ABV) 4 and 6 on both compressors 1 and 2 are, preferably, opened so that the intake air is returned to the intake conduits 110 and 8 of the compressors 1 and 2 without being compressed. During this time the engine pistons 22a–22f are drawing in naturally aspirated air past the compressor(s). This reduces compressor drive work and further improves fuel economy.

When medium torque and power is needed, such as highway driving or medium electric power generation, preferably the shutter valve 3 to compressor 1 is opened, the air bypass valve (ABV) 4 is closed and ABV 6 remains open. This causes the atmospheric pressure intake air to cease re-circulating through the compressor 1; and the compressor 1, alone, begins to compress the charge-air to a higher-than-atmospheric pressure, while the closed shutter valves 3 and 5 directs the charge-air through conduits 104, 110, 111, and 121/122 bypassing the air coolers 10, 11 and 12, in FIG. 3, with the charge-air going directly to the manifolds 13 and 14 and to power cylinders 7a–7f where the denser heated charge increases the mean effective cylinder pressure of the engine to create greater torque and power.

When more power is needed, such as when rapid acceleration is needed or for heavy-load electric power generation, preferably the air bypass valves (ABV) 4 and 6 are closed and the shutter valves 3 and 5 are opened on both compressors. This causes the compressors 1 and 2 to compress all of the air charge and shutter valves 3 and 5 direct the air charge away from conduit 8 and through the compressors 1 and 2, and the compressed charge-air is then supplied through conduits 105, 106, 110, 112, 113, 114 and 115 to the manifolds 13 and 14 and to the cylinders 7a–7f via the charge coolers 10, 11 and 12. The very dense cooled air charge when mixed with fuel and ignited and expanded beyond the compression ratio of the engine produces great torque and power.

The heavier the weight of the air charge and the denser the charge, the earlier in the intake stroke (or the later in the compression stroke) the intake valve can be closed to establish a low compression ratio and retain power, and the less heat and pressure is developed during compression in the cylinder. In this 4-stroke engine the intake charge can be boosted in pressure by as much as 4–5 atmospheres and if the compression ratio is low enough, say 4:1 to 8:1 (higher for diesel fuel), even spark-ignited there would be no problem with detonation. The expansion ratio would still be very large, 14:1 would be a preferred expansion ratio for spark ignition, perhaps 19:1 for diesel operation.

The compression ratio is established by the displaced volume of the cylinder 7 remaining after point x has been reached in the compression stroke (and intake valve 16 is closed) being divided by the volume of the combustion chamber. The expansion in all cases is greater than the compression ratio. The expansion ratio is established by dividing the total displaced volume of the cylinder by the volume of the combustion chamber.

Fuel can be carbureted, or it can be injected in a throttle-body, or the fuel can be injected into the inlet stream of air, injected into a pre-combustion chamber, FIG. 21, or, injected through the intake valve 16, or it may be injected directly into the combustion chamber. If injected, it should be at or after the piston 22 has reached point x and the intake valve is closed. The fuel can also be injected later and in the case of diesel operation can be injected at the usual point for diesel oil injection, perhaps into a pre-combustion chamber or directly into the combustion chamber or directly onto a glow plug.

At an opportune time the air-fuel charge is ignited and the gases expand the piston 22 for the power (3rd) stroke. Near bottom dead center at the opportune time exhaust valve(s) 17 open and piston 22 rises in the scavenging (4th) stroke, efficiently scavenging the cylinder by positive displacement, after which exhaust valve(s) 17 closes.

This completes one cycle of the 4-stroke engine.

Figure 4C:
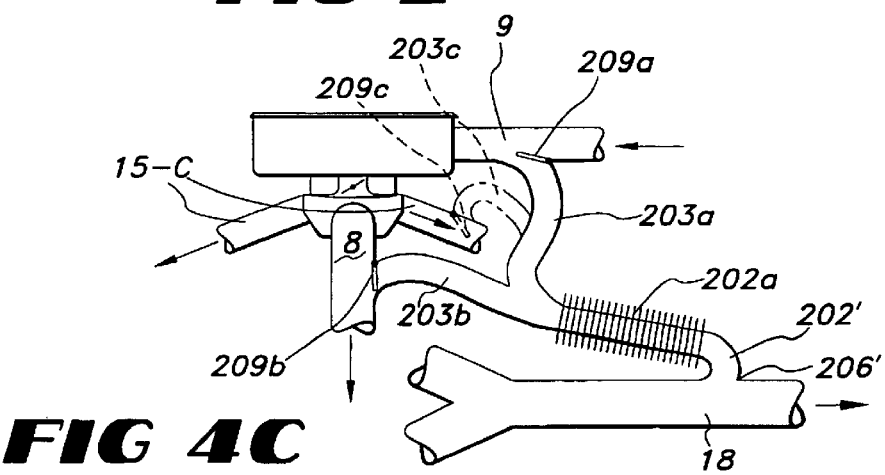
FIG. 4 is a perspective view (with portions in cross-section) of the cylinder block and head of a six cylinder internal combustion engine operating in a 4-stroke cycle, and representing a fourth embodiment of the apparatus of the present invention from which a fourth method of operation can be performed and will be described. Among its other components, this embodiment is seen as having an ancillary compressor, with two charge-air intake ducts and dual intake air routes, one of which is low pressure and one which is high pressure, and both leading to the same power cylinder, a cooling system and valves for controlling charge-air pressures, density and temperature and an ancillary atmospheric air intake system.
Figure 4:
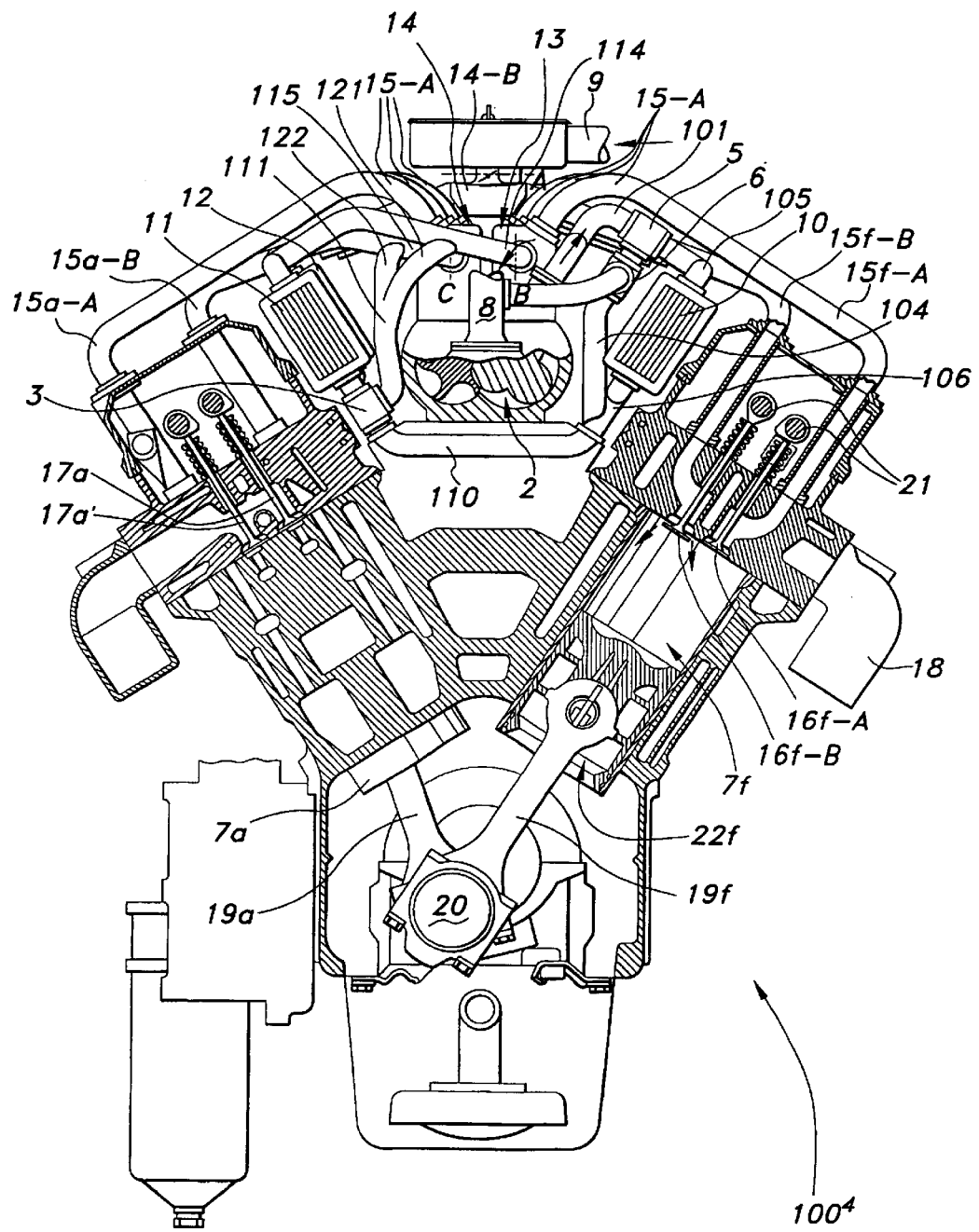

The Engine 100$^4$ of FIG. 4

Referring now to FIG. 4, there is shown a six cylinder reciprocating internal combustion engine 100$^4$ having two atmospheric air intakes 8 and 9 and corresponding intake conduits 15-A, 15-B, in which all of the cylinders (only one (7) of which is shown in a sectional view) 7a–7f and associated pistons 22a–22f operate in a 4-stroke cycle and all power cylinders are used for producing power to a common crankshaft 20 via connecting rods 19a–19f, respectively. A compressor 2, in this figure a Lysholm type rotary compressor, is shown which, with air conduits as shown, supplies pressurized air to one or more cylinder intake valves 16-A. An air inlet 8 and an ancillary air inlet 9 and inlet conduits 15-A, 15-B selectably supply air charge at atmospheric pressure or air which has been compressed to a higher pressure to separate intake valves 16-A and 16-B opening to the same cylinder 7a–7f (for example, shown here opening to cylinder 7f). Intercoolers 10, 11 and 12 and control valves 3, 5 and 6 are used, in the preferred embodiments, to control the air charge density, weight, temperature and pressure. The intake valves 16a-B–16f-B which receive air through manifold 14-B and intake conduits 15a-B to 15f-B, are timed to control the compression ratio of the engine 100$^4$. The combustion chambers are sized to establish the expansion ratio of the engine. Because of noticeable similarities between the engine 100$^4$ of FIG. 4 and that of FIG. 7 (where the auxiliary air inlet 9 system has been shown in phantom, for informational value), reference will be made as deemed helpful to FIG. 7 for certain common components.

The engine 100$^4$ shown in FIG. 4 is characterized by a more extensive expansion process, a low compression ratio and capable of producing a combustion charge varying in weight from lighter-than-normal to heavier-than-normal and capable of selectively providing a mean effective cylinder pressure higher than can the conventional arrangement in normal engines with similar or lower maximum cylinder pressure in comparison to conventional engines. Engine control module (ECM) 27 (refer, for example to FIG. 7) and variable valves 3, 5, and 6 on conduits, as shown, provide a system for controlling the charge pressure, density, temperature, and mean and peak pressure within the cylinder which allows greater fuel economy, production of greater power and torque at all RPM, with low polluting emissions for both spark and compression ignited engines. In alternate embodiments, a variable valve timing system with the ECM 27 can also control the time of opening and closing of the intake valves 16-A and/or 16-B, to further provide an improved management of conditions in the combustion chambers to allow for a flatter torque curve, and higher power, with low levels of both fuel consumption and polluting emissions.

Brief Description of Operation of the Engine 100$^4$ Shown in FIG. 4

The new cycle engine 100$^4$ of FIG. 4 is a high efficiency engine that attains both high power and torque, with low fuel consumption and low polluting emissions. The new cycle is an external compression type combustion cycle. In this cycle, part of the intake air (all of which is compressed in the power cylinders in conventional engines) is selectively compressed by an ancillary compressor 2. The temperature rise at the end of compression can be suppressed by use of air coolers 10, 11, 12, which cool the intake air, by the late injection of temperature-adjusted air, and by a shorter compression stroke.

During operation, a primary air charge is supplied to the cylinder 7 through intake valve 16-B at atmospheric pressure or air which has been increased by perhaps one-half to one atmosphere through an ancillary air inlet 9 which can be carbureted. This charge can be compressed, fuel added if not present, ignited at the appropriate point near top dead center for the power stroke—providing high fuel economy and low polluting emissions.

When more power is desired, a secondary air charge originating from air inlet 8 is, preferably, introduced into the power cylinder 7 during the compression stroke by a second intake valve 16-A which introduces a higher pressure air charge after the first intake valve 16-B has closed in order to increase the charge density when needed. After the secondary air charge has been injected, intake valve 16-A quickly closes. The primary air charge may be boosted to a higher pressure by cutting in a second ancillary compressor, in series with compressor 2, (see for example, compressor 1 in FIG. 7, where the primary compressor to be used in the engine of FIG. 4 is the compressor 2—shown in FIG. 4 and FIG. 7, for example, as a Lysholm rotary type) between air inlet 8 and manifold 13, 14, and can be intercooled. The temperature, pressure, amount and point of injection of the secondary charge, if added, is adjusted to produce the desired results. An intake valve disabler (there are several on the market, for example, Eaton Corp. and Cadillac), in preferred embodiments, may be used to disable intake valve 16-A when light-load operation does not require a high mean effective cylinder pressure. Alternatively, the air bypass valve (ABV) 6 is opened to re-circulate the charge-air back through the compressor 2 in order to relieve the compressor of compression work during light-load operation.

Figure 6:
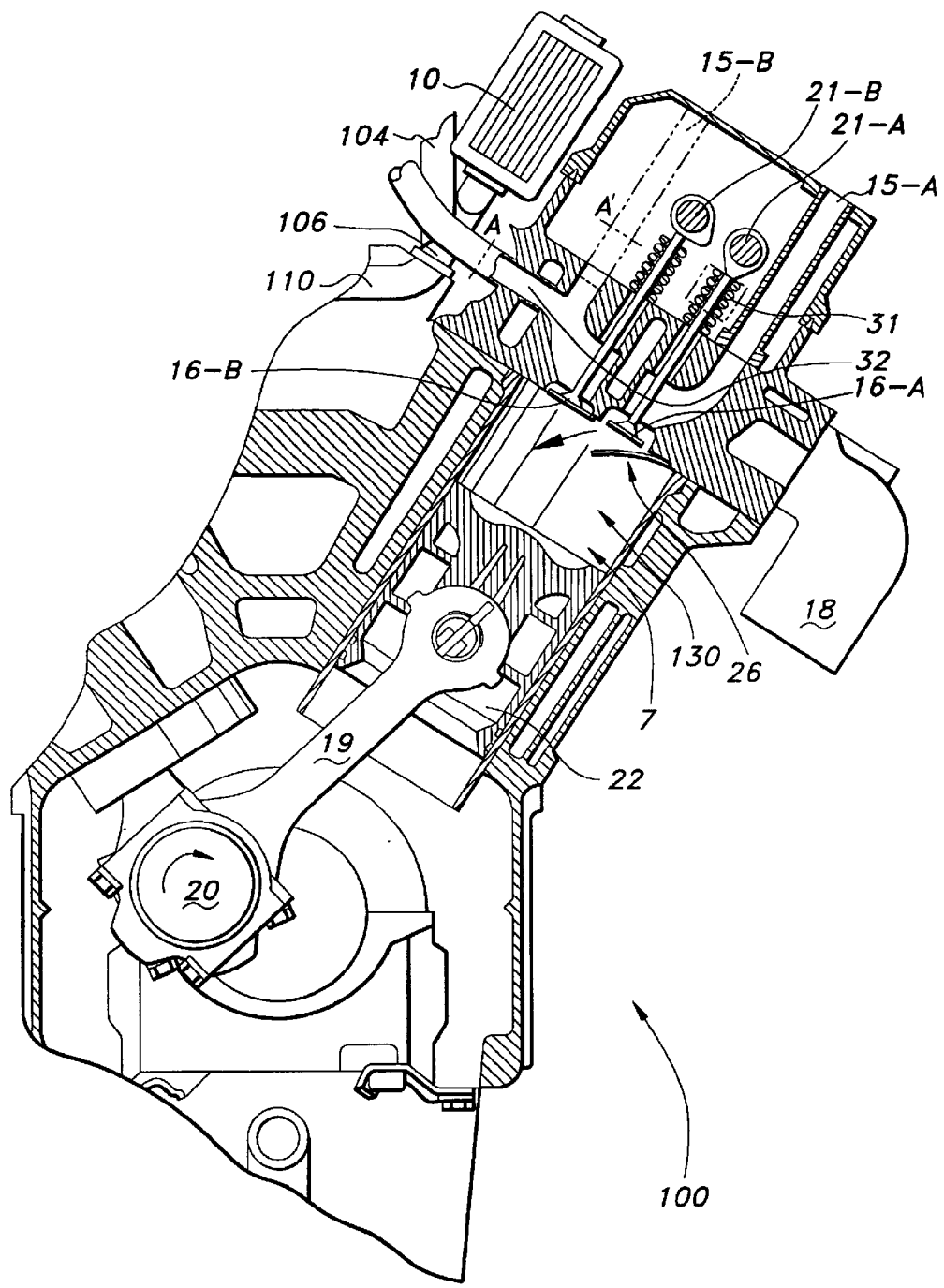
FIG. 6 is a part sectional view through one power cylinder of the 4-stroke engine of FIG. 4, FIG. 4-B, FIG. 5, FIG. 7 or FIG. 33 at the intake valves showing an alternative method (adaptable to other embodiments of the present invention) of preventing charge-air back flow and of automatically adjusting the charge pressure-ratio of the cylinder during the air charging process.

Alternatively, a one-way valve, one type of which is shown as 26 in FIG. 6 can be utilized to provide a constant or a variable "pressure ratio" in the cylinder 7, while improving swirl turbulence. In this alternate method of operation the intake valve 16-A would close very late and valve 26 would close only when the pressure in the cylinder 7 nearly equates or exceeds the pressure in conduit 15-A. Thus, the pressure in conduit 15-A, controlled by compressor speed, along with valves 3, 5 and 6 (and valve 4 in FIG. 7) would regulate the pressure, density, temperature and turbulence of the combustion process. A spring-retracted disc type, metal or ceramic, or any other type of automatic valve could replace valve 26.

Another alternate method of providing a low compression ratio, with a large expansion ratio and reduced polluting emissions is thus:

The air pressure supplied to intake runner-conduit 15-A is produced at an extremely high level, and intake valve 16-A is, in alternate embodiments, replaced by a fast-acting, more controllable valve such as but not limited to a high speed solenoid valve (not shown), which valve is, preferably, either mechanically, electrically or vacuum operated under the control of an engine control module (ECM). In such an embodiment, a smaller, denser, temperature-adjusted, high-pressure charge, with or without accompanying fuel, can, selectively, be injected, tangentially oriented, much later in the compression stroke, or even during the combustion process, in order to increase charge density, to reduce peak and overall combustion temperatures, and to create the desired charge swirl turbulence in the combustion chamber (s).

One suggested, preferred method of operation of the new-cycle engine $100^4$ is thus:

1. Depending upon the power requirements of the engine (e.g., differing load requirements), either intake air at atmospheric pressure or intake air that has been compressed by one compressor (not shown) and has had its temperature adjusted by bypass systems and charge-air coolers (not shown) is drawn into the cylinder 7 (intake stroke) through air inlet 9, manifold 14-B, intake conduits 15-B, and intake Valves 16a-B–16t-B by intake stroke of piston 22.

(a) After the intake stroke is complete the intake valve 16-B (which can be single or multiple), is left open for a period of time after the piston 22 has passed bottom dead center, which pumps part of the fresh air charge back into the intake manifold 14-B.

(b) Alternatively, the intake valve 16-B is closed early, during the intake stroke before the piston reaches bottom dead center. The trapped air charge is then expanded to the full volume of the cylinder 7.

3. (a) The compression (2nd) stroke now begins and, at the point the intake valve 16-B is closed to seal cylinder 7 in either 2(a) or 2(b) operation, compression begins (for a small compression ratio). This makes it possible to lessen the temperature rise during the compression stroke.

(b) When greater power is required a secondary compressed, temperature-adjusted air charge is injected into the cylinder 7 by intake valve 16-A which opens and closes quickly during the compression stroke at the point at which the intake valve 16-B which introduced the primary air charge closes, or later in the stroke, to produce a more dense, temperature controlled charge in order to provide the torque and power desired of the engine.

(c) Alternatively, when greater power is required, the secondary air charge can be increased in density and weight by causing shutter valves 5 and 3 to direct all or part of the air charge through one or more of intercoolers 10, 11 and 12 to increase the charge density and/or by increasing compressor speed or by cutting in a second stage of auxiliary compression, the latter two actions thereby pumping in more air on the backside. Alternatively, the timing of the closing of intake valve 16-B on either the inlet or compression stroke can be altered temporarily to retain a larger charge, and at the same time the timing of intake valve 16-A can be temporarily altered to open and close earlier during the compression stroke to provide a larger dense, temperature-adjusted air charge.

4. Compression continues, fuel is added if not present, the charge is ignited and combustion produces a large expansion of the combusted gases against the piston 22 producing great energy in either mode 3(a), (b), or (c). This energy is absorbed and turned into high torque and power, especially in mode (c).

5. Near bottom dead center of the piston, exhaust valves 17a–17f, 17a'–17f' open and the cylinder 7 is efficiently scavenged by the (4th) stroke of piston 22, after which valve(s) 17 close.

Detailed Description of the Operation of the Engine $100^4$ of FIG. 4

Figure 5:
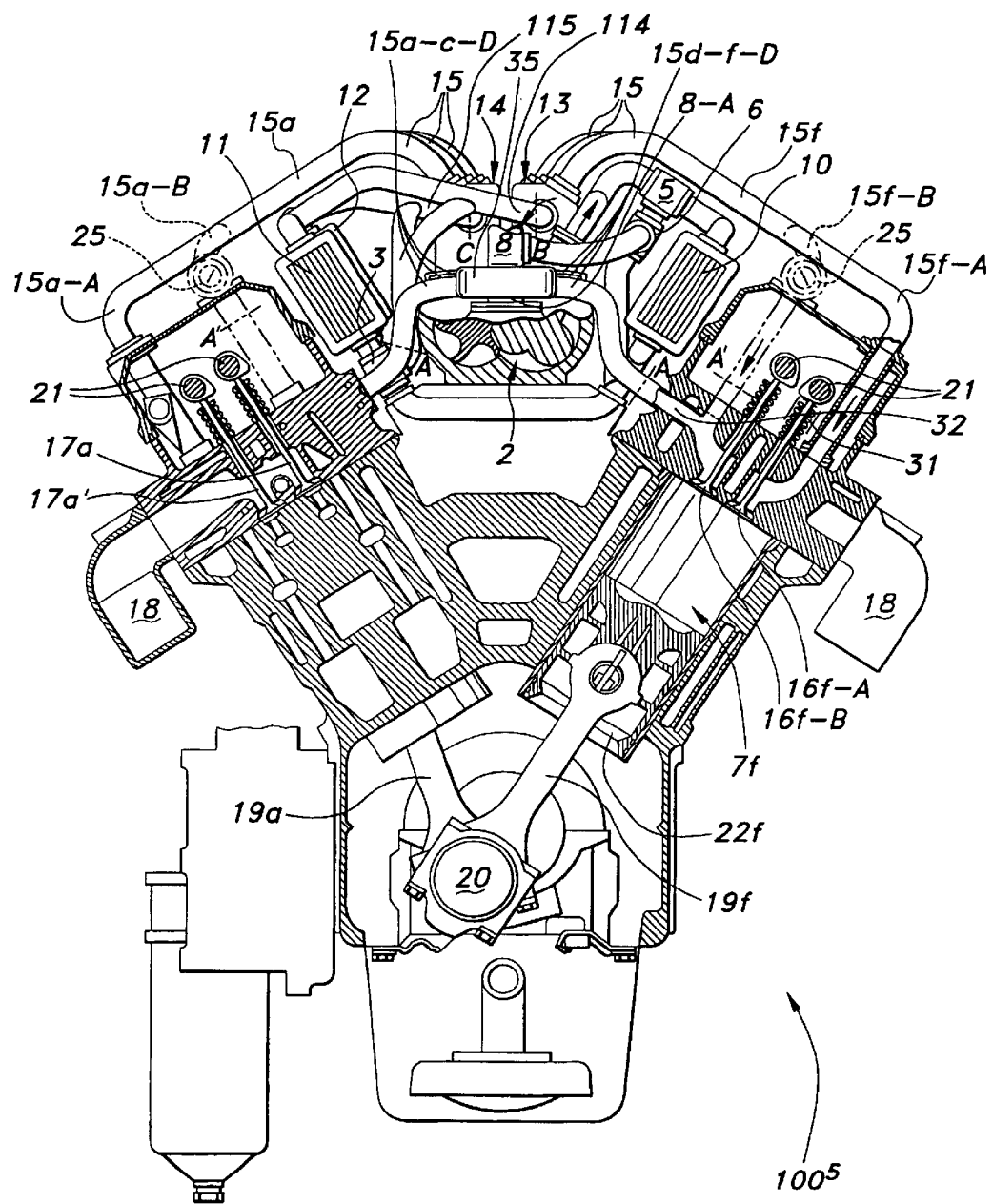
FIG. 5 is a perspective view (with portions in cross-section) of the cylinder block and head of a six cylinder internal combustion engine operating in a 4-stroke cycle, and representing a fifth embodiment of the apparatus of the present invention from which a fifth method of operation can be performed and will be described. Among its other components, this embodiment is seen as having one atmospheric air intake, an ancillary compressor with two charge-air routes, one of which is low pressure and which has two optional routes, and one which is high pressure, both leading to the same power cylinder, and control valving means and air coolers for varying charge densities, pressures and temperatures in the combustion chamber of the engine.

During the intake (1st) stroke of the piston 22 low pressure air flows through air conduit 15-B from the atmospheric air inlet 9 through manifold 14-B of air at atmospheric pressure or which has been boosted in pressure (or, alternatively, the low pressure air can be supplied by a pressure regulator valve 25 and conduit 15-B from compressed air line 15-A as shown in FIG. 5), through an intake valve 16-B into the cylinder 7. During the intake stroke of piston 22, the intake valve 16-B closes (point x). From this point the air charge in the cylinder is expanded to the maximum volume of the cylinder. Then, during the compression (2nd) stroke, no compression of the charge takes place until the piston 22 returns to point x where the inlet valve was closed. (At point x, the remaining displaced volume of the cylinder is divided by the volume of the combustion chamber, establishing the compression ratio of the engine.) At any point in the compression stroke of piston 22 at the time or after the piston 22 reaches point x a second inlet valve 16-A is, selectively, opened in order to inject a secondary pressurized air charge at a temperature, density and pressure deemed advantageous to the engine load, torque demand, fuel economy and emissions characteristics desired. Alternatively, during the intake of charge-air by intake valve 16-B, the intake valve 16-B is held open past bottom dead center for a significant distance, 10% to perhaps 50% or more of the compression stroke, thus pumping some of the charge back into the intake manifold 14-B, and then closed to establish a low compression ratio in the cylinder. During the compression stroke, at or after the time intake valve 16-B is closed, a secondary charge of high pressure, temperature-adjusted air which has been compressed by compressor 2 is, selectively, injected by a second intake valve 16-A, which opens and closes quickly, into the same cylinder 7. Alternatively, when greater torque and power are needed, the density of the secondary charge-air is greatly increased by increasing the speed of the primary compressor 2 or by cutting in another stage of compression, as in item 1, FIG. 7, and/or by routing the air charge through intercoolers.

Figure 7:
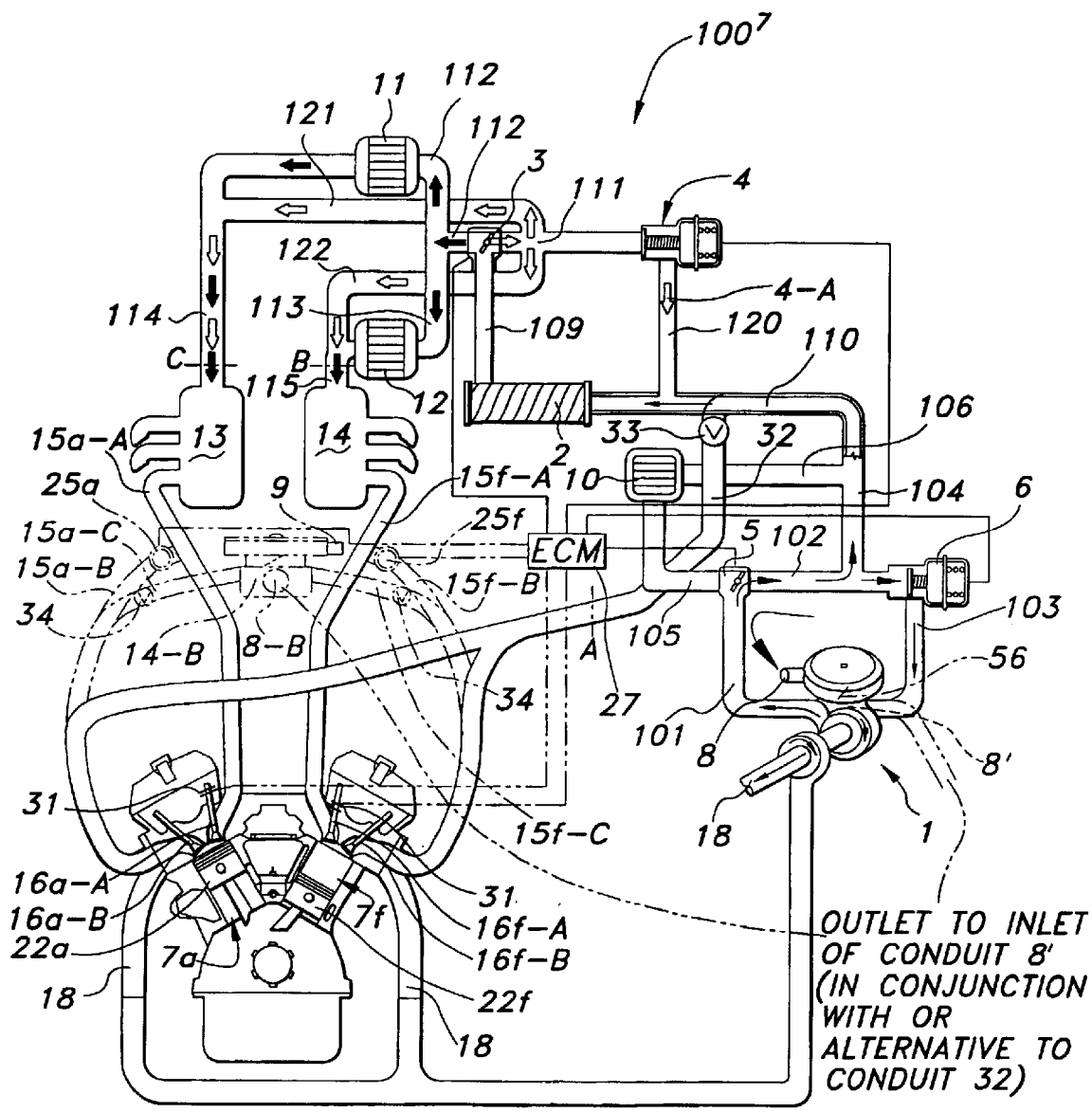
FIG. 7 is a schematic drawing of a six cylinder, 4-stroke engine representing yet another embodiment of the apparatus of the present invention, from which yet another method of operation can be performed and will be described, and depicting three alternative systems (two in phantom lines) of inducting a low pressure primary air charge. Among its other components, this embodiment is seen as having three air coolers and dual manifolds and the means of controlling the temperature, density and pressure of the charge by an engine control module and by valving variations.

For light-load operation a shut-off valve, or a valve disabler 31 (such as shown in FIG. 7) on the high pressure intake valve 16-A, preferably, temporarily restrains the intake air, or holds the valve closed. This would add to the fuel economy of the engine. Alternatively, during light-load operation the shutter valve 5 is closed and the air bypass valve ABV 6 is opened so that part or all of the air pumped by compressor 2 would be returned to the inlet conduit of the compressor 2 for a low, or no pressure boost. Therefore, when secondary intake valve 16-A opens, the pressure of the air in conduit 15-A is approximately the same as, or not much greater than that from the initial charge. In an alternate embodiment, an ancillary automatic valve 26, FIG. 6, is arranged, as shown in FIG. 6, to prevent any back-flow of charge-air into conduit 15-A if the cylinder pressure should exceed the pressure in conduit 15-A before intake valve 16-A closed during the compression stroke of piston 22.

If an ancillary one-way valve (see valve 26 of FIG. 6) is present, the pressure ratio in cylinder 7 can be fully controlled by adjusting the pressure of the charge air passing through intake valve 16-A. The pressure ratio can then be controlled by valves 3, 5, 6 and by compressor speed and any throttle valve that may be present. In the use of valve 26, intake valve 16-A must be kept open until very late in the compression stroke, perhaps until piston 22 nears or reaches top dead center.

Figure 33:
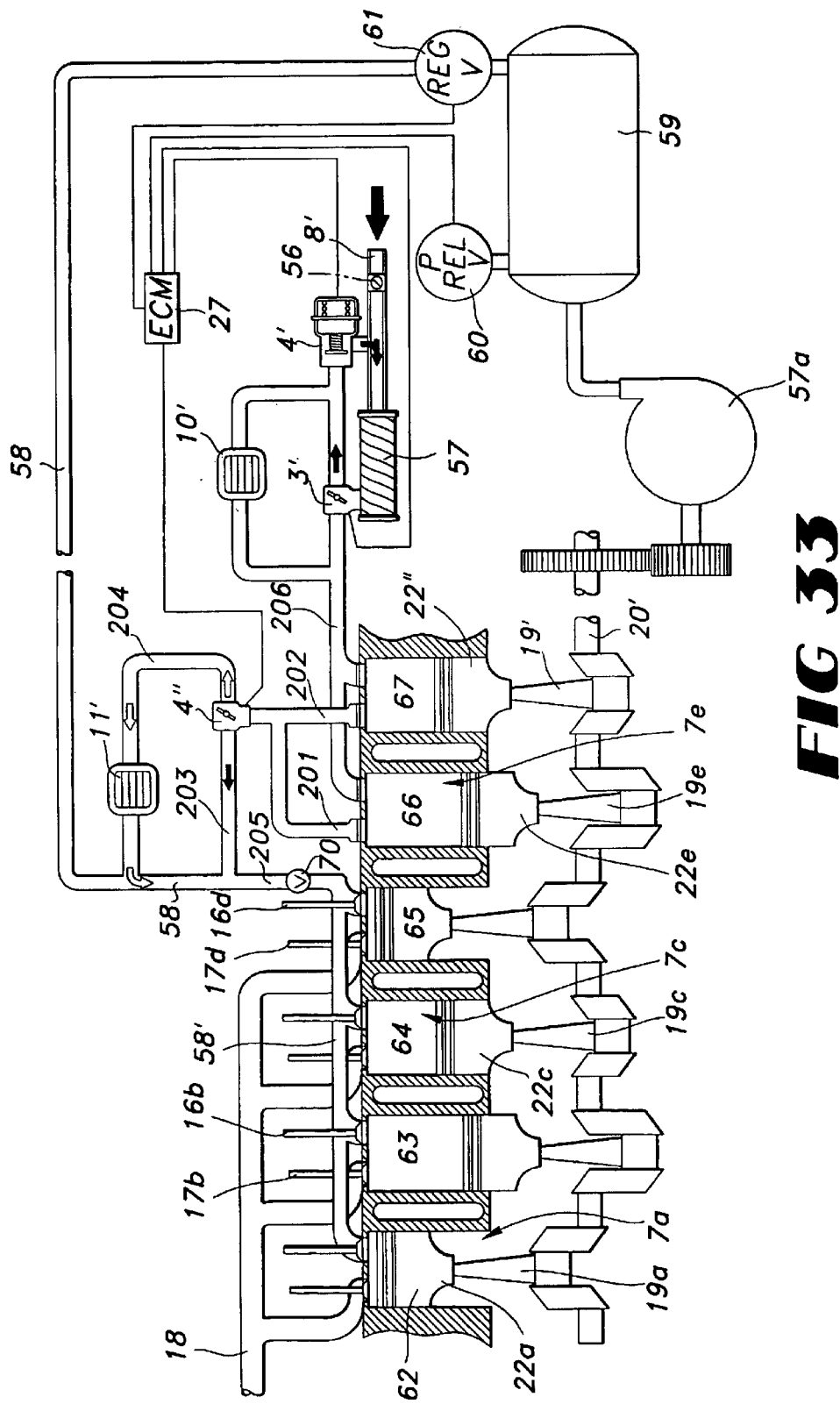
FIG. 33 is a schematic transverse sectional view through a six cylinder engine having two compressor cylinders, four power cylinders, one supercharger, five regulatory valves, and showing an engine control module (ECM) for controlling charge temperatures, density and weight, and adopted for storage of compressed air compressed by regenerative braking, or for storage of bleed-air produced in some industrial processes, in any of the engines of this invention.

Fuel can be carbureted in FIG. 4, FIG. 4-B, FIG. 5, FIG. 7 and FIG. 33, injected in a throttle body 56 (seen in FIG. 16), or the fuel can be injected into the inlet stream of air, injected into a pre-combustion chamber or, injected through intake valves 16-A, 16-B, (16-B only if 16-B does not remain open past bottom dead center), or it may be injected directly into the combustion chamber at point x during the intake stroke, (during the intake stroke only if intake valve 16-B closes before bottom dead center), or at the time or after the piston 22 has reached point x in the compression stroke. The fuel can be injected with or without accompanying air. In the case of diesel operation, fuel can be injected at the usual point for diesel oil injection, perhaps into a pre-combustion chamber or directly into the combustion chamber or directly onto a glow plug.

After the temperature-and-density-adjusting-air charge has been injected, if used, compression of the charge continues and with fuel present, is ignited at the opportune time for the expansion (3rd and power) stroke. (The compression ratio is established by the displaced volume of the cylinder remaining after point x has been reached on the compression stroke, being divided by the volume of the combustion chamber. The expansion ratio is determined by dividing the cylinders total clearance volume by the volume of the combustion chamber.) Now the fuel-air charge is ignited and the power, (3rd) stroke of piston 22 takes place as the combusted gases expand. Near bottom dead center of the power stroke the exhaust valve(s) 17, 17' opens and the cylinder 7 is efficiently scavenged on the fourth piston stroke by positive displacement, after which exhaust valve(s) 17 closes.

This completes one cycle of the 4-stroke engine.

It can be seen that the later the point in the compression stroke that point x is reached (the earlier or later the inlet valve is closed), the lower is the compression ratio of the engine and the less the charge is heated during compression. It can also be seen that the later the temperature-density-adjusting charge is introduced, the less work will be required of the engine to compress the charge, the later part of which has received some compression already by an ancillary compressor 2.

The Engine $100^{4-B}$ of FIG. 4-B

Referring now to FIG. 4-B there is shown a six cylinder 4-stroke internal combustion engine similar in construction to the engine of FIG. 4 with the exception that the engine of FIG. 4-B is so constructed and arranged that compressor 2 receives charge-air from manifold 14-B through opening 8-B (shown in FIG. 7) and conduit 8 which air enters through common air intake duct 9. Intake runners 15a-C to 15f-C distributes the atmospheric pressure air to the intake valves 16-B of each power cylinder. This arrangement allows the provision of air to intake valves 16-A and 16-B at different pressure levels since the charge-air from conduits 15-A is selectively pressurized by compressor 2. The operation of the engine of FIG. 4-B is the same as that of the engine of FIG. 4.

The Engine $100^5$ of FIG. 5

Referring now to FIG. 5, there is shown a six cylinder 4-stroke internal combustion engine 100 similar to the engines $100^4$ of FIG. 4 and engine $100^{4-B}$ of FIG. 4-B with the exception that there are shown alternative ways that the dual atmospheric air inlets can be eliminated, preferably by providing the low pressure charge-air to intake valves 16-B by way of conduits 15a-D to 15f-D all leading from the common air inlet conduit 8, or from an optional air manifold 35-M, situated between inlet conduit 8 and the inlet of conduits 15a-D to 15f-D, which manifold would also supply air to compressor 2 through conduit 8-A. Providing the low pressure charge-air to intake valve 16-B by way of conduit 15-D, or by conduit 15-B (shown in phantom) would eliminate a second air filter and air induction system and would work well with either the first system described which involves closing the primary intake valve 16-B during the intake stroke of the piston 22 or alternatively closing the primary intake valve 16-B during the 2nd or compression stroke. Alternatively, as shown, the low pressure charge-air can be supplied by placing a pressure-dropping valve 25 in conduit 15-B routed for leading from the pressurized air conduit 15 (15-A) to the low pressure cylinder inlet valve 16-B in order to drop the inducted air pressure down to the level that could be controlled by the system of compression ratio adjustment described herein, preferably down to 1.5 to 2.0 atmospheres (absolute pressure which is a boost of 0.5 to 1.0 atmosphere) and perhaps down to atmospheric pressure.

The operation of the engine $100^5$ of FIG. 5 would be the same as the operation of the engine $100^4$ of FIG. 4 although the low pressure primary air supply is supplied differently. Because of noticeable similarities between the engine $100^5$ of FIG. 5 and that of FIG. 7, reference will be made as deemed helpful to FIG. 7 for certain common components.

During light-load operation of this 4-stroke cycle engine (FIG. 4, FIG. 4-B and FIG. 5) such as vehicle cruising or light-load power generation, the secondary air charge is, alternatively, eliminated by disabling high pressure intake valve 16-A temporarily (there are several valve disabling systems available, e.g. Eton. Cadillac. etc.) or air can be shut off to intake valve 16-A and the engine still produce greater fuel economy and power than do conventional engines.

Alternatively and preferably, during light load operation such as vehicle cruising, the compressor 2 can be relieved of any compression work by closing the shutter valve 5 and opening the air bypass valve 6 which circulates the air pumped back into the compressor 2 and then the air in intake conduits 15-A and 15-B or 15-D are approximately equal. Therefore, no supercharging takes place during this time. In one embodiment, automatic valve 26, FIG. 6, prevents backflox-of air during the compression stroke if compression pressure in the cylinder approximates or exceeds the pressure in conduit 15-A before the intake valve 16-A closes.

For increased power the secondary air charge may be increased by shutter valves 3 and 5 being preferably opened to direct the air charge to intercoolers 10, 11 and 12, which makes the charge denser and/or by increasing the speed of compressor 2 or by adding a second stage of precompression by compressor 1 in FIG. 7, the latter two actions thereby pumping in more air on the backside. There is shown in FIG. 7 that the primary compressor 2 is a Lysholm rotary type and a secondary compressor 1 is a rotary compressor of the turbo type, although any type of compressors can be used in the engines of this invention.

Referring now to FIG. 6 there is shown the same 4-stroke engine and a similar operating system as described for the engines of FIG. 4, FIG. 4-B, FIG. 5, FIG. 7 and FIG. 33, except that the engine of FIG. 6 has an added feature in that the secondary intake valve 16-A has an auxiliary valve 26 which is automatic to prevent charge-air back-flow from cylinder 7. This feature will prevent any backflow from occurring during the compression stroke of the engine of this invention. This feature can also be used to establish the pressure ratio of the engine, either variable or constant. If secondary charge air is being received through intake valve 16-A, the intake valve 16-A can be kept open during the compression stroke to near top dead center of piston 22, since automatic valve 26 closes at such time the pressure in cylinder 7 approximates the pressure in intake runner conduit 15-A. Therefore, the pressure differential between cylinder 7 and intake runner 15-A will allow closure of automatic valve 26, even though intake valve 16-A may still be open, allowing the pressure ratio of cylinder 7 to be controlled by the pressure of any charge air coming through intake runner 15-A, which in turn is controlled by valves 3, 5, and 6 and compressor speed and perhaps a throttle valve, if present, for engines having a single stage of pre-compression. Valves 3, 4, 5 and 6 and compressor speed and any throttle valve present would control the pressure ratios for engines having two stages of pre-compression. If no charge is passing from intake valve 16-A, automatic valve 26 will be already closed and the pressure ratio is set by the compression ratio of the engine and the density and temperature of the charge received by cylinder 7 through intake valve 16-B. The compression ratio is still set by the point in cylinder 7 that the primary intake valve 16-B is closed. The pressure ratio is set by the density and temperature of the air present in cylinder 7 whether it enters through valve 16-B, 16-A or both, and by the compression ratio.

Any type of automatic valve can be used for item 26, perhaps a spring-retracted disc type which can be made of metal or ceramics.

The Engine 100$^7$ of FIG. 7

Referring now to FIG. 7, there is shown a schematic drawing of a six cylinder engine 100$^7$ operating in a 4-stroke cycle. The engine is similar in structure and operation to the 4-stroke engine of FIG. 4, FIG. 4-B and FIG. 5 and shows alternative air induction systems utilizing air intake 9 (in phantom) or air intake 8', or both. FIG. 7 also shows three intercoolers 10, 11 and 12 and dual manifolds 13 and 14 plus alternative intake manifold 14-B. The need for dual atmospheric air intake (8' and 9 in FIG. 7) can be eliminated by providing air from port 8-B of manifold 14-B directly to air intake conduit 8' shown schematically in FIG 7.

One alternate air induction system shown in FIG. 7 supplies unpressurized charge-air to intake valve 16-B of the engine of FIG. 4-B and of FIG. 7 by providing atmospheric pressure air to the intake runners 15a-C to 15f-C leading from manifold 14-B in FIG. 4-B and FIG. 7 which receives atmospheric air through induction port 9, and then distributes the unpressurized air to intake valves 16-B of each power cylinder. Then, high pressure air enters through intake valve 16-A after piston 22 has reached point x during the compression stroke (the point in which intake valve 16-B closes and compression begins). Intake valve 16-A then closes, compression continues, fuel is added if not present and the charge is ignited near top dead center (TDC) and the power (3rd) stroke occurs.

A second alternate air induction system shown in FIG. 7 supplies low pressure intake air as also shown in FIG. 5 of alternatively receiving air from high pressure conduit 15-A through conduit 15-B with the optional pressure reducing valve 25, (shown in phantom in FIG. 5 and FIG. 7). The secondary high pressure air charge is injected by intake valve 16-A at the same time or later that the piston 22 reaches the point at which the intake valve 16-B closes and compression begins. Intake valve 16-A then quickly closes, compression continues, fuel is added if not present and the charge is ignited at the appropriate place for the power (3rd) stroke.

A third alternate and preferred air induction system shown in FIG. 7 supplies the primary air charge to intake valve 16-B as follows: Charge-air which has been pressurized to a low pressure by compressor 1, perhaps from 0.3 Bar to as much as 2 Bar or more, can selectively (and intermittently or continuously) be supplied to low pressure intake valves 16-B of the engine of FIG. 7 by way of conduit 32 leading from conduit 110 to the intake valves (16a-B through 16f-B) which conduit receives charge-air at atmospheric pressure or which has been pressurized and in any case has had its temperature optimized, all controlled by compressor 1 and intercooler 10 with the charge-air paths being controlled by valves 5 and 6 with the corresponding conduits. In this case the valve 33 is optional. After cylinder 7 has been charged and the compression ratio established by the closing of intake valve 16-B during the first or second stroke of piston 22, the high pressure intake valve 16-A opens on the compression stroke at the point which valve 16-B closes, to inject the dense, temperature adjusted air charge and then it closes, as compression continues and near top dead center, fuel being present, the charge is ignited and the power (3rd) stroke occurs. The use of this system also eliminates the need for dual atmosphere air intakes.

A fourth alternate air induction system shown in FIG. 7 supplies the primary charge-air to the low pressure intake valves 16-B by having charge-air coming selectively from intake system 9, manifold 14-B and intake runners 15-C (shown in phantom) or from conduit 32 which would direct air to power cylinder 7 at whatever level of pressure and temperature was needed at any particular time. With this arrangement, opening valve 33 at such a time that compressor 1 was compressing the charge passing through it would have the effect of increasing the density of the primary charge-air which in this case could also have its temperature as well as it pressure adjusted by compressor 1 and control valves 5 and 6. A one-way valve 34 would prevent the higher pressure air escaping through conduit 15-C. When less power was needed compressor 1 could be "waste gated" by opening, partially or completely control valve 6 and closing shutter valve 5. Alternatively, valve 33 could be closed by the engine control module (ECM) and the primary charge-air would be drawn into cylinder 7 at atmospheric pressure through intake duct 9 (shown in phantom). The piston 22 now begins its second stroke, the intake valve 16-B now closes, if not closed on the intake stroke, to establish the compression ratio and in all cases the heavy secondary charge enters through valve 16-A which opens at the time, or after, piston 22 has reached the point where intake valve 16-B had closed, valve 16-A then quickly closes, compression continues and the charge is ignited near top dead center and the power (3rd) stroke occurs.

With this fourth alternate air induction system the low pressure intake valve 16-B can (a) receive charge-air at atmospheric pressure or (b) can receive charge-air which has been compressed and cooled through conduit 32 or conduit 15-B. The high pressure intake valve 16-A (which opens at the time, or later, at which compression begins) can receive charge-air which (a) has been compressed and cooled in a single stage by compressor 1 or compressor 2, (b) has been compressed and cooled in two stages or more to a very high density or (c) which has had its temperature and pressure adjusted by control valves 5 and 6, all in order to provide better management of combustion characteristics in regard to power, torque and fuel economy requirements and in regard to emissions control. By incorporating an optional one-way valve (see valve 26 shown in FIG. 6), the engines of FIG. 4, FIG. 4-B, FIG. 5 and FIG. 7 could have either a constant or a variable pressure ratio, the charge density, pressure, temperature and turbulence and the time of closing of valve 26 being controlled by valves 3, 5 and 6 and by compressor speed and by any throttle valve present in engines having one stage of pre-compression, and by the addition of valve 4, in engines having two stages of pre-compression. In either case the intake valve 16-A should be held open very late in the compression stroke, perhaps to near top dead center of piston 22.

One advantage to compressing the charge-air going to the low pressure intake valve 16-B in addition to highly compressing the secondary air charge is that during much of the duty cycle of such engines the charge density could be dramatically increased while keeping peak pressures and temperatures low for high mean effective cylinder pressure. This system could provide all power necessary for vehicular travel in hilly country with perhaps the high pressure intake valves 16-A being deactivated by a valve deactivator indicated by 3I in FIG. 7, or by compressor 2 and/or compressor 1 being partially or wholly bypassed by control valves 3 and 4 and/or control valves 5 and 6 to vary the pressure and temperature going into manifolds 13 and 14 and then to intake valves 16-A. For utmost power, the valve deactivators could be turned off or eliminated.

Also shown in FIG. 7 is a suggested engine control system consisting of an engine control module (ECM) 27, two shutter valves 3 and 5, two air bypass valves 4 and 6, the optional pressure reducing valves 25 (25a–25f) on air conduits 15-B (15a-B–15f-B), and a scheme of controlling the pressure, temperature and density by controlling air bypass valves 4 and 6 and shutter valves 3 and 5. As illustrated, air bypass valve 4 is closed to allow compressor 2 to fully compress the charge and shutter valve 3 is slightly open allowing part of the air to flow uncooled (hollow arrows) and some of the air cooled (solid arrows) to the manifolds 13 and 14, all of which could be controlled by the ECM 27 in order to provide an air charge at optimum density, temperature and pressure. The hollow arrow 4-A in conduit 120 shows how ABV 4 can be partially opened to allow some of the air to bypass and return to compressor 2 in order to finely adjust the pressure of the secondary air charge that is injected to adjust the charge density and temperature. Alternatively, all of the air charge can be directed through the intercoolers 10, 11 and 12 or through bypass conduits 121 and 122, to the manifolds 13 and 14.

For high power with a low compression ratio and low polluting emissions, the air bypass valves (ABV) 4 and 6 are closed and the shutter valves 3 and 5 would be opened so that the compressors 2 and 1 raise the pressure of the air charge which is directed by shutter valves 3 and 5 through the intercoolers for maximum density. During the intake stroke the low pressure intake valve 16-B opens, piston 22 sucks in low pressure air, the intake valve 16-B closes before bottom dead center or after bottom dead center during the compression stroke. During the compression stroke, at the point the intake valve 16-B closed or later, intake valve 16-A opens to inject the secondary, dense, cooled air charge and then closes. Compression continues for a low compression ratio. Fuel is added, if not present, and the charge is ignited at the appropriate point near top dead center, (ignition can be before, at, or after top dead center) for the power (3rd) stroke with a large expansion ratio with high torque, then exhaust valve(s) 17 open and the scavenging (4th) stroke occurs, after which exhaust valve(s) 17 closes.

In these designs, fuel can be carbureted, throttle body injected, port injected, injected into the cylinder and can be introduced at any point between the air intake and the piston crown. The fuel air mixture can be stratified, or from a stoichiometric to a very lean mixture for spark ignition, to a very rich mixture for diesel operation. The engine power can be controlled by fuel metering alone or the air supply can be properly adjusted to the proper fuel-air ratio by a throttle valve or can be "metered" by control valves 4 and 6 when using two stages of pre-compression and by control valve 4 when using a single stage of pre-compression.

In any of the engines of this invention, the problem common to normal engines of incomplete mixing of fuel, air and residual gas, with consequent variation in conditions at the ignition point is minimized and in some cases eliminated by the late air charge injection at high velocity. This problem, hereby addressed by the present invention, is extreme in current engines when gaseous fuel is injected directly into the cylinder where the spark may occur in mixtures of varying fuel-air ratios, hence with various rates of flame development.

(Concerning the importance of finding a solution to this particular problem, engine researchers at Massachusetts Institute of Technology state "The elimination of cycle-to-cycle variation in the combustion process would be an important contribution to improved [engine] performance. If all cycles were alike and equal to the average cycle, maximum cylinder pressures would be lower, efficiency would be greater, and most of all, the detonation limit would be higher, thus allowing appreciable increase in efficiency and/or mean effective cylinder pressure with a given fuel.")

The cyclic variation spoken of is minimized and, potentially, eliminated in the engine of each of the embodiments (including two-stroke embodiments and four-stroke embodiments) of the current invention by the significant swirl turbulence produced by the injection of high-pressure air. In addition, in any of the engines of this invention the swirl turbulence can be oriented tangentially to the cylinder wall by shrouding the inlet valve 16, and especially valve 16-A, or by the use of a one-way valve (such as valve 26 in FIG. 6 and FIG. 10). Even engines that receive an air charge during the intake stroke of the piston using a shrouded intake valve have a tendency to reduce unwanted cyclic variation and have a decrease in octane requirement and an increase in knock-limited indicated mean effective (cylinder) pressure (klimep). The engine of the present invention, by injecting the charge-air, especially through a shrouded valve during the compression stroke, creates a much greater swirl turbulence to further eliminate unwanted cycle-to-cycle variation for cleaner, more complete combustion of the fuel.

The intake valve can rotate during operation and still have a flow tangential to the cylinder wall by using a conventional poppet valve and having the side of the valve head which is opposite the desired direction of the air flow being shrouded as it opens by a thickened section of the face of the engine's head forming a crescent shaped collar or projection to direct the air flow in the desired direction while the valve is open.

In the diesel combustion system, the better mixing process of the present invention allows much richer fuel-air ratios for greater smoke-limited power, and smoke and particulates are virtually eliminated to an extremely rich fuel-air ratio.

The swirl turbulence produced by high pressure charge injection during the compression stroke is not dampened by the compression stroke and the later the charge is injected, the smaller the volume of charge required to produce the desired swirl turbulence. In any reciprocating internal combustion engine operating in accordance with the method of the present invention, a very high pressure, temperature-controlled air charge can, selectively, be injected tangentially oriented, very late in the compression stroke, for example, just prior to, during or with fuel injection and, with extremely high pressures, even during the combustion process.

Figure 9:
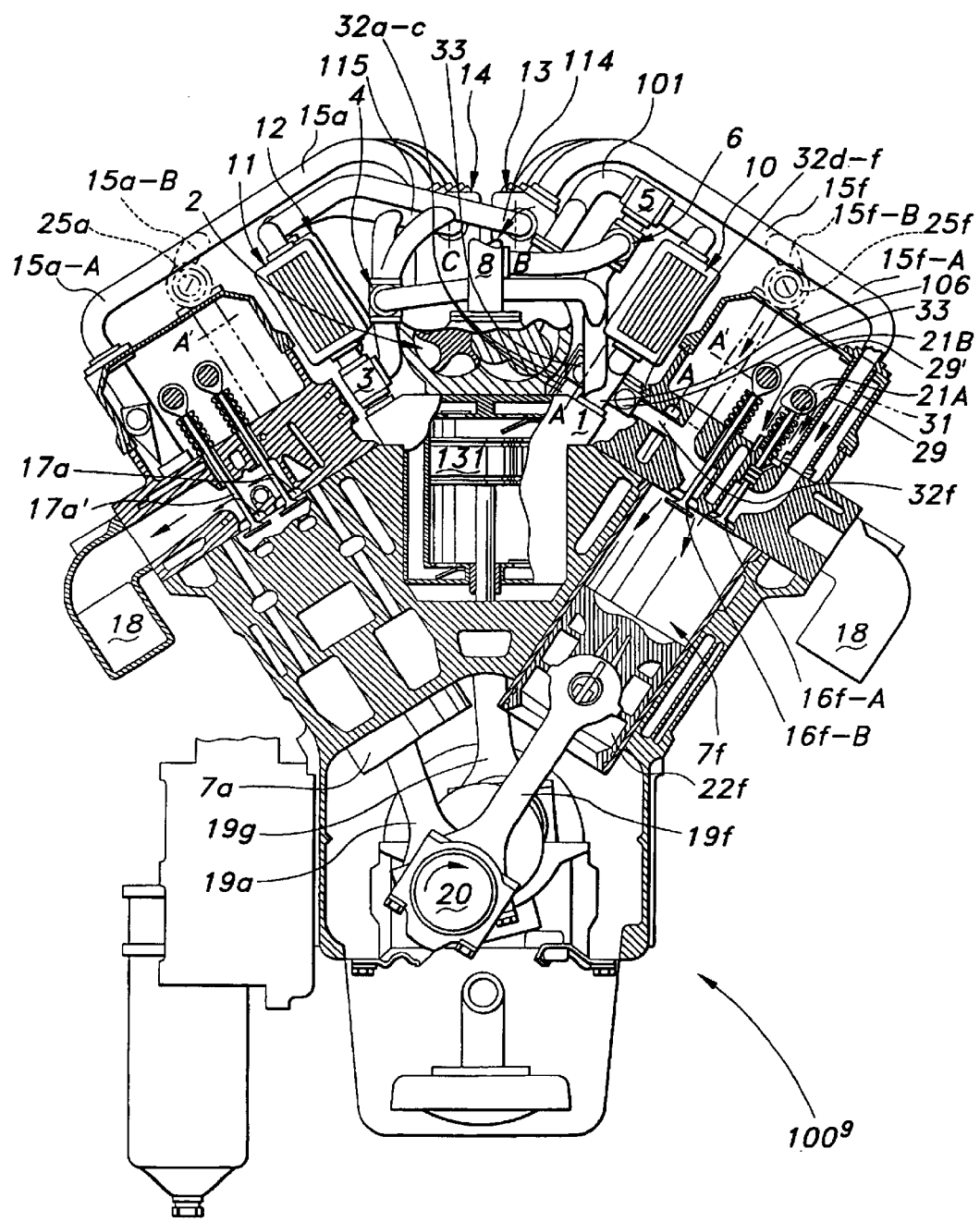
FIG. 9 is a perspective view (with portions in cross-section) of the cylinder block and head of a six cylinder internal combustion engine operating in a 2-stroke cycle, and representing a second 2-stroke embodiment of the apparatus of the present invention from which still another method of operation of can be performed and will be described. Among its other components, this embodiment is seen as having one atmospheric air intake, a primary and an ancillary compressor, with two charge-air routes, one of which is low pressure which has alternate routes, and one of which is high pressure, and both leading to the same power cylinder, and control valving means and air coolers for varying charge densities, pressures and temperatures in the combustion chamber of the engine.
Figure 9B:
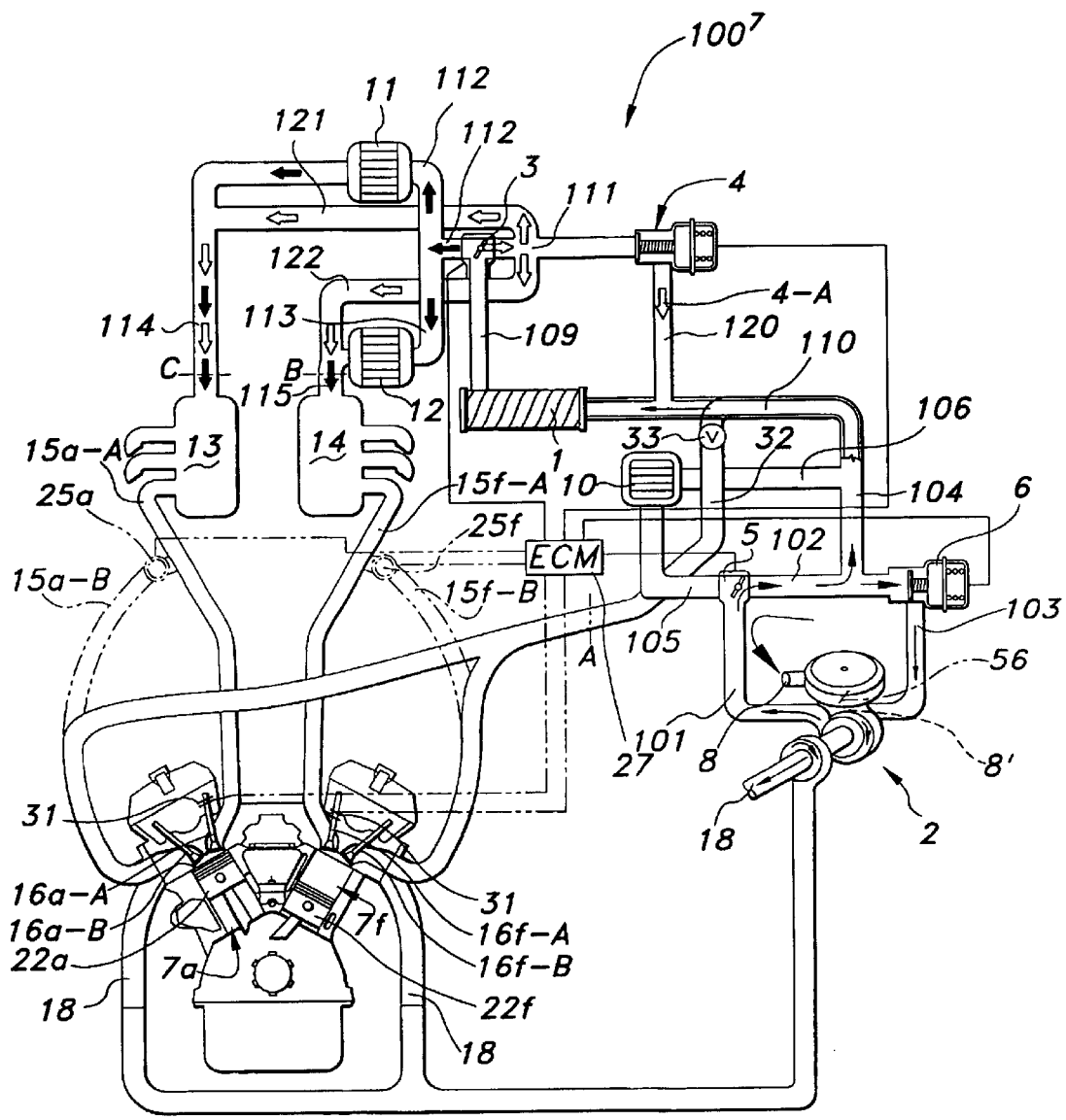

Since the secondary air charge in the engine of FIG. 4 through FIG. 7, FIG. 9, FIG. 9-B and FIG. 15 through FIG. 20 is compressible to an extremely high level of pressure, the intake valve 16-A is, in alternate embodiments, replaced by a more controllable and fast-acting valve, such as, but not limited to, a high-speed solenoid valve (not shown). This valve is, preferably, operated either mechanically, electrically or by vacuum and is, preferably, controlled by an engine control module (ECM) as illustrated in FIG. 7, FIG. 9-B, FIG. 15 through FIG. 20 and FIG. 33. In this system the secondary air charge can, selectively, be injected very late in the compression stroke of piston 22 in order to increase charge density, and swirl turbulence, and to reduce peak and overall combustion temperatures and to lessen the production of polluting emissions. The injection could be performed in a tangentially oriented fashion. This would greatly increase swirl turbulence and prevent undesirable cyclic variations which are common in normal engines and most troubling in gaseous or diesel fueled engines.

The use of this system should result in lower maximum cylinder pressures and temperatures. Efficiency should be greater and the detonation limit higher, thus allowing an appreciable increase in efficiency and mean effective cylinder pressure with a given fuel. All of the engines of this invention operate with a more complete expansion process as compared to the typical prior art engines, thereby providing further improvements in efficiency and emissions characteristics.

In accordance with the present invention, the 4-stroke engines of the present invention (for example, FIG. 1, FIG. 2, FIG. 3, FIG. 4, FIG. 4-B, FIG. 5, FIG. 7 and FIG. 33) are designed, as are the 2-stroke engines of the present invention (for example, FIGS. 8–11, 25 and 33), to use an expansion ratio larger than the compression ratio. In order to accomplish this result, the expansion ratio is set by selecting the appropriate combustion-chamber volume and the compression ratio is reduced below this value by very early or very late closing of the inlet valve.

Figure 8:
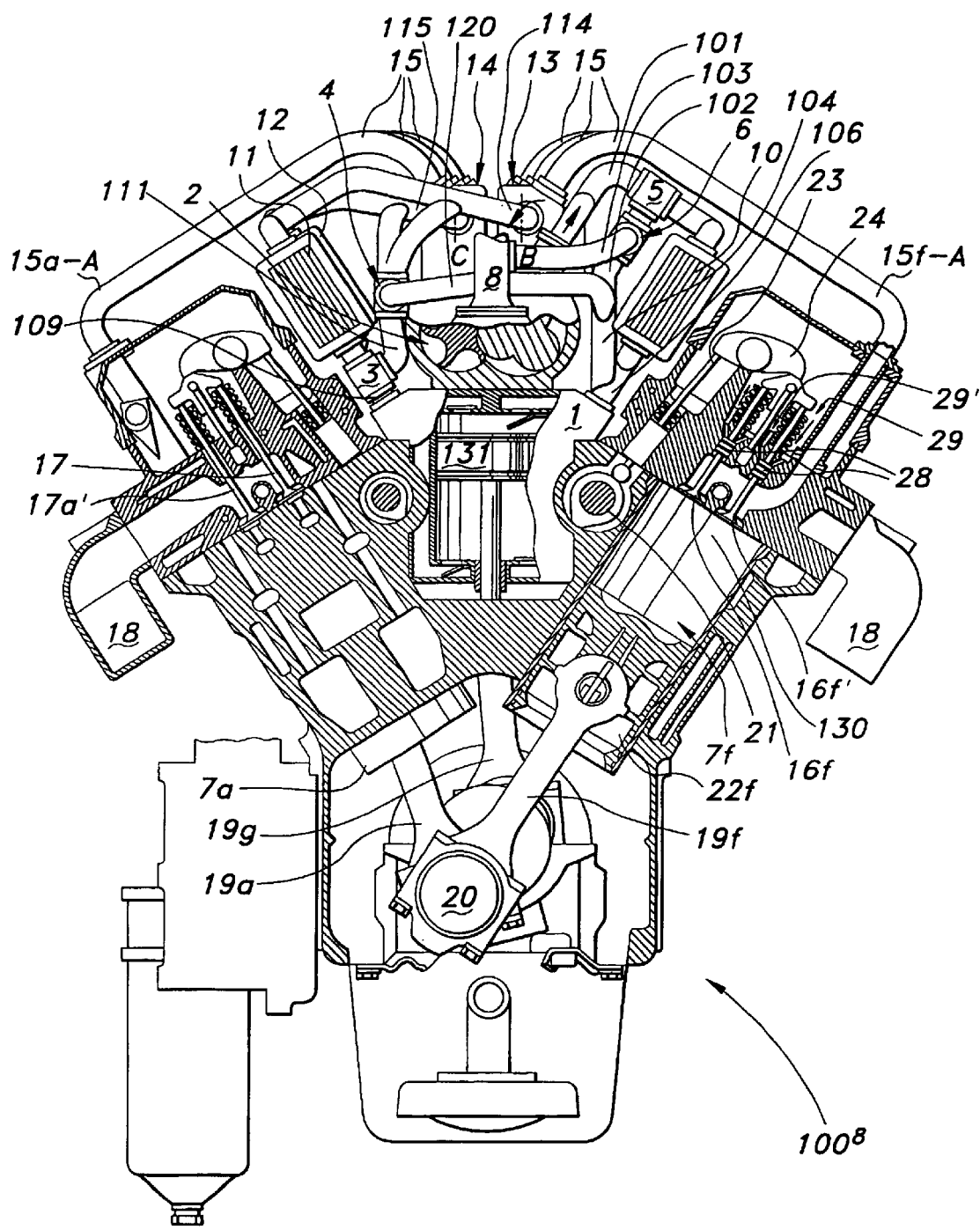
FIG. 8 is a perspective view (with portions in cross-section) of the cylinder block and head of a six cylinder internal combustion engine, operating in a 2-stroke cycle, and representing a first 2-stroke embodiment of the apparatus of the present invention from which still another method of operation can be performed and will be described. Among its other components, this embodiment is seen as having a primary and an ancillary compressor, a cooling system and conduits and valves to adjust charge density, temperature and pressure according to the invention.

The Engine $100^8$ of FIG. 8

Referring now to FIG. 8, there is shown a six cylinder reciprocating internal combustion engine $100^8$ for gasoline, diesel, alcohol, natural gas, hydrogen or hybrid dual-fuel operation and having six cylinders 7a–7f (only one, 7f, is shown in a sectional view) in which the pistons 22a–22f are arranged to reciprocate. Another cylinder is indicated only by the presence of the lower end of the cylinder liner 7a. A cut-a-way view shows a double-acting compressor cylinder 1. Pistons 22a–22f are connected to a common crankshaft 20 in a conventional manner by means of connecting rods 19a–19f, respectively. The engine $100^8$ of FIG. 8 is adapted to operate in a 2-stroke cycle so as to produce six power strokes per revolution of the crankshaft 20. To this end compressor 1 takes in an air charge at atmospheric pressure, (or alternatively an air charge which previously had been subjected to compression to a higher pressure via an admission control valve 6 through an intake conduit 102, leading from compressor 2 by way of bypass control valve 6 and shutter valve 5 and bypass conduit 104 or through the intercooler 10). During operation of the engine of FIG. 8, the air charge is compressed within the compressor 1 by its associated piston 131, and the compressed charge is forced through an outlet into a high-pressure transfer conduit 109 which leads to bypass valve 3 which is constructed and arranged to channel the compressed charge through intercoolers 11 and 12 or through bypass conduit 111 in response to signals from the engine control module (ECM) 27. This module directs the degree of compression, the amount and the direction of the flow of the compressed charge through the intercooler and/or the bypass conduit into manifolds 13 and 14. Manifolds 13 and 14 are constructed and arranged to distribute the compressed charge by means of branch intake conduits 15a–15f and to inlet valves 16 and 16', and to the remaining five power cylinders. Alternatively, an ancillary compressor 2 receives atmospheric air through inlet opening 8, pre-compresses the air charge into conduit 101 leading to control valve 5 which in response to signals from ECM 27 will direct the compressed charge through intercooler 10 or bypass conduit 104 to compressor 1. The ECM 27 can also control valves 4 and 6 to direct part or all of the charge passing through compressors 1 and 2 back through conduits 120 and 103 in order to adjust the amount of compression of compressors 1 and 2 ranging in either or both compressors from full compression to no compression, thus during light-load operation either compressor 1 or compressor 2 could supply the needed compressed air to the cylinders.

The Engine $100^8$ of FIG. 8 has camshafts 21 which are arranged to be driven at the same speed as the crankshaft in order to supply one working stroke per revolution for the power pistons. The reciprocating compressor can have one or more double-acting cylinders one is pictured 1 and can have more than one stage of compression, and the crankshaft 20 would supply two working strokes per revolution, for one or more compressors, as described hereinafter. The reciprocating compressor could alternatively be driven by a short crankshaft which would be rotated by a step-up gear on the main crankshaft driving a smaller gear on the ancillary crankshaft. The ancillary rotary compressor 2 could be driven by V-pulley operated by a ribbed V-belt and could have a step-up gear between the V-pulley and the compressor drive shaft. The rotary compressor 2 could also have a variable speed drive as in some aircraft engines.

Description of the Operation of the Engine $100^8$ of FIG. 8.

Charge-air is induced into the inlet opening 8 of compressor 2, from there it passes through the compressor 2 where the charge is then inducted into conduit 101 to shutter valve 5 where the charge is directed either through intercooler 10 or through air bypass valve 6 where a portion or all of the charge can be directed back through the compressor 2 where the charge is re-circulated without compression, or valve 6 can direct the air charge into the inlet of compressor 1 where the air charge is pumped out the outlet duct of compressor 1 which leads to shutter valve 3 where the charge is directed either through intercoolers 11 and 12 or through air bypass valve 4 or a portion through both, leading to manifolds 13 and 14 which distribute the charge-air to the intake valves 16 and to the intake valve of each power cylinder 7 of the engine $100^8$. (Bypass valve 4 can direct part or all of the air charge to manifolds 13 and 14, or can recirculate part or all of the air charge through conduit 120 back to conduit 106 and into the inlet of compressor 1.) The engine control module (ECM) 27 controls valves 3, 4, 5, and 6, in order to adjust the pressure, temperature and density of the charge that is inducted into the engine's combustion chambers 130. The same ECM 27 can control a variable-valve-happening control system to adjust the time of opening and closing of the inlet valves 16 and exhaust valves 17 of the power cylinders in relationship to the angle of rotation of crankshaft 20, in order to adjust the compression ratio and charge density of the engine for optimum performance in regard to power, torque, fuel economy and characteristics of fuel being supplied.

The operation of the Power Cylinder 7 is in this Manner:

Alternate Method 1:

Near the end of the power stroke in cylinder 7, the exhaust valve(s) 17, 17' open and, Faith the exhaust valve still open, the piston 22 begins the second or exhaust stroke. During the exhaust stroke, perhaps as early as 70° to 60° before top dead center the exhaust valves 17, 17' close. At the point the exhaust valves are closed the compression ratio is established, the intake valves 16, 16' are opened at that point or later in the compression stroke, the compressed air and/or air-fuel charge is injected into the combustion chamber 130 of the power cylinder 7, intake valve 16, 16' closes at perhaps 60° before top dead center, with the swirl and squish turbulence accompanying the high-pressure air injection, the piston 22 continues towards the end of its stroke thus compressing the charge producing a very low compression ratio, which can be as low as 2:1. If fuel is not already present as a mixture, fuel is injected into the incoming air stream or it is injected into a pre-combustion chamber or directly into the combustion chamber after closure of the intake valve. The fuel can be injected into the midst of the charge swirl for a stratified charge combustion process, or it can be injected onto a glow plug if diesel fuel is to be ignited. The fuel-air mix is ignited by compression or spark, the latter at the opportune time for greatest efficiency and/or power. Generally, the fuel would be injected and ignited before top dead center of the piston. The fuel can be injected later and perhaps continuously during the early part of the expansion stroke for a mostly constant-pressure combustion process and especially for diesel fuel. The fuel air mixture is ignited preferably before the piston reaches top dead center and the combusted charge expands against the piston as it moves toward bottom dead center. At near bottom dead center of the piston stroke, the exhaust valve(s) is opened and the exhausted mixture is scavenged by positive displacement by the piston 22 during the scavenging stroke. If the intake valve 16, 16' is opened earlier some valve overlap with the exhaust valve may be required for scavenging. If the intake valves 16, 16' are opened late no valve overlap would be needed, exhaust valve(s) 17, 17' closing at approximately the same time that intake valve(s) 16, 16' open. The expansion ratio of the engine could be about 19:1, for diesel fuel, 14:1 for gaseous fuel or gasoline, which expansion ratio is established by dividing the cylinder displacement volume by the volume of the combustion chamber.

Alternate Operation Method 2:

Near the end of the power stroke in cylinder 7 the exhaust valve(s) 17, 17'

0 open, and with exhaust valve 17, 17' still open, begins its second or scavenging-charging stroke. At a point near mid-stroke, (e.g., about 90° before top dead center,) the exhaust valve 17, 17' still being open, the intake valve opens with a small valve overlap to admit high pressure scavenging and charging air. One or more intake valves 16 can be recessed, as in item 30 in FIG. 11, in order to direct the first inlet air down and along the cylinder 7 wall in order to loop-scavenge the cylinder during the very small overlap of valves 16, 16' and 17, 17'. The exhaust valve 17, 17' remains open to the point at which compression should begin and then receives the air charge as it closes, intake valve(s) 16, 16' closing soon after, with the cylinder adequately scavenged and charged with temperature-adjusted fresh air now at high pressure. The piston 22 continues its stroke to compress the charge producing a low compression ratio, ideally 13:1 to 4:1, depending on the tape of fuel used. The compression ratio is established by the point in the stroke of piston 22 in which the exhaust valve(s) 17, 17' closes, and is calculated when the remaining displaced volume of the cylinder is divided by the volume of the combustion chamber.

As piston 22 continues to rise from point x, where the exhaust valve closes establishing the compression ratio, and where compression of the charge started, the pressure starts to rise at the same point. The dense cooled air charge with the short compression stroke will produce a low compression ratio with a very heavy charge, with low maximum cylinder pressure but with high effective mean cylinder pressure for great torque and power.

The pressure ratio will be established by the density, pressure and temperature of the incoming charge, the length of time inlet valve(s) 16, 16' are open and the point the exhaust valve(s) 17, 17' closes. The later the exhaust valves 17, 17' close, the less the charge-air expands after injection, the less work is required to compress the charge and the less overlap of inlet and exhaust valve is required and the lower is the compression ratio.

At some point, perhaps as early as 150–120 degrees before piston top dead center position, cylinder 7 would be adequately scavenged and the exhaust valve 17, 17' could be closed before, or no later than, the time the intake valves 16, 16' are opened to admit, in this case, the entire air charge, most of the exhausted gases having been displaced by scavenging. (In some cases some residual exhaust gases are beneficial and experiments will show at what point both intake and exhaust valves can be closed without any overlap.) In this instance the "effective" compression ratio could be as low as 3:1 or even 2:1 again producing low maximum cylinder pressure and temperature but with high mean effective pressure. Fuel can be injected as early as at the point the exhaust valve closes and can be as early as about 150°–120° before the end of the compression stroke. The fuel-air mixture is ignited before, at, or after, top dead center and the expansion (2nd) stroke takes place. The expansion ratio is established by dividing the cylinder's displaced volume by the combustion chamber volume and could be about 19:1 for diesel applications, and 14:1 for gasoline or gaseous fuels.

An engine control module (ECM) 27 can manage temperatures and densities of the charge being introduced into the cylinder 7 or combustion chamber 130 and the timing of the inlet into the combustion chamber and can thus adjust charge densities, turbulence, temperatures and pressures providing a means of restraining peak temperatures and pressures vet with a mean effective cylinder pressure higher than in a normal engine when needed, and further providing for lower levels of unwanted polluting emissions.

A suggested light-load, fuel efficient operation system as indicated on line B(bp) in FIG. 13, would be thus: A nominal compression ratio of 13:1 could be chosen, with an expansion ratio of 19:1. The latter would establish the volume of the combustion chamber, the former would establish the maximum charge pressure (not maximum cylinder pressure), about 530 psi when compressed adiabatically. The ECM 27 would signal shutter valves 5 and air bypass control valve 6 to re-circulate the air being pumped through compressor 2, back through the compressor 2 without being compressed or for any type compressor, open a waste-gate valve to bypass the compressor. Shutter valve 5 bypasses the intercooler 10 and directs the charge into the inlet of compressor 1. Compressor 1 would compress the charge adiabatically to say, 7:1 compression ratio. ECM 27 controls would bypass intercoolers 11 and 12 and introduce the charge into manifolds 13 and 14 with the heat-of-compression retained. If the exhaust valves 17, 17' are closed and the inlet valve 16, 16' of cylinder 7 are opened near the end of the compression stroke of piston 22 the effective compression ratio can be as low as 2:1, producing a "nominal" compression ratio of 14:1. (If the exhaust valves 17, 17' are closed and the inlet valve 16, 16' are opened earlier in the exhaust stroke, the injected charge-air should be of lower pressure and the "effective" compression ratio, that in-cylinder compression producing heat, would be greater. If the intake valves 16, 16' opened at mid-stroke, after exhaust valves 17, 17' close, and a nominal compression ratio of 13:1 were desired with an effective compression ratio of 4:1, then the charge introduced into the cylinder at mid-stroke should be compressed 4:1.) The uncooled charge is then compressed in the cylinder with an effective compression ratio of 4:1, and in either case, with a pressure of about 530 psi and a temperature above 900° F. The fuel/air charge is then ignited and expanded against the piston to the full volume of the power cylinder with an expansion ratio of 19:1.

At such a time that great power was required, the ECM 27 could signal the air bypass valve 4 and 6 to close. Compressor 2 then begins to compress the air charge to a higher pressure, at the same time ECM 27 would open shutter valves 3 and 5 to send the charge-air through the intercoolers 10, 11 and 12. Therefore, as the charge-air is cooled, and could be to as low as 150–200° F., more air is now pumped into the engine on the back side by the additional compression stage 2, to prevent a substantial pressure drop in the charge-air due to the cooling of the charge before combustion. The air charge in the combustion chamber is now compressed 2:1 (line B(ic), FIG. 13) and is maintained near the design pressure, in this case about 500–530 psi, although cooled, to significantly increase the density of the charge and the torque and power of the engine. The cooler air charge provides lower peak temperature and pressure and coupled with the high turbulence causes production of less unburned hydrocarbons, $NO_x$ and other polluting emissions and with smoke and particulates being virtually eliminated to a very rich fuel-air mixture. The air-fuel charge is now ignited and expanded to the full volume of the cylinder with an expansion ratio of 19:1 although the effective compression ratio is only 2:1 (see line B (ic) in FIG. 13).

With either operation scheme the engine can be supercharged to a higher state than can conventional engines because in most cases the inlet valve is closed at the time of combustion chamber charging and a cooler air charge prevents detonation and reduces polluting emissions. Also in most cases residence time of the fuel is less than that required for pre-knock conditions to occur.

When less power is needed, as during vehicle cruising or light-load power generation, the engine operation could revert to light-load operation, e.g., one stage of compression could be cut out and the first cooler 10 bypassed by the air charge being re-circulated by shutter valve 5 and by bypass valve 6. Shutter valve 3 and air bypass valve 4 could direct all of the charge from compressor 1 passed intercoolers 11 and 12 with the heat-of-compression retained, into manifolds 13 and 14 and to the cylinder for the less dense, more fuel efficient operation mode.

Still referring to FIG. 8, there is shown a view of a cylinder head of the engine of FIG. 8 through FIG. 11 and FIG. 25, showing optional pressure balanced intake valves with cooling being provided by conduits with intake conduit 29 and outlet conduit 29', one-way valves (not shown) which allow expansions 28 on the valve stems, as they reciprocate with intake valves 16 to pump a cooling and lubricating oil or oil-air mixture through the spaces above the valve stem expansions.

Figure 10:
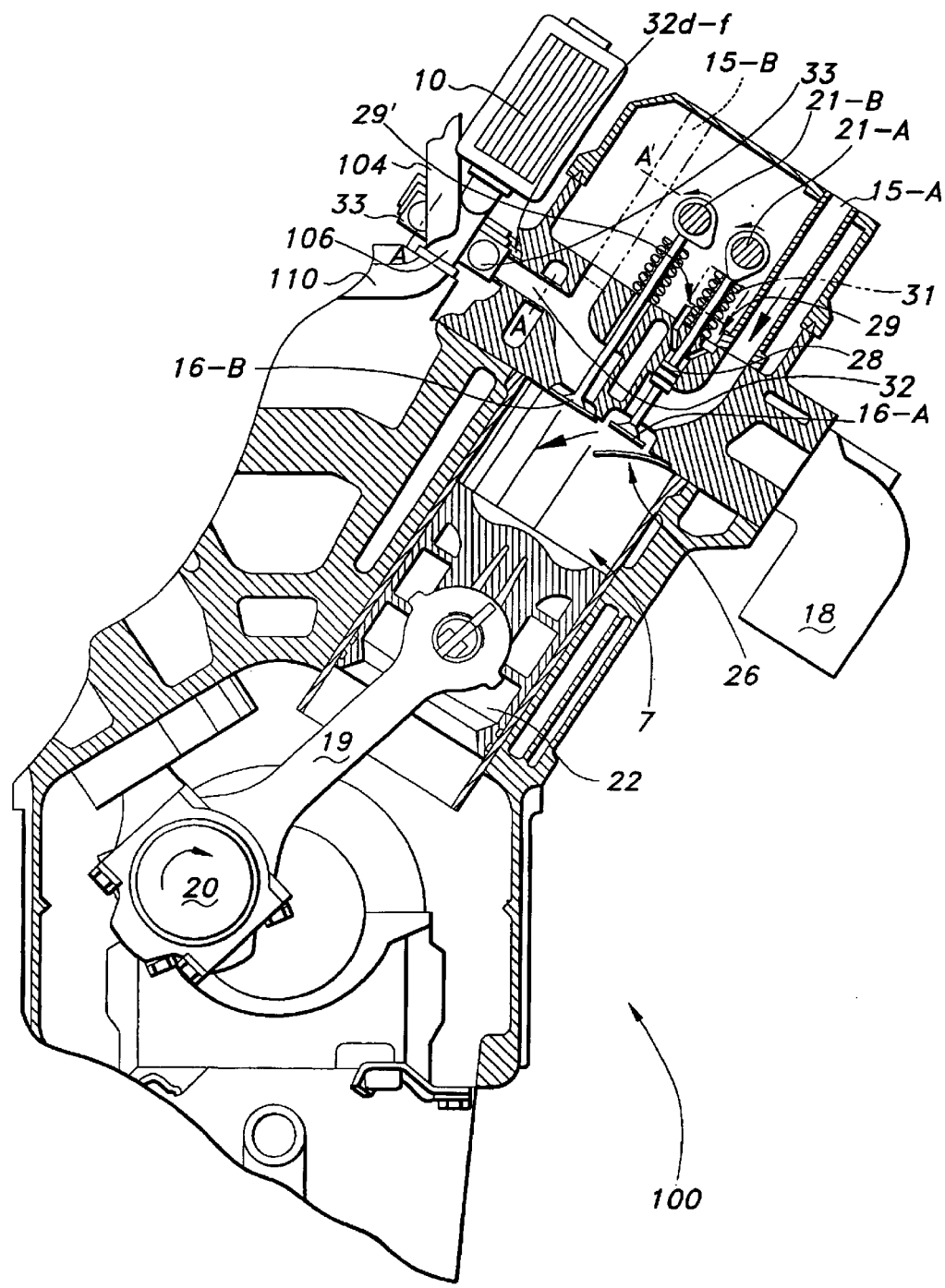
FIGS. 10 is a part sectional view through one power cylinder of the 2-stroke engine of FIG. 9, at the intake valves, showing an alternative method (adaptable to other embodiments of the present invention) of preventing charge-air back flow during high pressure air charging and showing a pressure balanced valve having a pumped oil/air cooling system.

Pressure-balanced intake valves 16, 16' in FIGS. 8, 11, and 25, and 16-A in FIGS. 9 and 10 provide for rapid intake valve closure and allows large non-restricting intake valves and smaller than normal valve return springs. (When the intake valve is opened, pressure equilibrium almost immediately takes place below the valve head within the combustion chamber and above the valve head within the intake runner, then the pressure in the intake runner acting on the piston-like arrangement on the valve stem tends to cause the valve stem to follow the down-slope of the cam profile for rapid valve closure. Also, a new "Magnavox" pressure operated, "square wave" intake valve could be used in the engines of this invention.)

The operation of the pressure balanced intake valves is in this manner:

The pressure balanced intake valves have expansions 28 on the valve stems, the lower surface of which are exposed to gases in conduit 15A. When the valve stem is depressed by a cam 21 and intake valve(s) 16 opens in FIG. 8 through FIG. 11, or FIG. 25 any pressure in conduit 15A is equilibrated with pressure in the combustion chamber and at that time the only reactive force is by any pressure in conduit 15A which is against the underside of valve stems expansions 28, causing a rapid closure of the valve. One-way valves (not shown) on inlet and outlet channels 29 and 29' are preferably provided for oil or oil-air mixture induction through spaces above expansions 28, and alternatively through the valve stem expansions 28. The oil inlet could be at a low point in the cylinder head where oil would collect to supply the cooling system. Alternatively, oil inlet line 29 could be connected to an oil or oil-air mix supply line. The inlet conduit 29 and the exit conduit 29' from the cooling system would be fitted with one-way valves and the exit conduit 29' could be higher than the inlet conduit 29 or could be connected to an oil discharge line leading to the engine oil reservoir. The valve stem expansions 28 could also have a channel through them with a one-way valve on each side. Since historically exhaust valves have been difficult to cool, this same system would provide adequate cooling for the exhaust valves even though there is not great pressure in the exhaust conduit. This system would then be applied to exhaust valves 17 from which exhaust ports 18 originate, or to the exhaust valves of any engine to provide long life for the exhaust valves and the valve seats.

On large engines the lines from the pumps described here can converged into larger lines and the oil pumping provided by them could replace the conventional oil pump on said engine.

The Engine $100^9$ of FIG. 9

Referring now to FIG. 9, there is shown a six cylinder reciprocating internal combustion engine having one atmospheric air intake, in which all of the cylinders 7a–7f (only one (7f) is shown in a sectional view) and associated pistons 22a–22f operate in a 2-stroke cycle and all power cylinders are used so as to produce six power strokes per revolution of crankshaft 20 for producing power to a common crankshaft 20 via connecting rods 19a–19f, respectively. A primary compressor 1, in this figure a double-acting reciprocating type, is shown which, with air conduits as shown, supplies pressurized air to one or more cylinder intake valves 16-A and 16-B (the latter only if a primary charge to valve 16-B comes from conduit 15). A secondary compressor 2 of the Lysholm type is shown in series with compressor 1. An air inlet 8 and associated compressors 1 and/or 2 with inlet conduits and manifolds 13 and 14 supply charge-air, which has been compressed to a higher than atmospheric pressure, to the air intake runner 15-A and intake valve 16-A to cylinder 7. A second conduit 32 directs an air charge from conduit 110 through optional shut-off valve 33 to intake valve 16-B to supply lower pressure air to the same cylinder. Alternatively a second conduit 15-B from conduit 15-A can be fitted with a pressure control valve 25 (both in phantom) and can direct the lower pressure air charge to the intake valve 16-B. Intercoolers 10, 11 and 12 and control valves 3, 4 5 and 6 are used to help control the density, weight, temperature and pressure of the charge air. The intake valves are timed to control the compression ratio of the engine. The combustion chambers are sized to establish the expansion ratio of the engine.

Figure 11:
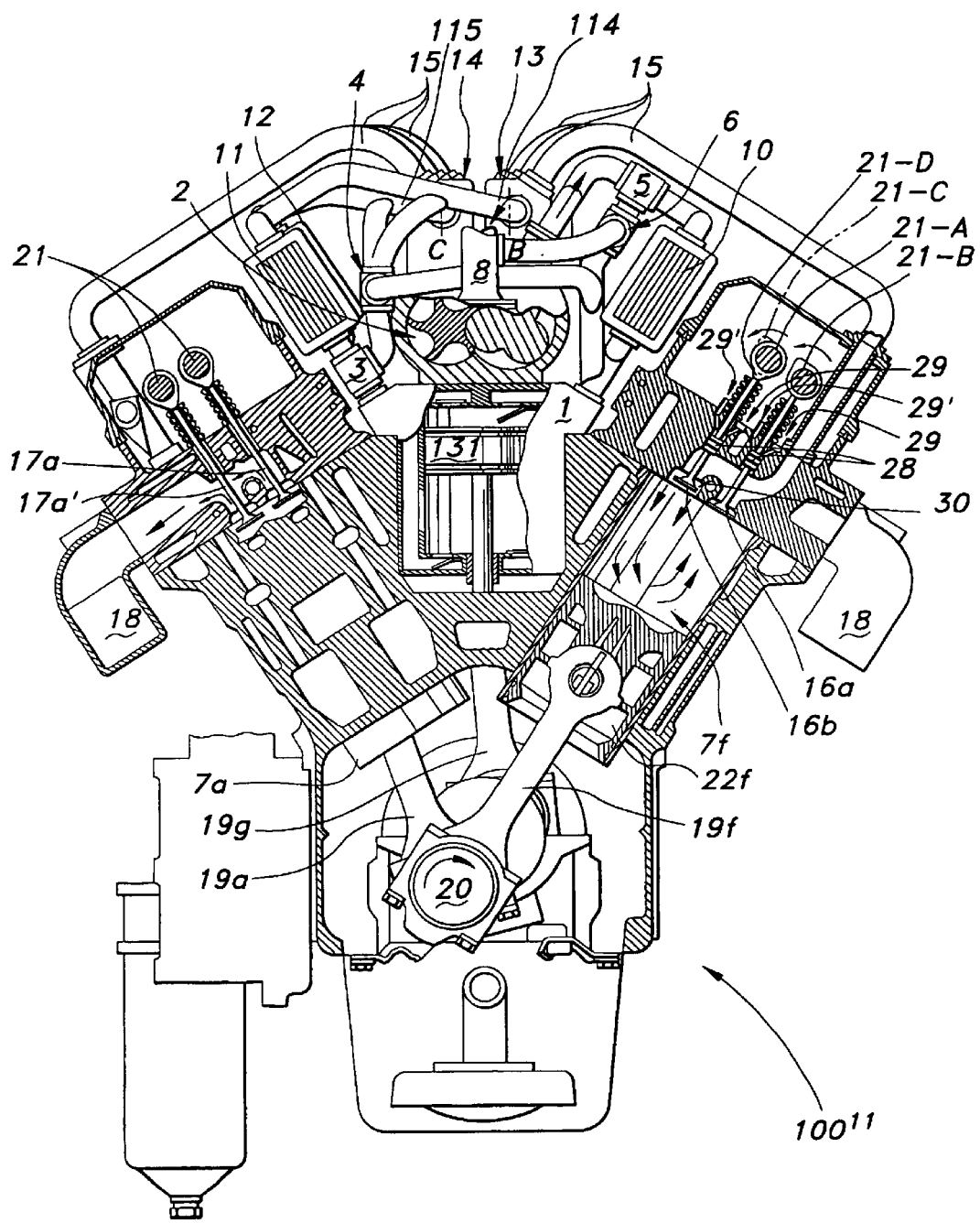
FIG. 11 is a perspective view (with portions in cross-section) of the cylinder block and head of a six cylinder internal combustion engine operating in a 2-stroke cycle, and representing a third 2-stroke embodiment of the apparatus of the present invention from which still another method of operation of can be performed and will be described. Among its other components, this embodiment is seen as having a primary and an ancillary compressor, a cooling system and conduits and valves to adjust charge density, temperature and pressure and having a single air intake runner for each power cylinder with at least two intake valves arranged in such a manner that one intake valve can operate with timing independent of the other intake valve.
Figure 25:
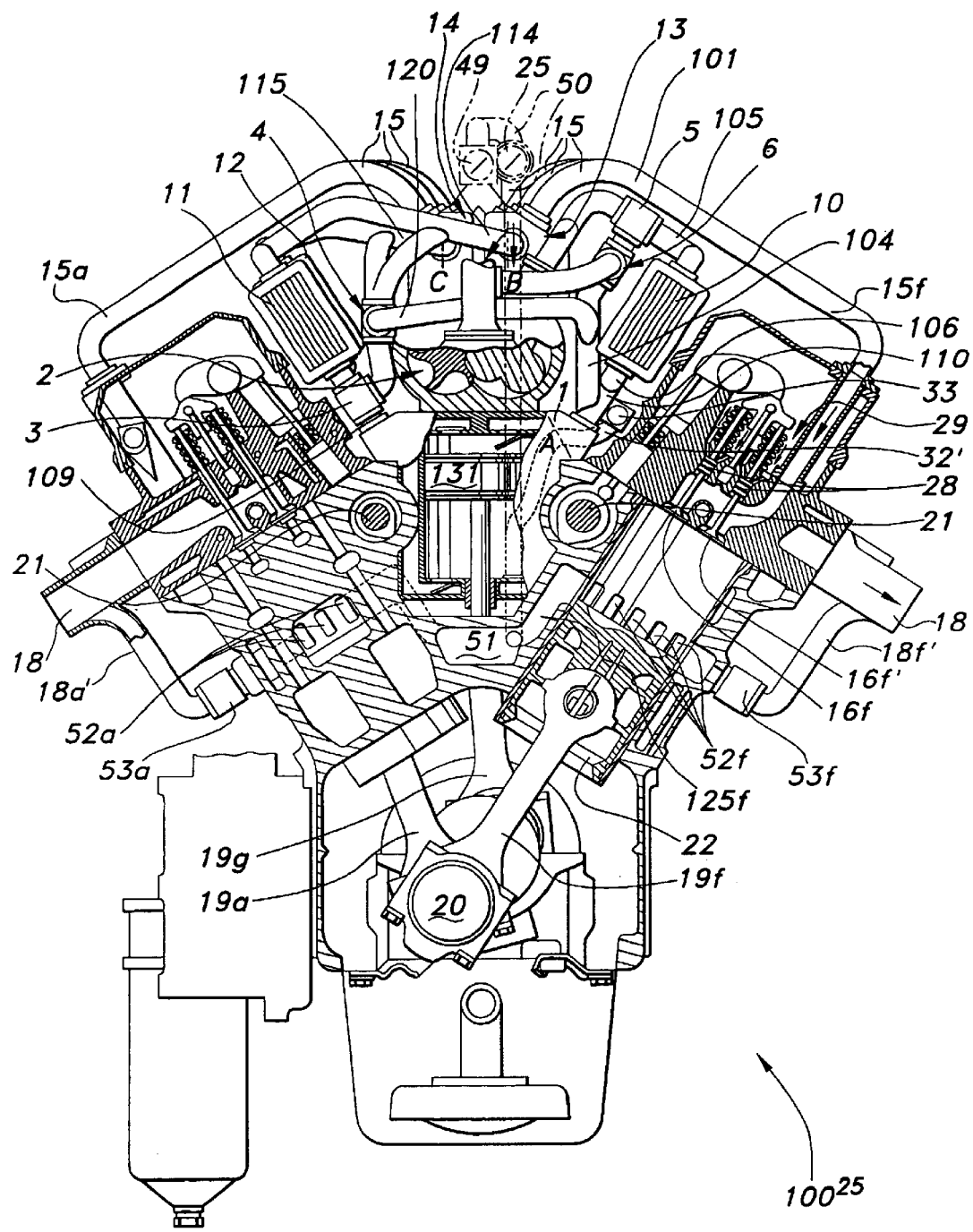
FIG. 25 is a perspective view of the cylinder block and head of a six cylinder internal combustion engine operating in a 2-stroke cycle and representing a yet another embodiment of the apparatus of the present invention from which still another method of operation of can be performed and will be described. Among its other components, this embodiment is seen as having scavenging ports in the bottom of the piston sleeves and having a primary and an ancillary compressor, a cooling system, valves and conduits to control the pressure, density and temperature of the charge-air, and valves and conduits to supply scavenging air to the cylinders.

The engine of FIG. 9, FIG. 11 and FIG. 25 have cam shafts 21 fitted with cams and are arranged to rotate at engine crankshaft speed in order to supply one power stroke for each power piston for each crankshaft rotation.

The engine $100^9$ shown in FIG. 9 is characterized by a more complete expansion process and a lower compression ratio than typical engines, and is capable of producing a combustion charge varying in weight from lighter-than-normal to heavier-than-normal and capable of selectively providing a mean effective cylinder pressure higher than can the conventional arrangement in normal engines with similar or lower maximum cylinder pressure. Engine control module (ECM) 27 and variable valves 3, 4, 5 and 6 on conduits as shown provide a system for controlling the charge pressure, density, temperature, and mean and peak pressure within the cylinder which allows greater fuel economy, production of greater power and torque at all RPM, with low polluting emissions for both spark and compression ignited engines. In alternate embodiments, a variable valve timing system with the ECM 27 can also control the time of opening and closing of the intake valves 16-A or 16-B or both, to further provide an improved management of conditions in the combustion chamber to allow for a flatter torque curve higher power and with low levels of both fuel consumption and polluting emissions.

Brief Description of Operation of Engine $100^9$ Shown in FIG. 9

The new cycle engine $100^9$ of FIG. 9 is a high efficiency engine that attains both high power and torque, with low fuel consumption and low polluting emissions.

The new cycle is an external compression type combustion cycle. In this cycle part of the intake air (all of which is compressed in the power cylinders in conventional engines) is compressed by at least one ancillary compressor. The temperature rise at the end of compression can be suppressed by use of air coolers, which cools the compressed air, and by a shorter compression stroke.

During operation air is supplied to an intake valve 16-B of the power cylinder 7 which has been increased in pressure by perhaps one-third to one atmosphere or more through an air intake conduit 32 leading from ancillary compressor 2, or the air enters by conduit 15-B and a pressure control valve 25. A second air conduit 15A selectively supplies charge-air at a higher pressure to a second intake valve 16-A leading to the same power cylinder 7. (In this design the intake valve 16-B admits the low pressure air after exhaust valves 17 open near bottom dead center in the power stroke, and exhaust blowdown has occurred.) Exhaust blowdown occurs after exhaust valve(s) 17 open and now intake valve 16-B opens and closes quickly to inject low pressure scavenging air. The cylinder 7 is further scavenged by loop scavenging as piston 22 begins its compression stroke. Intake valve 16-B is now closed and piston 22 rises in the compression stroke to the point where compression should begin at which point exhaust valve 17 closes sealing cylinder 7 and establishing the compression ratio. Compression continues and at near top dead center, at a point deemed appropriate, fuel being present, the charge is ignited by spark or compression and the power stroke takes place.

When more power is desired, a secondary air charge from conduit 15-A can be introduced into the power cylinder at the time of, or after closure of exhaust valve(s) 17a during the compression stroke, by intake valve 16-A which introduces a higher pressure air charge, and quickly closes, in order to increase the charge density. Alternatively, the primary air charge may be boosted to a higher pressure by adjusting air bypass valve 6 to send more air through compressor 2, by increasing the speed of compressor 2 or by changing the setting on the control valve 25 on the conduit 15-B which alternatively supplies the low pressure primary air charge to intake valve 16-B. The temperature, pressure, amount and point of injection of a secondary charge, if added, is adjusted to produce the desired results.

For light-load operation an intake valve disabler 31 (there are several on the market, for example, Eaton Corp. and Cadillac) can disable intake valve 16-A when light-load operation does not require a high mean effective cylinder pressure. Alternatively, during the time the low pressure air to intake valve 16-B is supplied by conduit 15-B the air bypass valve (ABV) 6 can be opened to re-circulate some of the charge-air back through the compressor 2 in order to relieve the compressor of compression work during light-load operation. Additionally, and preferably, air bypass valve 4 can re-circulate part or all of the air pumped by compressor 1 back to the inlet of compressor 1 on demand in order to reduce pressure and density of the secondary charge going through intake valve 16-A.

One suggested, preferred method of operation of the new-cycle engine 100⁹ is thus:

1. Intake air at greater than atmospheric pressure that has been compressed by at least one compressor 2 and has had its temperature adjusted by bypass systems or charge-air cooler 10, is introduced into the cylinder 7 through intake valve 16-B, which is opened by a small lobe on cam 21-B at near bottom dead center, at the end of the power stroke (perhaps at bottom dead center) after exhaust valve(s) 17, 17' have opened earlier say, at 40° before bottom dead center, for exhaust blowdown. The exhaust valves remain open after bottom dead center for further scavenging of the cylinder 7. The intake valve 16-B closes at near bottom dead center.

2. After the power stroke is complete and cylinder 7 is filled with fresh charge, the exhaust valve(s) 17 is left open for a period of time after the piston has passed bottom dead center (with intake valve 16-B now closed) in order to further scavenge the power cylinder with the fresh air charge present and further, in order to establish a low compression ratio of the engine, the compression ratio being established by the displaced cylinder volume remaining at the point of the exhaust valve 17 closure, being divided by the volume of the combustion chamber.

3. With the cylinder 7 now filled with fresh air, the compression (2nd) stroke continues and, at some point the exhaust valve 17 is closed and compression begins for a small compression ratio. This makes it possible to lessen the temperature rise during the compression stroke. Compression continues, fuel is added if not present, and the charge is fired a the appropriate point near top dead center and the power stroke occurs.

4. (a) Alternatively, when greater power is required, a secondary compressed, temperature-adjusted air charge is injected into the cylinder 7 by intake valve 16-A opening and quickly closing during the compression stroke at the point at which the exhaust valve closes, or later in the stroke, to produce a more dense charge in order to provide the torque and power desired of the engine.
   (b) When even greater power is required, the secondary air charge can be increased in density and weight by being passed through one or more intercoolers 10, 11 and 12 and by increasing compressor speed or by cutting in another stage of auxiliary compression or by passing more of the charge air through the operational compressors.

5. Near bottom dead center of the piston position, exhaust valves 17, 17' open and the cylinder is efficiently scavenged by blowdown and by the air injected by primary intake valve 16-B.

Detailed Description of the Operation of the Engine 100⁹ of FIG. 9 Near the end of the power (1st) stroke of the piston 22, perhaps at about 40° before bottom dead center position of piston 22, the exhaust valves 17 open for exhaust blowdown, shortly after low pressure air flows through air conduit 32 from conduit 106 and optional shut-off valve 33 and compressor 2 or alternatively through air conduit 15-B supplied by a pressure regulator valve 25 from compressed air line 15-A (as shown in FIG. 9, and FIG. 10), through an intake valve 16-B into the cylinder 7. Intake valve 16-B closes shortly after bottom dead center or, perhaps at bottom dead center. Exhaust valves 17 remain open during the first part of the compression (2nd) stroke of piston 22. The cylinder 7 is now efficiently scavenged by blowdown and by loop scavenging and at any point during the compression stroke, the cylinder 7, now filled with fresh air, the exhaust valves 17, 17' can close. But since a low compression ratio is desired, the exhaust valves 17, 17' can be held open until the piston has reached the point that is desired to establish the compression ratio. At, or after the time exhaust valves 17a and 17a' are closed, a secondary charge of high pressure, temperature adjusted air which has been compressed by a compressor(s) can be injected by intake valve 16-A into the same cylinder, after which intake valve 16-A closes. In addition, when very high torque and power is needed, the density of the secondary charge-air can be greatly increased by cutting-in compressor 2 or by increasing the speed of compressor 2, if already compressing, as in FIG. 9, directing more air through compressors 1 and/or 2 by valves 4 and/or 6, and by routing the charge wholly or in part through intercoolers 10, 11 and 12.

In this system, regardless of the point the exhaust valve is closed to establish the compression ratio, the primary fresh air charge trapped in the cylinder 7 will be lighter than normal and the compression ratio will be lower than normal, therefore, if needed, a highly compressed, temperature adjusted air charge can be injected at exhaust valve closure or later in the stroke, to provide a heavier than normal charge but with the temperature rise being restrained by the cooled charge and the short compression stroke. This produces a greater than normal mean effective cylinder pressure when combusted for great torque and power but still with an expansion ratio greater than the compression ratio.

For light-load operation a shut-off valve, or a valve disabler 31 (in phantom) on the high pressure intake valve could temporarily restrain the intake air, or hold the valve 16-A closed. This would add to the fuel economy of the engine. Alternatively, if compressor 2 is not supplying air to conduit 32 and intake valve 16-B, during light-load operation the shutter valve 5 could be closed and the air bypass valve 6 can be opened so that air pumped by compressor 2 would be returned in part or wholly to the inlet conduit of the compressor 2 with little or no compression taking place there.

An ancillary automatic intake valve 26, FIG. 10, can be arranged, as shown in FIG. 10, to prevent any back-flow of charge-air into conduit 15-A if the cylinder 7 pressure should approximate or exceed the pressure in conduit 15-A during the compression stroke of piston 22 before the closure of intake valve 16-A.

Alternatively, the ancillary automatic valve 26 of FIG. 10 could be used to provide a constant or a variable pressure ratio in cylinder 7. In this case valve 16-A would be kept open to near top dead center and the closure time of valve 26 would be adjusted by the pressure differential in cylinder 7, controlled by valves 3, 4, 5 and 6 by compressor(s) output and by any throttle valve present. The automatic valve 26 could be of the spring-retracted disc type and could be fabricated of metal or ceramics.

Figure 15:
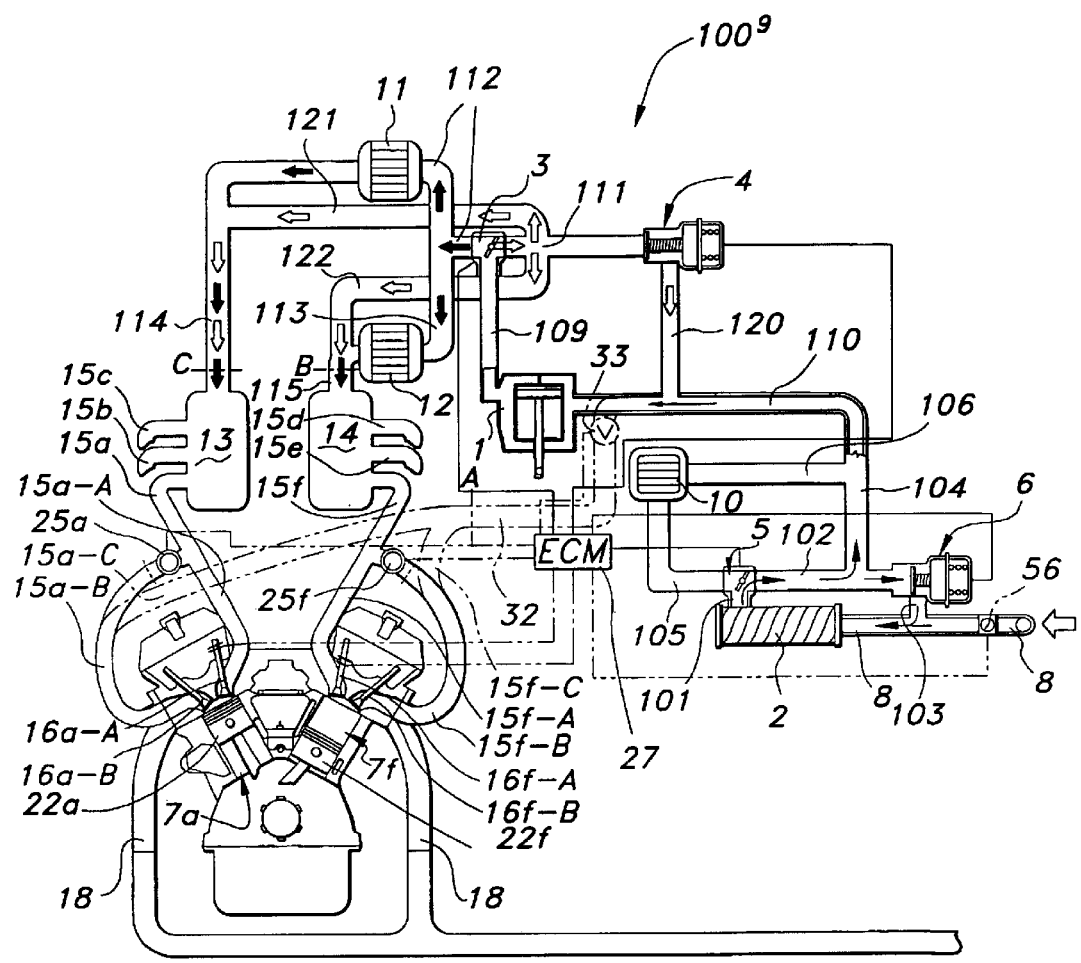
FIG. 15 is a schematic drawing of suggested operating parameters for operation of the engines, both 2-stroke and 4-stroke, of FIGS. 5–7 and FIGS. 9–10 showing dual intercoolers for the main compressor, a single intercooler for a secondary compressor and a control system and valves for selecting different charge-air paths for light-load operations, and depicting (one in phantom lines) two alternative systems of inducting a low pressure primary air charge.
Figure 16:
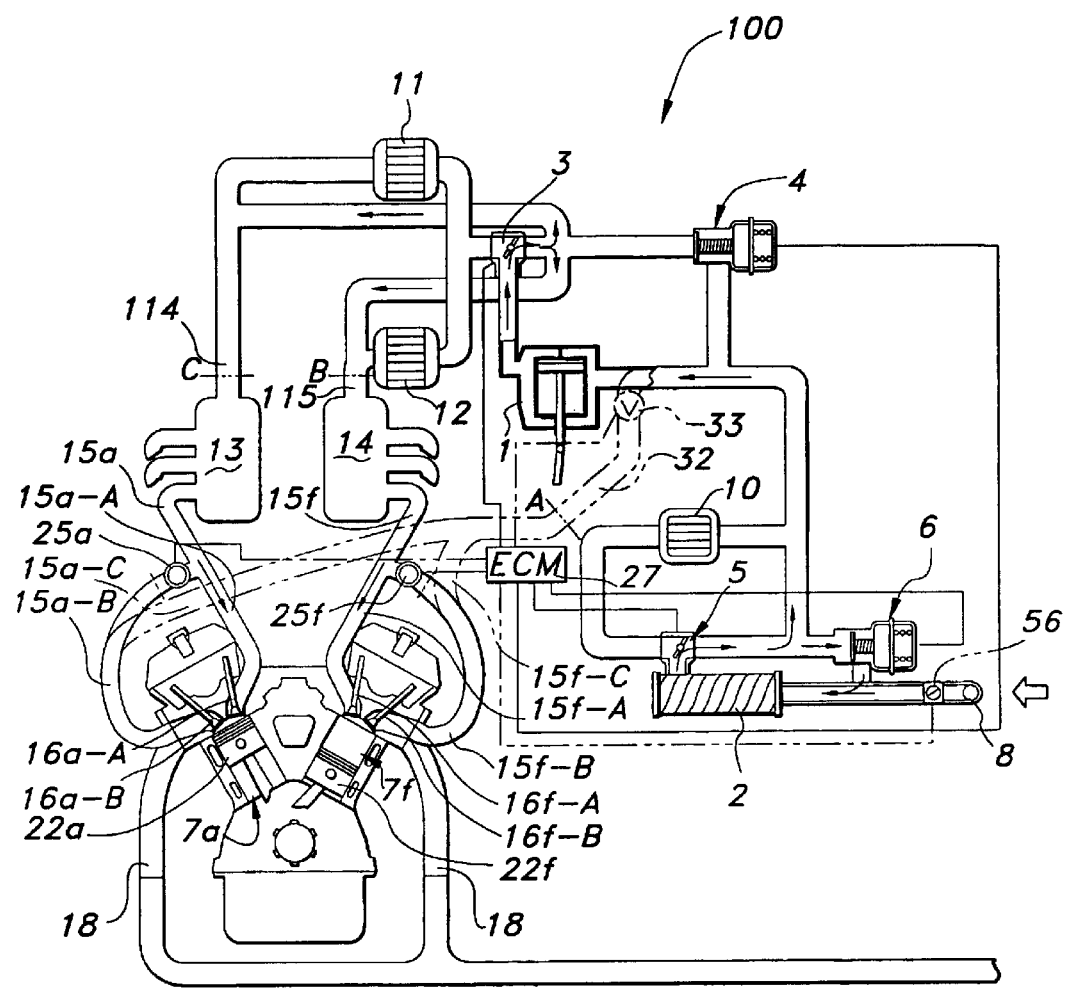
FIG. 16 shows suggested valve positions for supplying manifolds 13 and 14 with an air charge optimum for medium-load operation for the engines of FIGS. 5–7 and FIGS. 9–10. For medium-load operation the shutter valve 5 of compressor 2 would be closed and the air bypass valve 6 would be open to pass the air charge uncooled without compression to the intake of compressor 1 where closed shutter valve 3 and closed air bypass valve 4 directs the air charge now compressed by compressor 1 past the intercoolers to manifolds 13 and 14 with the air compressed and heated by compressor 1, for medium-load operation.
Figure 17:
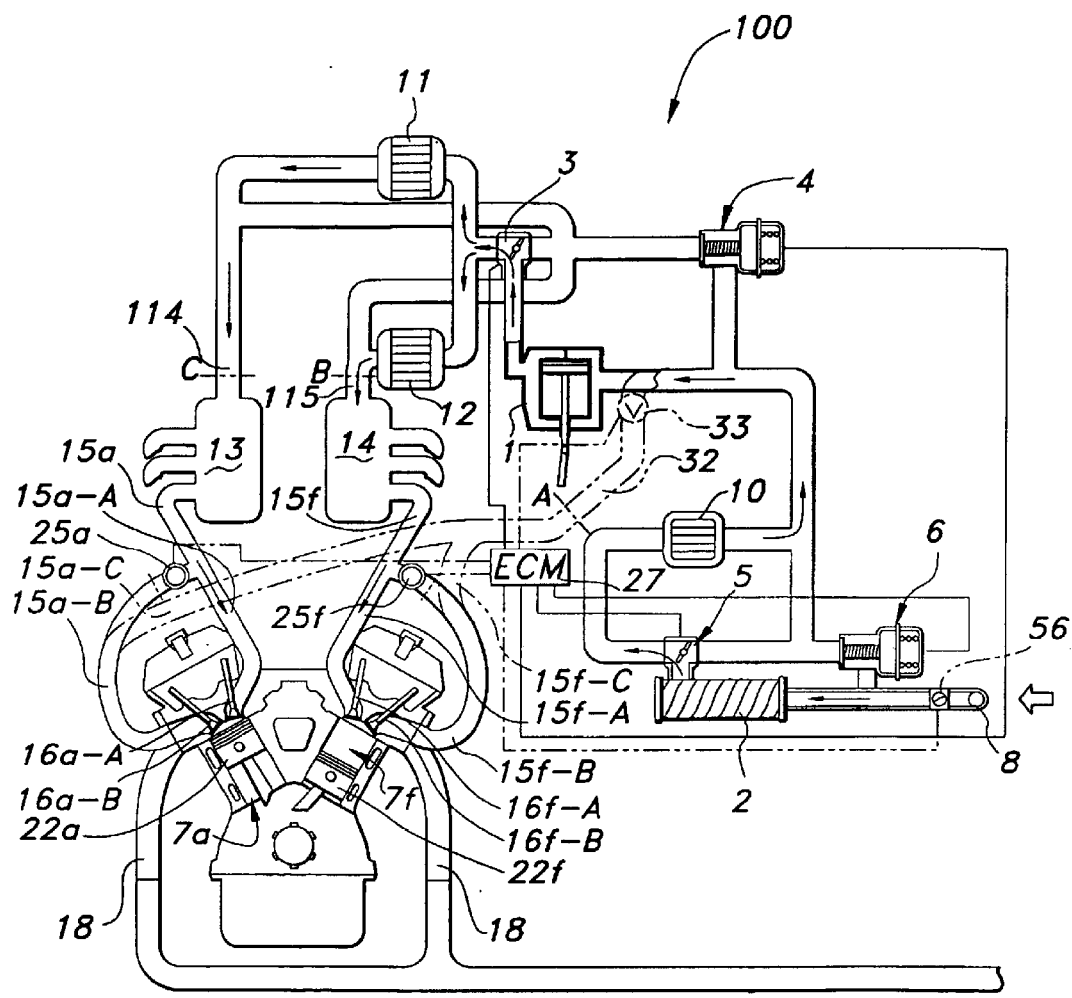
FIG. 17 shows a suggested scenario for providing the engines of FIGS. 5–7 and FIGS. 9–10 with a high density air charge for heavy duty, high power output operation.
Figure 19:
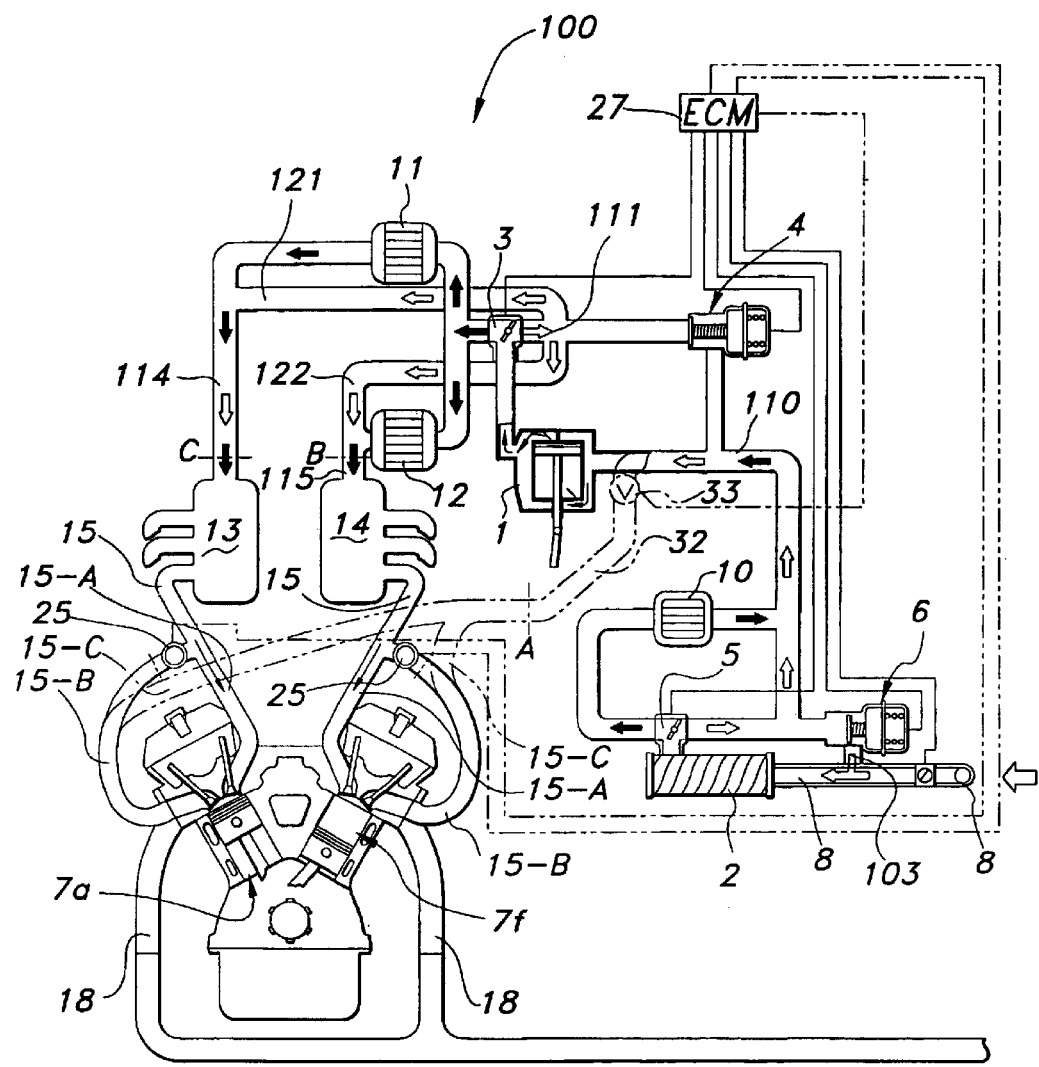
FIG. 19 is a schematic drawing representing the engines shown in FIGS. 5–7 and FIGS. 9–10 and having two compressors, and one intercooler for one stage of compression, dual intercoolers for a second stage of compression, dual manifolds, four valves and an engine control module (ECM) and illustrating means of controlling charge-air density, pressure and temperature by varying directions and amounts of air flow through the various electronic or vacuum operated valves and their conduits.
Figure 20:
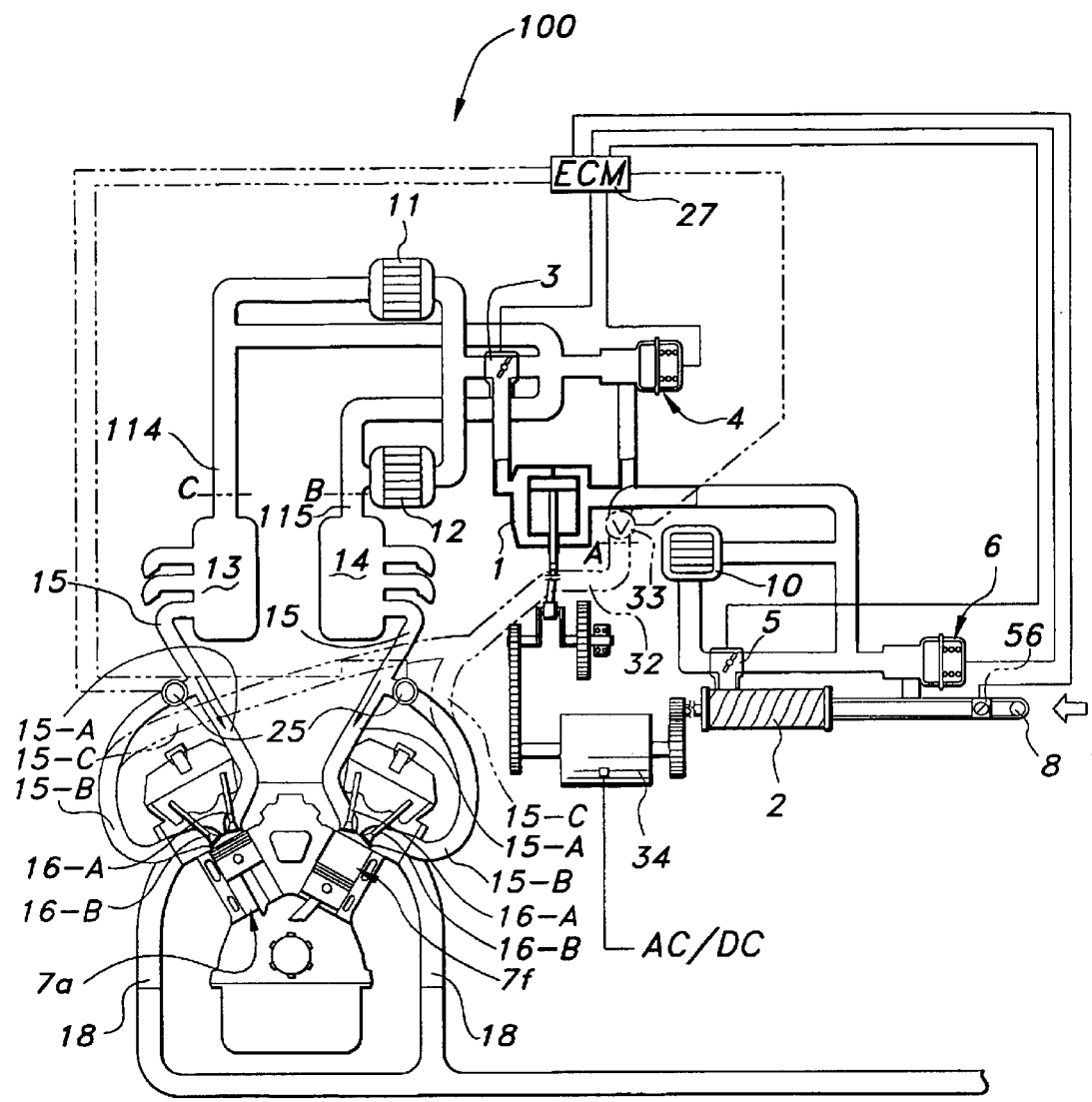
FIG. 20 is a schematic drawing showing optional electric motor drive of the air compressors of the engines of FIG. 1 through FIG. 11.

Fuel can be carbureted, injected in a throttle body 56, shown in FIG. 15 through FIG. 17 and item 56 in FIG. 19 and FIG. 20, or the fuel can be injected into the inlet stream of air, injected into a pre-combustion chamber (similar to that seen in FIG. 21) or, injected through intake valves 16-A, or it may be injected directly into the combustion chamber at point x during the exhaust-compression stroke, at the time or after the piston 22 has passed point x in the compression stroke. The fuel can also be injected later and in the case of diesel operation can be injected at the usual point for diesel oil injection, perhaps into a pre-combustion chamber or directly into the combustion chamber, perhaps as FIG. 21, or directly onto a glow plug. After the temperature-and-density-adjusting-air charge has been injected, if used, compression of the charge continues and with fuel present, is ignited at the opportune time for the expansion stroke. (The compression ratio is established by the displaced volume of the cylinder remaining after point x has been reached, being divided by the volume of the combustion chamber. The expansion ratio is determined by dividing the cylinders total clearance volume by the volume of the combustion chamber.)

Now the fuel-air charge is ignited and the power (2nd) stroke of piston 22 takes place as the combusted gases expand. Near bottom dead center of the power stroke the exhaust valve(s) 17, 17' open and the cylinder 7 is efficiently scavenged by blowdown and by loop scavenging at the end of the power stroke and largely during the piston 22 turn-around time.

It can be seen that the later the point in the compression stroke that point x is reached (the later the exhaust valve is closed), the lower is the compression ratio of the engine and the less the charge is heated during compression.

It can also be seen that the later the temperature-density-adjusting charge is introduced, the less work will be required of the engine to compress the charge, the later part of which has received some compression already by compressor 1 and or by an ancillary compressor 2. In some cases where the load is light and fuel economy important the ancillary compressor could be bypassed with the secondary air charge perhaps eliminated temporarily and the total charge weight could be less than that of a conventional engine and with the extended expansion ratio produce even better fuel economy.

During light-load operation of this 2-stroke cycle engine (FIG. 9 and FIG. 9-B) such as vehicle cruising or light-load power generation, the secondary air charge can be eliminated by disabling high pressure intake valve 16-A temporarily (several valve disabling systems Eton, Cadillac, etc.) or air can be shut off to intake valve 16-A and the engine still produce greater fuel economy and power with the air charge being supplied by compressor 2 or 1 through conduits 15-A, 110, 32 and intake valve 16-B.

The Engine $100^{9B}$- of FIG. 9-B

FIG. 9-B is a schematic representation of a six-cylinder reciprocating internal combustion engine $100^{9-B}$ which is for the most part identical to the engine $100^9$ of FIG. 9. The characteristics and operation and structure of the engine $100^{9-B}$ of FIG. 9-B are substantially similar to the engine $100^9$ of FIG. 9 and, except as necessary to point out specific points of distinction, such characteristics, operation and structure are not repeated here. Reference should be made to the sections on characteristics, structure and operations (both brief and detailed) previously presented with respect to the engine $100^9$ of FIG. 9.

The major point of distinction between engine $100^9$ and engine $100^{9-B}$ is that engine $100^{9-B}$ represents an embodiment of the engine $100^9$ wherein the compressors 1,2 are of alternate types. That is, in $100^{9-B}$, the primary compressor 1 is shown as a Lysholm rotary compressor (as opposed to the reciprocating-type compressor of engine $100^9$) and the secondary compressor 2 is of the turbo-type (as opposed to the Lysholm-type of $100^9$). Although conduit 32 from conduit 110 (designated as 106 in FIG. 9) and optional shut-off valve 33 is shown supplying intake valves 16-B of only two cylinders of the engine, it is understood that other intake runners (not shown) distribute air from conduit 110 to the remainder of the intake valves 16-B of the engine, or that conduit 32 supplies an "air box" or manifolds which distribute the air to all of the intake valves 16-B.

Referring now to FIG. 10 there is shown the same engine and the same operating system as described for the engines of FIG. 9 and FIG. 9-B, but has an optional added feature in that the secondary intake valve 16-A has an ancillary valve 26 which is automatic to prevent charge-air back-flow from cylinder 7. This feature will prevent any back-flow from occurring during the compression stroke of the engine of this invention, should the cylinder pressure approximate or exceed the pressure in conduit 15-A before the intake valve 16-A was fully closed. (This optional automatic valve 26 could be of the spring-retracted disc type, or could be any type of one-way valve.) An automatic valve at this place could be used to regulate the pressure ratio in cylinder 7 during the compression of the charge. In this case intake valve 16-A could be kept open to near top dead center, valve 26 automatically closing the intake below valve 16-A during compression, ignition and power stroke of the charge. Furthermore, the use of automatic valve 26 would allow the pressure ratio of the engine to be adjusted by simply adjusting the pressure in conduit 15-A, with intake valve 16-A being kept open to near top dead center of piston 22. The ancillary valve 26, if present, would also impart a tangentially oriented swirl turbulence to the combustion charge as would also, shrouding of intake valve 16-A.

The Engine $100^{11}$ of FIG. 11

Referring now to FIG. 11, there is shown a six cylinder reciprocating internal combustion engine $100^{11}$ with one atmospheric air intake, in which all of the cylinders 7a–7f (only one (7f) of which is shown in a sectional view) and associated pistons 22a–22f operate in a 2-stroke cycle and all power cylinders are used for producing power to a common crankshaft 20 via connecting rods 19a–19f respectively. A primary compressor 1, in this figure a double-acting reciprocating type, is shown which, with an air conduits, as shown, supplies pressurized air to one or more cylinder intake valves 16a and 16b. A secondary compressor 2 of the Lysholm type is shown in series with compressor 1. An air inlet 8 and associated inlet conduit and manifolds 13 and 14 supply air charge which has been compressed to a higher than atmospheric pressure, to a cylinder intake conduit 15 which supplies charge-air to two intake valves, which intake valves 16a and 16b operate independently of each other but open into the same cylinder. Intercoolers 10, 11 and 12 and control valves 3, 4, 5 and 6 are used to help control the air charge density, weight, temperature and pressure. The intake valves are timed to control the compression ratio of the engine. The combustion chambers are sized to establish the expansion ratio of the engine.

The engine 100 of FIG. 8, FIG. 9, FIG. 10 and FIG. 11 have cam shafts 21 fitted with cams and are arranged to rotate at engine crankshaft speed in order to supply one power stroke for each power piston for each crankshaft rotation.

The engine $100^{11}$ shown in FIG. 11 is characterized by a more extensive expansion process a low compression ratio and capable of producing a combustion charge varying in weight from lighter-than-normal to heavier-than-normal and capable of selectively providing a mean effective cylinder pressure higher than can the conventional arrangement in normal engines, but having similar or lower maximum cylinder pressure. Engine control module (ECM) 27 and variable valves 3, 4, 5 and 6 on conduits, as shown, provide a system for controlling the charge pressure, density, temperature, and mean and peak pressure within the cylinder which allows greater fuel economy, production of greater power and torque at all RPM, with low polluting emissions for both spark and compression ignited engines. In alternate embodiments, a variable valve timing system with the ECM 27 can also control the time of opening and closing of the intake valves 16a or 16b or both, to further provide an improved management of conditions in the combustion chamber to allow for a flatter torque curve, and higher power, with low levels of both fuel consumption and polluting emissions.

Brief Description of Operation of Engine 100[11] Shown in FIG. 11

The new cycle engine 100[11] of FIG. 11 is a high efficiency engine that attains both high power and torque, with low fuel consumption and low polluting emissions.

The new cycle is an external compression type combustion cycle. In this cycle part of the intake air (all of which is compressed in the power cylinders in conventional engines) is compressed by an ancillary compressor. The temperature rise at the end of compression can be suppressed by use of air coolers, which cools the intake air, and by a shorter compression stroke.

During operation air is supplied to the power cylinder 7 at a pressure which has been increased by perhaps from one-third to several atmospheres, or greater through an air intake conduit 15. Valve 16b opens by pressure on the top of the valve stem from a very small lobe on cam 21-A for a short period of time near bottom dead center position of piston 22 in order to scavenge the cylinder and provide fresh charge-air. Exhaust valves 17, 17' open for exhaust blowdown slightly before intake valve 16b opens to admit scavenging air. The cylinder 7 is efficiently scavenged mostly during the turnaround time of piston 22. During the first part of the compression stroke, perhaps as early as 10–20° after bottom dead center of piston 22 position, the first intake valve 16b closes, at a later time the exhaust valve 17, 17' closes, at which point compression of the fresh air charge starts, which establishes the compression ratio of the engine. At the point the exhaust valves 17, 17' closes or any point later, the second intake valve 16a and perhaps 16b, by a second lobe 21-C is, preferably, opened to introduce more of the temperature and density adjusted charge, if needed.

An intake valve disabler 31 in FIG. 10 (there are several on the market, for example, Eaton Corp. and Cadillac) can disable intake valve 16a when light-load operation does not require a high mean effective cylinder pressure. Alternatively, the air bypass valve (ABV) 6 is opened wholly or partially to re-circulate some or all of the charge-air back through the compressor 2 in order to relieve the compressor of compression work during light-load operation. Additionally, air bypass valve 4 can re-circulate part or all of the air pumped by compressor 1 on demand in order to reduce charge pressure and density.

One suggested, preferred method of operation of the new cycle engine 100[11] is thus:

1. Intake air at greater than atmospheric pressure that has been compressed by at least one compressor and has had its temperature adjusted by bypass systems and charge-air coolers are introduced into the cylinder 7 through intake valve 16b which is opened by a very small lobe 21-D on cam 21-A at or near bottom dead center of piston 22 at the end of the power-stroke, as exhaust valve(s) 17a, 17a' have opened a little earlier (perhaps 40° before bottom dead center) for exhaust blowdown. The exhaust valve 17 remains open through bottom dead center for efficient scavenging of the cylinder 7 by blowdown and loop scavenging. Intake valve 16b closes as the fresh high-pressure charge very quickly scavenges the cylinder 7.
2. After the power stroke is complete the exhaust valves 17 are left open for a period of time after the piston has passed bottom dead center (with intake valve 16b now closed) in order to continue to scavenge the power cylinder with the fresh air charge and further, in order to establish a low compression ratio of the engine, the compression ratio being established by the displaced cylinder volume remaining at the point of the exhaust valve 17 closure being divided by the volume of the combustion chamber.
3. With the cylinder 7 now filled with fresh air which is near atmospheric pressure, the compression (2nd) stroke continues and, at the point the exhaust valve is closed, compression begins for a small compression ratio. This makes it possible to lessen the temperature rise during the compression stroke. Compression continues, fuel is added, if not present, and the charge is fired at the appropriate point near top dead center and the power-stroke occurs.
4. (a) Alternatively, at any point deemed appropriate at the time or after the exhaust valve has closed and compression of the charge has begun, a secondary density and temperature-adjusted air charge can be injected through intake valve 16a and perhaps by a second lobe 21-C on cam 21-A, through intake valve 16b. Compression continues with the secondary air charge injection, fuel is added, if not present, the charge is ignited and combustion produces a large expansion of the combusted gases producing great energy. This energy is turned into high torque and power by the engine.
   (b) When even greater power is required, the air charge can be increased in density and weight by being passed through one or more intercoolers and by increasing compressor speed or by cutting in a second stage 2 of auxiliary compression, FIG. 11. Alternatively, the timing of closing exhaust valve 17 and of the opening of intake valve 16a could be altered temporarily to close earlier and to open earlier, respectively, for a larger charge.
5. Near bottom dead center of the piston, exhaust valves 17, 17' open and the cylinder is scavenged by blowdown and by the air injected by primary intake valve 16b.

Detailed Description of the Operation of the Engine 100[11] of FIG. 11

Near the end of the power (1st) stroke of the piston 22, perhaps at about 40° before bottom dead center position of piston 22, the exhaust valves 17 open for exhaust blowdown, shortly after, high pressure air flows through air conduit from manifold 13 and 14, as shown in FIG. 11, through an intake valve 16b into the cylinder 7, the cylinder 7 is scavenged, intake valve 16b closes. (Intake valve head 30 can be recessed as shown in FIG. 11 in order to form a pipe-like opening into cylinder 7 so that when the charge-air is highly compressed, and as much as 500–530 psi is feasible, the small lobe 21-D on cam 21-A of intake valve 16b lets in a small blast of the high pressure air which is directed downward for loop scavenging, during or just after piston 22 turnaround at bottom dead center piston position.) Exhaust valves 17 remain open during the first part of the compression (2nd) stroke of piston 22. The cylinder 7 is now efficiently scavenged by blowdown and by loop scavenging and at any point during the compression stroke, the cylinder 7, now being filled with fresh air, the exhaust valves 17, 17' can close. But since a low compression ratio is desired, the exhaust valves 17, 17' can be held open until the piston has reached the point that is desired to establish the compression ratio. At, or after the time exhaust valve 17 20 closed, a secondary charge of high pressure temperature adjusted air which has been compressed by compressor 1 and/or 2 can be injected by the second intake valve 16a and, if desired, by another lobe 21-C (in phantom) on the first valve 16b into the same cylinder. (When high torque and power is needed, the density of the charge-air can be greatly increased by increasing the speed of the primary compressor 1 or by cutting in another stage of compression, as in compressor 2, FIG. 11, and routing the charge through aftercoolers 10, 11 and 12. Also the speed of compressor 2 can be increased to shove in more charge on the back end.) Compression would continue, for a small compression ratio, fuel would be added, if not present, the charge would be ignited and the gases expanded against piston 22 for the power stroke.

For light-load operation, a shut-off valve (or a valve disabler 31 shown in FIG. 10 on the intake valve 16-A) could temporarily restrain the intake air, or hold the intake valve 16a closed. This would add to the fuel economy of the engine. Alternatively, during light-load operation the shutter valve 5 could be closed and the air bypass valve 6 opened so that air pumped by compressor 2 would be returned to the inlet conduit of the compressor 2 without any compression taking place. In the same manner valves 3 and 4 could return part of the air being pumped through back to the intake 106 of compressor 1.

The ancillary automatic intake valve 26, FIG. 10, which can be of the spring-returned disc type, can be arranged, as shown in FIG. 10, to prevent any back-flow of charge-air into conduit 15 if the cylinder pressure should equal or exceed the pressure in conduit 15 during the compression stroke of piston 22 before intake valve 16a had closed completely. (As in other engine designs herein presented, the optional automatic valve 26 shown in FIG. 10 can be utilized to control the pressure ratio of this engine. If the intake valve 16a is kept open to near top dead center, the closure of valve 26 and the pressure ratio of cylinder 7 would be controlled by control valves 3, 4, 5 and 6 and by compressor speed and by any throttle valve present.) Automatic valve 26 would seal the intake from conduit 15 during the last part of the compression stroke, ignition of the charge and during the power stroke.

Fuel can be carbureted, injected in a throttle body 56 in FIG. 15 through FIG. 17, and 56 in FIGS. 19 and 20, or the fuel can be injected into the inlet stream of air, or injected into a pre-combustion chamber or, injected through intake valves 16a, 16b, (the latter during its second opening by lobe 21-C on cam 21-A), or it may be injected directly into the combustion chamber at or past point x in the exhaust-compression stroke. The fuel can also be injected later and in the case of diesel operation can be injected at the usual point for diesel oil injection, perhaps into a pre-combustion chamber or directly into the combustion chamber or directly onto a glow plug. After the temperature-and-density-adjusting-air charge has been injected, if used, compression of the charge continues and with fuel present, is ignited at the opportune time for the expansion stroke. (The compression ratio is established by the displaced volume of the cylinder remaining after point x (at exhaust valve closure) has been reached, being divided by the volume of the combustion chamber. The expansion ratio is determined by dividing the cylinders total clearance volume by the volume of the combustion chamber.) Now the fuel-air charge has been ignited and the power stroke of piston 22 takes place as the combusted gases expand. Near bottom dead center of the power stroke, the exhaust valve(s) 17 opens and the cylinder 7 is efficiently scavenged, first by blowdown, then by loop scavenging by air from intake valve 16b at the end of the power stroke or shortly after.

It can be seen that the later the point in the compression stroke that point x (the later the exhaust valve is closed) is reached, the lower is the compression ratio of the engine and the less the charge is heated during compression.

It can also be seen that the later the temperature-density-adjusting charge is introduced, the less work will be required of the engine to compress the charge, the later part of which has received some compression already by compressor 1 and/or by an ancillary compressor 2. In some cases where the load is light and fuel economy important the ancillary compressor could be bypassed with the secondary air charge perhaps eliminated temporarily and the total charge weight could be less than that of a conventional engine.

Figure 12:
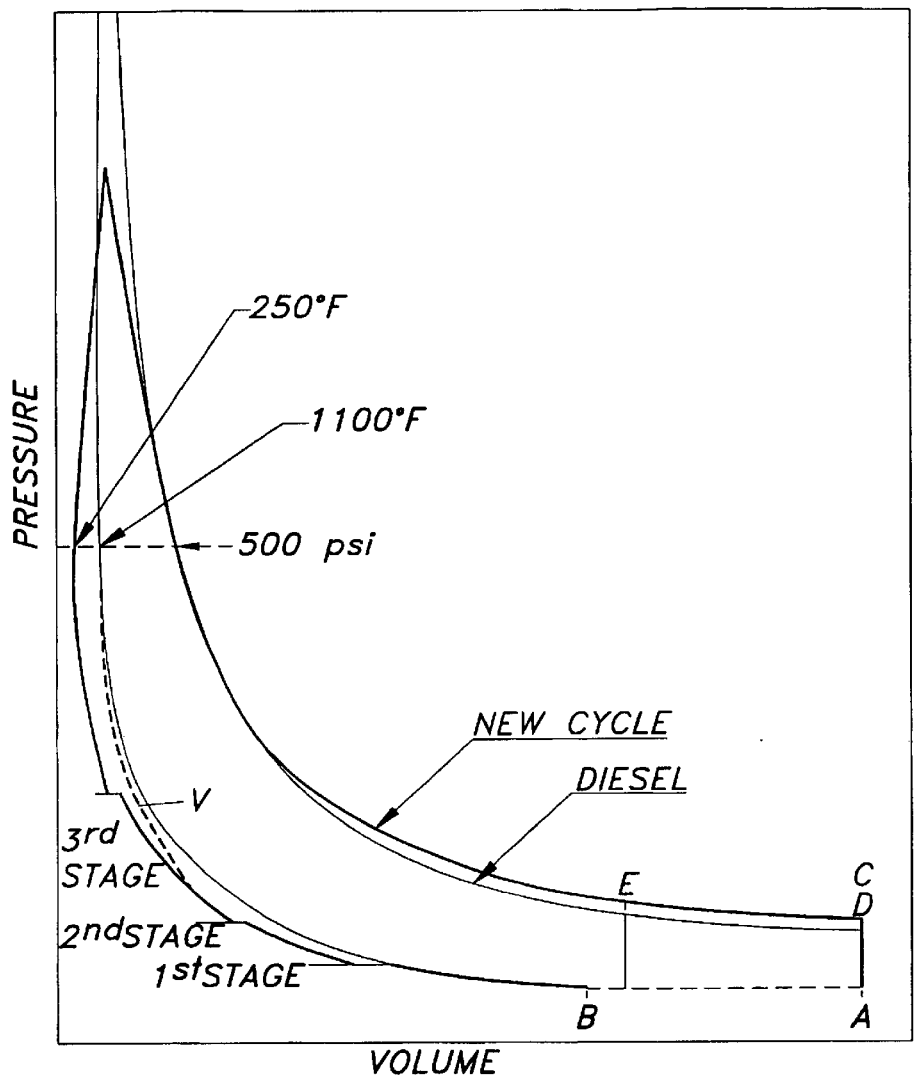
FIG. 12 is a pressure-volume diagram comparing the cycle of the engine of this invention with that of a high-speed diesel engine.

Referring now to FIG. 12 there is shown a pressure-volume diagram for a high-speed Diesel engine compared to the engines of this invention, showing three stages of intercooled compression and a fourth stage of uncooled compression indicating a compression ratio of approximately 2:1, which arrangement is suggested for optimum power, with efficiency for the engine of this invention. (The charts of FIG. 13 and FIG. 14 show some of the improvements of the engine of this invention over current heavy-duty 2-stroke and 4-stroke engines.)

There are several features that improve the thermal efficiency of the engine of this invention. Greater power to weight ratios will provide a smaller engine with less frictional losses. The extended expansion ratio results in higher thermodynamic cycle efficiency, which is shown in theoretical considerations. There are also definite efficiency gains in a "staged" compression process even with external compressors with associated piping, intercoolers and aftercoolers, etc. There is a very significant energy savings when air is compressed in intercooled stages. Less energy is used in compressing a charge to 500 psi in 2, 3 or 4 intercooled stages than is used to compress the hot charge to the same 500 psi in a conventional engine. A normal engine uses approximately 20% of its own energy produced to compress its own air charge. Calculations show a significant energy savings in an engine if the air is compressed in aftercooled stages. Compressing a charge in only two stages to 531 psi (a 13:1 compression ratio) reduces the energy used by 15.8% over compressing to the same 531 psi level in a single stage as does the Otto and the Diesel Cycle engines. Three stages of intercooled compression raises the savings to 18%. This is the ideal. Degradation from the ideal should not exceed 25% which leaves a 13.5% energy savings. This 13.5% energy savings times the 20% of a normal engine's power used for compressing its own charge, is a 2.7% efficiency improvement by the compression process alone. This is one of the advantages of this engine which adds to the other thermal efficiency improvements. The low compression ratio, along with the large expansion ratio provides improvements in efficiency, torque, power and durability while lowering polluting emissions.

Note 1—In FIG. 12 the travel distance of the line for engine B on the horizontal coordinate indicates the theoretical volume at the greater density. The density is kept at that level at the actual combustion chamber volume (as shown by dashed line V) regardless of the density, by pumping in more charge at the back-side.

Referring now to FIG. 13, there is shown a chart which compares various operating parameters of the engine of this invention (B) with the operation parameters of a popular heavy-duty, 2-stroke diesel cycle engine (A).

The parameters shown for engine A are the normal operating parameters for that engine, e.g., compression ratio, combustion temperatures, charge density, etc. The parameters chosen to illustrate for engine (B) are given at two different lower nominal compression ratios with corresponding effective compression ratios, intercooled and uncooled, for two different levels of power output. The columns showing charge densities and expansion ratios indicate the improvements in steady state power density improvements for engine B even at a substantially lower nominal compression ratio and an effective compression ratio as low as 2:1 as shown in FIG. 10. The columns showing low temperatures at the end of combustion, and the column showing extended expansion ratios indicate much lower polluting emissions. Indicated power improvements of engine (B) over engine (A) even at the lower nominal compression ratio are no less than 50%.

Referring now to FIG. 14 there is shown a chart which compares the various operating parameters of the engine of this invention (B) with the operating parameters of a popular heavy-duty 4-stroke diesel engine (A).

When comparisons similar to those of FIG. 13 are made, steady state power and density improvements are much higher since engine (B) fires the denser charge twice as often as engine A for an indicated steady-state power density improvement of 180% over engine (A).

Referring now to FIG. 15, there is shown a schematic drawing of an engine representing the engines of FIGS. 5–7, and FIGS. 9–10 with a separate air cooler 10 for ancillary compressor 2, with the primary compressor 1 supplying two manifolds 13 and 14 and having separate air coolers 11 and 12 and charge-air conduits 114 and 115, and having each manifold having three cylinder air intake runners 15a–15c, 15d–15f, respectively. The engine of FIG. 15 operates the same as the engines of FIGS. 5–7 and FIGS. 9–10 and here shows suggested valving positions for shutter valve and air bypass valves for supplying the manifolds 13 and 14 with an air charge optimum for light-load operation of the engine of FIGS. 5–7 and FIGS. 9–10. For light-load operation, the shutter valve 5 can be closed and the air bypass valve 6 of compressor 2 (if compressor 2 is not supplying primary air charge directly to conduit 32 and intake valve 15-B) can be opened fully or partially so that part or all of the intake air of compressor 2 can be returned to the intake of compressor 2 with little or no compression occurring there. Also, the shutter valve 3 of compressor 1 can be closed, passing the air charge away from the coolers 11 and 12, the air bypass valve 4 would be closed to prevent re-circulation of the now compressed and heated air back through compressor 1 and whose shutter valve 3 and air bypass valves are both directing the air charge uncooled into manifold 13 and 14 for a low density heated charge for light-load operation. Preferably compressor 2 would be kept operative in order to supply the primary air charge through conduits 110, 32 and intake valve 16-B for a more economical scavenging-charging system.

Referring now to FIG. 16, there is shown suggested valve positions for supplying manifolds 13 and 14 with an air charge optimum for medium-load operation for engines of FIG. 16 or for the engines of FIGS. 5–7 and FIGS. 9–10. For medium-load operation the shutter valve S of compressor 2 is closed and the air bypass valve 6 would be opened to pass the air charge uncooled and without compression to the intake of compressor 1 where closed shutter valve 3 and closed air bypass valve 4 directs the air charge now compressed by compressor 1 past the intercoolers to manifolds 13 and 14 with the air compressed and heated by compressor 1, for medium-load operation.

Referring now to FIG. 17, there is shown a suggested scenario for providing the engine of FIG. 17 or for the engines of FIGS. 5–7 and FIGS. 9–10 with a high density air charge for heavy duty, high power output operation. FIG. 17 shows both shutter valves 3 and 5 open and both air bypass valves 4 and 6 closed completely so that the primary stage of compression is operative and a second stage of compression has been made operative for maximum compression of the charge and the entire air charge is being passed through the intercoolers 10, 11 and 12 to produce a cooled, very high density air charge to manifolds 13 and 14 and to the engines power cylinders for heavy-load operation. This produces a very high mean effective cylinder pressure for high torque and power with maximum cylinder pressure being the same as, or lower than that of normal engines.

Figure 18:
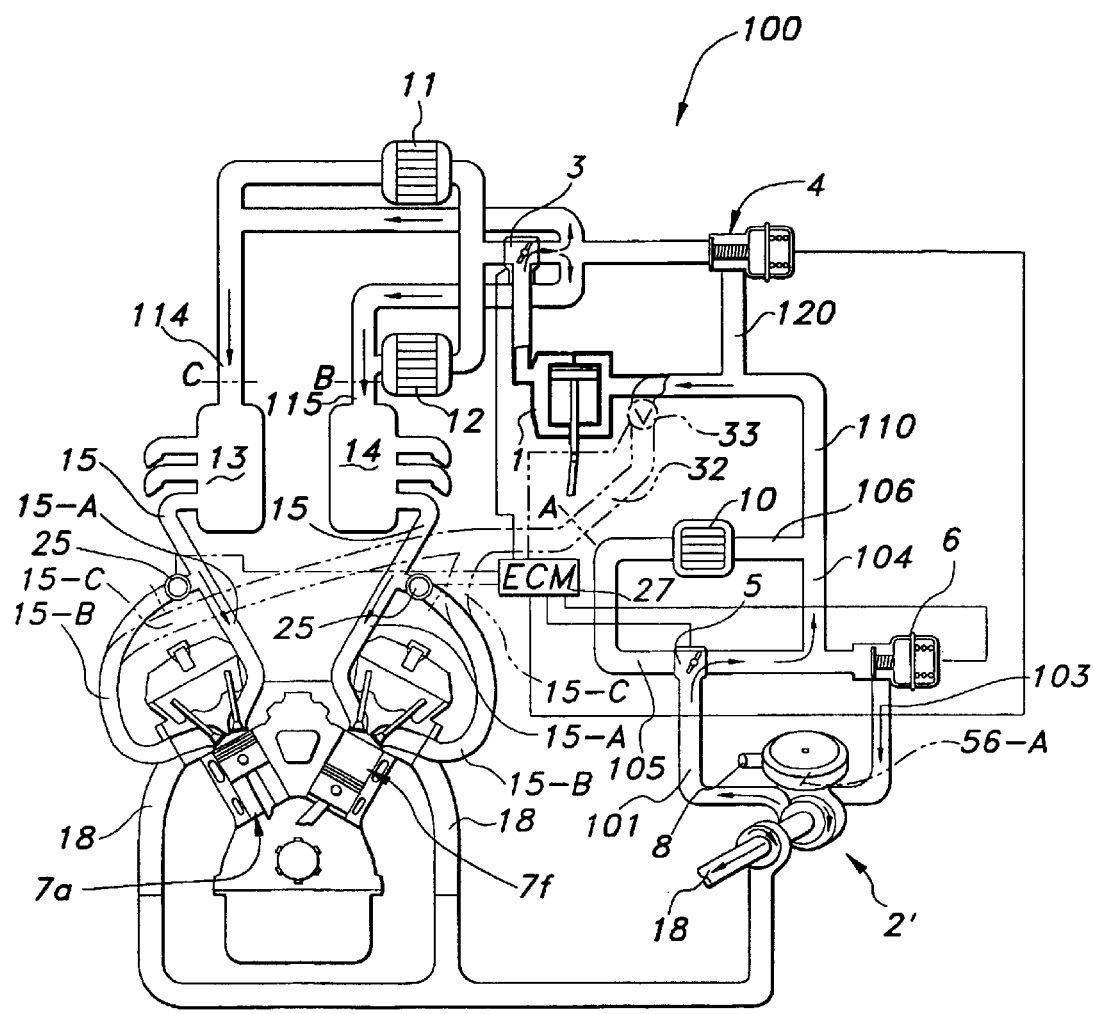
FIG. 18 shows a schematic drawing representing any of the engines of FIG. 3–FIG. 11, depicting an alternative type of auxiliary compressor 2' and a system of providing a means for disabling or cutting out the auxiliary compressor when high charge pressure and density is not needed. For relieving compressor 2' of work, shutter valve 5 is closed and air bypass valve is opened so that air pumped through compressor 2' can re-circulate through compressor 2' without requiring compression work.

Referring now to FIG. 18, there is shown a schematic drawing of an alternative type of auxiliary compressor 2' for the engines of FIGS. 5–7 and FIGS. 9–10 and for any other engine of this invention and a system of providing a system for cutting out the auxiliary compressor when high charge pressure and density is not needed. For relieving compressor 2' of work, (if the air compressed by compressor 2 does not go directly to conduit 32 and valve 16-B to supply the primary air charge) shutter valve 5 is closed and air bypass valve 6 is opened so that air pumped through compressor 2' can re-circulate through compressor 2, thus relieving the compressor of compression work.

Referring now to FIG. 19, there is shown a schematic drawing of the engines of FIGS. 5–7 and FIGS. 9–10, illustrating means of controlling charge-air density, temperature and pressure by varying directions of air flow through various electronic or vacuum operated valves and their conduits.

FIG. 19 also shows the various charge-air paths possible by using hollow arrows to indicate heated air paths and solid arrows to indicate the more dense intercooled air paths thereby indicating how charge-air temperatures can be thermostatically or electronically controlled by dividing the air charge into two different paths. Alternatively, all of the air charge can be directed past the air coolers or all can be directed through the air coolers, as shown in FIG. 19. Also, FIG. 19 shows how the pressure output of compressor 1 and compressor 2 can be varied by partially or fully opening air bypass valves 4 and 6 or by completely closing one or both of these control valves. An engine control module (ECM) 27 is suggested for controlling the various operating parameters of the engines of this invention.

Referring now to FIG. 20, there is shown is a schematic drawing depicting an alternate arrangement in which an electric motor 34 preferably drives the compressor(s) of any of the engines of the present invention.

Charge-air Cooler Bypass (ACB) "Shutter Valve" Control

In this section are described aspects of preferred control components which find application in connection with any of the engines (4-stroke and 2-stroke) of the present invention.

Outline: Valves 3 and 5 are charge-air-cooler bypass solenoid (ACB) valves. In charge-air cooler bypass control, the intake air is switched between two routes by valves 3 and 5, independently of each other: either (a) valve 5 directs the flow from compressor 2 directly to the intake conduit of compressor 1 or (b) through the charge-air cooler 10 before flowing to the intake conduit of compressor 1. Valve 3 directs the flow from compressor 1 either (a) to the conduit 111/121/122 leading directly to the intake manifolds 13 and 14 or (b) it passes the air charge through charge-air coolers 11 and 12 before it flows to manifolds 13 and 14.

An engine control module (ECM) 27 can control the air cooler bypass valves 3 and 5. The bypass valves may be a shutter type valve to pass all or none of the air charge in either direction or valves 3 and 5 may be of a helical solenoid or other type of valve which can pass part of the air charge through bypass conduits 121 and 122 and part through air coolers 10, 11 and 12 for fine control of the temperature and density of the air charge. The ECM could receive signals from sensors such as an engine coolant sensor, a crankshaft position sensor, throttle position sensor, camshaft position sensor, a manifold absolute pressure sensor and a heated oxygen sensor.

Air Bypass Valve (ABV) Control

Outline: To provide optimum air charging pressure for differing engine operations conditions, the ECM 27 can send signals to control air bypass valves 4 and 6. These valves could be on-off solenoid valves, possibly vacuum operated, or they could be helical solenoids or other type of valve which could open part way or all way in order to re-circulate part or all of the air charge back through the inlets 110 and 8 of compressors 1 and 2 in order to reduce or eliminate entirely the pumping pressure of either compressor 1 or compressor 2, or both. Similar arrangements of air pressure control could be used for additional stages of air compression if additional stages are used.

The operation could be thus: The ABV valves 4 and 6 can be controlled by signals from the ECM 27 to control the opening angle of valves 4 and 6 to provide the optimum air charging pressures for various engine loads and duty cycles. When ABV 6 is opened partially some of the air pumped through compressor 2 is passed back into the intake 8 of compressor 2 to reduce compression pressure. When ABV 6 is opened fully all of the charge of compressor 2 is passed back through compressor 2, thus compressor 2 only pumps the charge through with no pressure increase. The system can work the same for valve 4 which could bypass some of the air charge pumped by compressor 1 back into the intake conduit 110 of compressor 1 in order to reduce air charge density.

With this arrangement, combined with the arrangement of ECM 27 control of charge-air cooler bypass system for variable valves 3 and 5, the temperature, density, pressure and turbulence of the charge-air can be managed to produce the desired power and torque levels and emissions characteristics in the power cylinder of the engine.

Engine conditions that could be monitored by ECM 27 in order to effect proper engine conditions in regard to control of ABV valves 4 and 6 could include a throttle position sensor (or fuel injection activity sensor), intake air temperature sensor at various points, manifold absolute pressure sensor, camshaft position sensor, crankshaft position sensor, exhaust temperature sensor, a heated oxygen sensor and/or other sensory inputs known to be used in internal combustion engines.

The ECM 27 can control both the shutter valves 3 and 5 and the air bypass valves 4 and 6 in order to maintain the optimum air charging density pressure and temperature at all engine operating duty cycles.

Alternate Combustion Systems

Referring now to FIG. 21, there is shown a schematic transverse view of a re-combustion chamber 38', a combustion chamber 38, a piston crown 22 and associated fuel inlet 36, a sparking plug 37, an air or air/fuel mixture inlet 8' duct, intake valve 16, an exhaust duct 18' an exhaust valve 17 suggested for liquid or gaseous fuel operation for the engines of this invention or for any other internal combustion engine.

There are many choices of systems for compression or spark ignition combustion for the engine of this invention, as shown in FIG. 1 through FIG. 33. Every fuel from avgas to heavy diesel fuels, including the alcohols and gaseous fuels can be spark ignited (SI) in this engine. One good SI system would be similar to the system shown in FIG. 21 for compressed natural gas, propane, hydrogen, gasoline, alcohols or diesel fuel. In this system, an extremely fuel rich mixture constituting the entire fuel charge is, preferably, injected into the pre-combustion chamber 38'. The fuel could be injected through fuel duct 36 with or without air blast injection, the air charge, some of which can accompany the fuel charge would be compressed into the pre-combustion chamber 38' by piston 22 during the compression stroke. Additional air with or without additional fuel, could be introduced into the cylinder proper either on the intake stroke or on the compression stroke through intake conduit 8'. In either case the second combustion stage in the cylinder proper would be with a lean mixture.

The Two-stage Combustion System Shown in FIG. 21 Will Operate in This Manner:

1. Pre-combustion (First Stage)

Pre-combustion occurs in the pre-combustion chamber 38' when fuel in an amount much in excess of the amount of oxygen present is injected and ignited (injector not shown). This oxygen deficiency along with the cooler, turbulent charge and lower peak temperatures and pressures greatly reduces the formation of oxides of nitrogen. The combination of the hot pre-combustion chamber wall and intense turbulence promotes more complete combustion.

2. Post-combustion (Second Stage)

Post-combustion takes place at lower pressure and relatively low temperature conditions in the space above the piston in the cylinder as the gases expand from the first stage pre-combustion chamber into the cylinder proper. If there is additional fuel in the cylinder proper, the leaner mixture is ignited by this plasma-like blast from the pre-combustion chamber. The low temperature and the admixture of burned gases prevent any further formation of oxides of nitrogen. Excess air, a strong swirling action, and the extended expansion process assure more complete combustion of carbon monoxide, hydrocarbons, and carbon.

The results of the engine of this invention using the pre-combustion chamber 38' of FIG. 21 are: higher thermal efficiencies due to the greater expansion, along with a cooler exhaust and a lower level of polluting emissions including oxides of nitrogen, and in addition for diesel fuels, lower aromatics and particulates.

Figure 22:
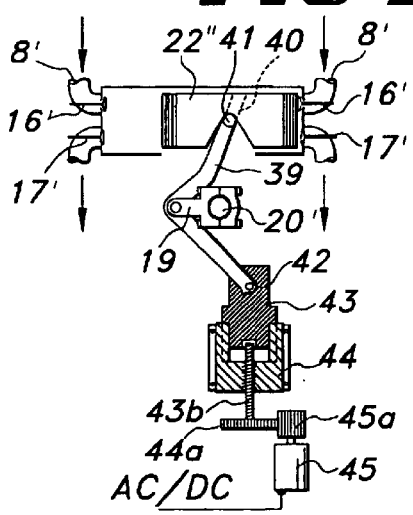
FIG. 22 is a part sectional view through one cylinder of an engine showing an alternate construction whereby there is supplied two firing strokes each revolution of the shaft for a 2-stroke engine and one firing stroke each revolution of the shaft for a 4-stroke engine, having a beam which pivots on its lower extremity, a connecting rod which is joined midpoint of the beam and is fitted to the crankshaft of the engine, and whereby a means is provided for varying the compression ratio of the engine at will.

Referring now to FIG. 22 there is shown a schematic transverse sectional view of an optional cylinder of the engine of this invention which will convert the 2-stroke engine of FIGS. 8 through 33 to a one-stroke cycle engine and will convert the 4-stroke engines of FIG. 1 through FIG. 7 and FIG. 33 to operate in a 2-stroke cycle.

By building any 2-stroke engine with all power cylinders double acting, the power to weight ratio can be doubled over the basic engine. One end of the cylinder fires and the other end is scavenged on each stroke for a nominal one stroke cycle engine in the engines of FIG. 8 through FIG. 33. Use of double-acting power cylinders in the 4-stroke engine of FIG. 1 through FIG. 7 and FIG. 33 converts the engine to a 2-stroke engine because one end of the cylinder is scavenged and one end is fired during each crankshaft rotation.

In the design of FIG. 22 needed variation of beam 39 length is accomplished by the beam end forming a scotch yoke 40 and fitting over the wrist pin 41 of the piston.

The double ended piston 22" can be linked to the end of a vertical beam 39 that pivots at the lower end 42. A connecting rod 19' is joined between the midpoint of the beam and the crankshaft 20'.

Since the crankshaft 20' itself does no more than transmit torque, its main bearings will be very lightly loaded. As a result little noise will reach the supporting casing. Because of the lever action, the crank (not shown) has half the throw of the piston stroke and can be a stubby, cam-like unit with large, closely spaced pins having substantial overlap for strength.

The compression ratio can be changed by slightly lengthening or shortening the effective length of the beam 39. This can be done by the lower pivot plate 42 being attached to a block 43 mounted slidably in a fixed block 44 and in which block 43 can be moved slidably by a servo motor 45. The gear 45a rotated by servo motor 45 is much longer than the gear 44a on the screw 43b which is rotatably attached to block 43 and rotates against threads in block 44, causing gear 44a to slide back and forth on gear 45a as block 43 reciprocates in block 44. Thus as a diesel, it could be started at 20:1 ratio and then shifted to a 13:1 ratio for less friction and stress on parts. This could also be important to allow use of alternate fuels.

Figure 23:
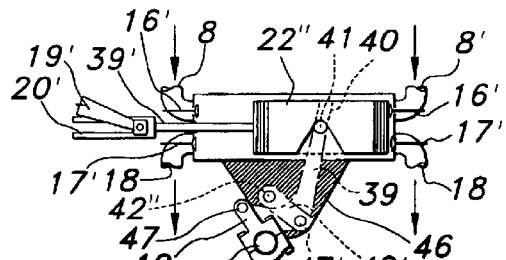
FIG. 23 is a part sectional view through one cylinder of an engine showing an alternate construction whereby there is supplied two firing strokes each crankshaft revolution for a 2-stroke engine and one firing stroke each revolution of the shaft for a 4-stroke engine, and whereby the beam connecting the connecting rod and the piston pivots at a point between the piston and the piston connecting rod, which connecting rod is attached to the crankshaft of the engine, and an alternate preferred means of power take-off from the piston by a conventional piston rod, cross-head and connecting rod arrangement.

Referring now to FIG. 23: These same advantages hold true for the alternate design (FIG. 23) in which the pivot 47' is between the connecting rod 19 and the piston 22".

The needed variation of the length of the beam 39 (shown in phantom) connecting the piston 22" to the connecting rod 19 can be accomplished by forming a scotch yoke 40 on the beam end fitting over the wrist-pin 41 of the piston 22", or by placing a double pivoting link 42' between the pivot 47' on the fulcrum of beam 39' with the pivot 42" being attached to a non-movable part 46 of the engine and the terminal end of beam 39' being connected to connecting rod 19 by a pin 47.

Alternately and preferably, for heavy duty engines (marine propulsion, power production, etc.) the power take off of piston 22" could be with a conventional piston rod 39' being arranged between piston 22" and a crosshead 20'with a connecting rod 19' between the crosshead 20' and the crankshaft (not shown).

Double-acting power cylinders when used in the engine of this invention will be especially of importance where great power is desired and cooling water is readily available, e.g., for marine use or for power generation.

These double-ended, double-acting cylinders can be used in all of the designs of this invention.

Figure 24:
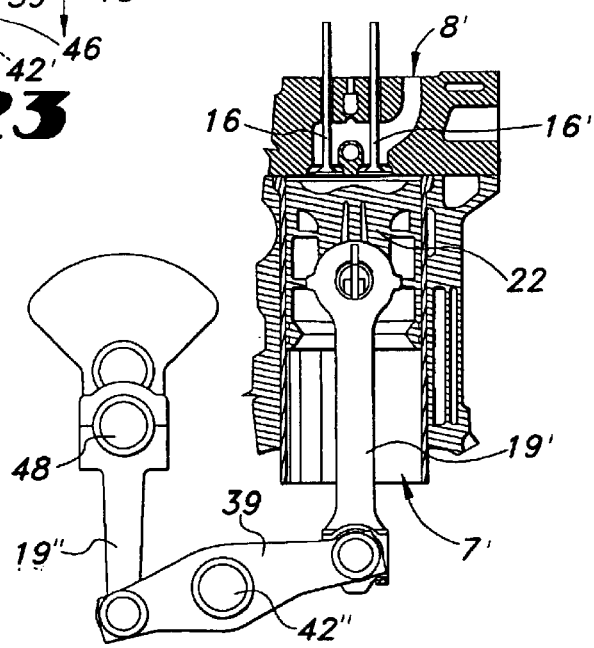
FIG. 24 is a part sectional view through one cylinder of an engine showing a means of providing extra burn-time each firing stroke in a 2-stroke or 4-stroke engine.

Referring now to FIG. 24: There is shown a schematic transverse sectional view of a crankshaft, two connecting rods 19' and 19" and a beam 39 showing a means of providing extra burn time of a conventional 2-stroke or 4-stroke engine.

This layout for any engine provides for double the piston 22' turnaround time of a normal engine during the critical burn period. This is because piston 22' top dead center (TDC) occurs at bottom dead center (BDC) of the crank 48. At this point, crankpin motion around piston 22' top dead center is subtracted from the straightening movement of the connecting rod 19', instead of being added to it as in conventional engines. Reversing the usual action slows piston travel around this point, resulting in more complete combustion and further reducing emissions.

The extra burn time provided by the design of FIG. 24 can be important in the engines of this invention and to any Otto or Diesel cycle engine.

Operation of the engine constructed and arranged with the additional burning time would be the same as the other engines of this invention providing high charge density, low compression-ratios with a mean effective pressure higher than conventional engines but with more combustion time than other engines while producing even less polluting emissions.

Since the crankshaft 48 in FIG. 24 itself does no more than transmit torque, its main bearings will be very lightly loaded. As a result little noise will reach the supporting casing. Because of the lever action, the crank can have as little as half the throw of the piston stroke (depending on the point of the fulcrum), and can be a stubby, cam-like unit with large, closely spaced pins having substantial overlap for strength.

This layout also provides for nearly twice the combustion time of a conventional engine during the critical burn period. This is because piston top dead center occurs at bottom dead center (BDC) of the crank.

The Engine 100$^{25}$ of FIG. 25

Referring now to FIG. 25 of the drawings, there is shown a six cylinder reciprocating internal combustion engine in which all of the cylinders 7a–7f (only one (7f) of which is shown in a sectional view) and associated pistons 22a–22f are adapted to operate in a 2-stroke cycle and all cylinders are used for producing power to a common crankshaft 20 via connecting rods 19a–19f, respectively. A compressor 2 supplies air to scavenging ports 52 by way of optional shut-off valve 33-M and conduit 32 and to cylinder charge inlet valve(s) 16 and 16' by way of conduits 15. The engine of FIG. 25 is adapted to operate in a 2-stroke cycle so as to produce six power strokes per revolution of the crankshaft 20. To this end, compressor 1 takes in an air charge which may have been previously subjected to compressing to a higher pressure, via an admission control valves 5 and 6 through an intake conduit 110, leading from compressor 2 by way of intercooler 10 or bypass conduit 104 and shutter valve 5. During operation of the engine of FIG. 25, compressor 2 receives atmospheric air through inlet opening 8, pre-compresses the air charge into conduit 101 leading to control shutter valve 5 which in response to signals from the ECM 27, to shutter valve 5 and air bypass valve 6, will direct the compressed charge through intercooler 10 or through cooler bypass conduits 104 to compressor 1. The air charge is compressed within compressor 1 by its associated piston 131, and the compressed air charge is forced through an outlet into a high pressure transfer conduit 109 which leads to control shutter valve 3 which, if open, directs the air through intercooler 11 and 12 to manifolds 13 and 14 or, if closed, through a conduit and air bypass valve 4 which can direct part of the air charge back through inlet conduit 104 of the compressor 1, or valve 4 if fully closed, directs all of the charge from compressor 1, in response to signals from the engine control module (ECM) 27, through the intercoolers 11 and 12 or through the bypass conduit 111/121/122 into manifolds 1, and 14. Manifolds 13 and 14 are constructed and arranged to distribute the compressed air charge by means of branch conduits 15a–15f to inlet valves 16 and 16' of the cylinder 7a, and to the remaining five power cylinders 7b–7f. In an alternate embodiment, instead of providing scavenging air through conduit 32', scavenging air is provided through shut-off valve 49 and conduit 50 and pressure reducing valve 25 to air box 51, through conduits 125a–125f to scavenging ports 52a–52f.

The engine 100$^{25}$ shown in FIG. 25 has a camshaft which is arranged to be driven at the same speed as the crankshaft in order to supply one working stroke per revolution for the power pistons. The compressor can be reciprocating, comprised of one or more stages of compression with one or more double-acting cylinders, one is shown, 1 in FIG. 25.

The compressor can be driven by associated connecting rods 19g to crankshaft 20 which can have throws of different lengths for different length piston strokes for the air compressor(s) than those of the power pistons. In addition, compressor 1 can be driven by a second crankshaft (not shown) which is driven by a gear meshing with a step-up gear mounted on the common crankshaft. The ancillary rotary compressor, a Lysholm type is shown 2, can be driven by a V-pulley being rotated by a ribbed V-belt and has a step-up gear arranged between the V-pulley and the compressor drive shaft. The rotary compressor 2 could also have a variable speed, or two speed drive, as in some aircraft engines.

Figure 26:
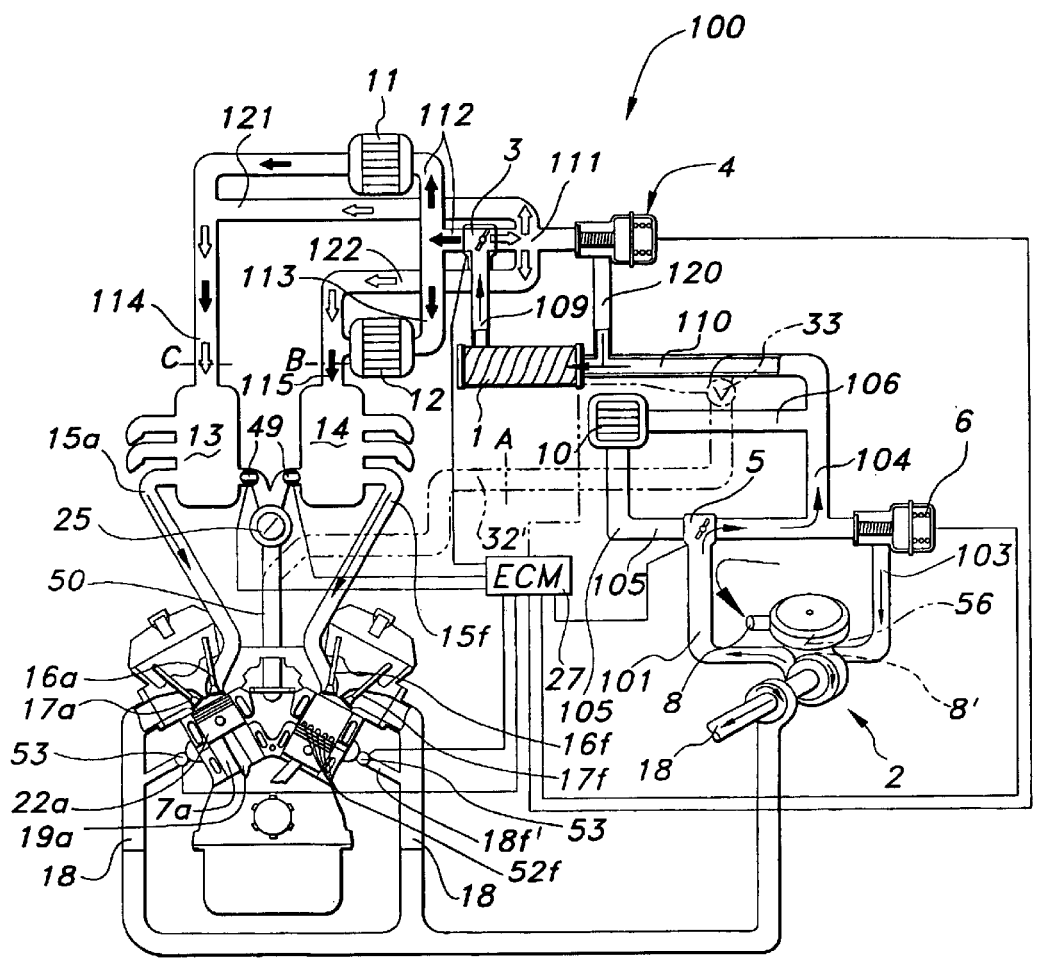
FIG. 26 is a schematic drawing of an engine similar to the engine of FIG. 25 showing one intercooler for one optional stage of compression, dual intercoolers for a primary compression stage and showing a control system (including engine control module (ECM) and valving) for controlling charge-air density, weight, temperature and pressure by controlling directions and amounts of air flow through the various valves, conduits and an optional throttle valve, and showing two optional routes for supplying scavenging air to the scavenging ports in the bottom of the cylinders, and alternative routes for the exhausted gases to exit the engine.

The operation of engine $100^{25}$ shown in FIG. 25 is thus: Charge-air is inducted into the inlet opening 8 of compressor 2. From there it is pumped through the compressor 2 where it is directed by shutter valve 5 through the intercooler 10 or through a conduit to air bypass valve 6 where it is directed to the inlet of compressor 1. The charge is then pumped by compressor 1 through the outlet valve to shutter valve 3 which directs the air charge either through intercoolers 11 and 12, to manifolds 13 and 14 or into a conduit leading to air bypass valve 4 which can direct a part of the charge back through the inlet of compressor 1 or valve 4 directs the charge wholly or partially to the shutter valve 3 which directs the charge wholly or partially through intercoolers 13 and 14, or directly to manifolds 13 and 14 which distributes the temperature-adjusted charge-air to cylinder 7 inlet valves 16 and 16' to each power cylinder of the engine. An off-and-on control valve (not shown) and conduit 32' directs air to air box 51 and to scavenging ports 52a–52f in the bottom of cylinders 7a–7f. In the alternates embodiment (shown in phantom in FIG. 25), the scavenging air is directed through pressure reduction valve 25, arranged on conduit 50 to provide and adjust scavenging air pressure from compression 1. Another option to reducing the manifold air pressure for scavenging the cylinders 7a–7f is to use the manifold air through conduit 50, air box 51 and intake ports 52a–52f without reducing the pressure from manifolds 13 and 14. The air would be used at full pressure for scavenging by the scavenging ports 52a–52f in FIG. 25 and through inlet port 52" and exhaust port 52' in FIG. 30, which ports 52a–52f, 52' and 52" would be constructed much smaller than normally done. In this instance, although the scavenging ports were smaller-than-normal, the higher-than-normal pressure scavenging air would be very efficient. Several means of scavenging the cylinders are suggested herein. FIG. 26 illustrates more clearly (although in phantom) the preferred system of supplying low pressure scavenging air. Conduit 32' and valve 33 (shown in phantom in FIG. 26) channels air from conduit 110 from compressor 2 to conduit 50 which supplies scavenging air to air box 51.

The engine control module (ECM) 27 (see, for example, FIG. 26) controls valves 3, 4, 5, and 6 in order to adjust the pressure, temperature and density of the charge going to the combustion chambers and valve 25, and can selectively direct a portion, a portion at a reduced pressure of the air charge to scavenging ports 52 and can control valve 53 and valves 49' to open or close to select the mode of scavenging desired. The ECM can also control a variable-valve-happening control system to adjust the valve opening time and duration of opening time of inlet valves 16 and exhaust valves 17 in relationship to the degree or angle of rotation of crankshaft 20, in order to adjust the compression ratio of the engine for optimum performance in regard to power, torque, fuel economy, fuel characteristics and to scavenging mode desired.

The Preferred Operation of the Power Cylinders Shown in FIG. 25 is in This Manner:

After blowdown and scavenging of the cylinder 7 has taken place the cylinder is now filled with fresh air, and piston 22 has closed exhaust ports 52 and the piston 22 is in its scavenging-charging stroke and is rising with the exhaust valve 17 still open, at any point, perhaps as early as 120 to 90 degrees before top dead center, the exhaust valve 17 is closed to establish the compression ratio and begin compression, intake valve 16, 16' are opened at that time or later in order to produce the desired charge density and weight desired, the compressed air charge or fuel air mixture is injected through intake valve 16, 16', intake valve 16, 16' is then closed. Compression of the charge which started at point X, the point where exhaust valve 17 was closed, continues with the compression ratio being established by the cylinder clearance volume remaining at point x, divided by the combustion chamber volume. Fuel can be injected into the secondary compressed air stream being injected into the combustion chamber or injected into a pre-combustion chamber (one is shown in FIG. 21) or may be injected directly into the combustion chamber. After the closure of intake valve 16, 16', the fuel or more fuel can be injected into the midst of the charge swirl for a stratified charge combustion process, or as in compression ignited engines fuel can be injected directly into the combustion chamber, perhaps directly onto a glow plug, if suggested pre-combustion chamber is used or not, and can be injected continuously during part of the expansion stroke for a mostly constant pressure combustion process.

The fuel-air mixture is ignited by spark plug, by compression ignition, or by glow plug at the point deemed most efficient, preferably before top dead center of the compression stroke of piston 22. The expansion stroke of piston 22 takes place as the expanding gases force the piston toward bottom dead center. Near the end of the power stroke, perhaps about 40° before bottom dead center, scavenging ports 52 are uncovered, near the same time exhaust valve(s) 17 in the engine head are opened and a rapid blowdown and scavenging takes place in any of four ways as shown in FIG. 27, FIG. 28, FIG. 29 and FIG. 30. In any case the exhaust valves 17, 17' remain open past bottom dead center and for a significant part of the scavenging-charge-adjusting stroke in order to establish the engines compression ratio.

Referring now to FIG. 26, there is shown a schematic drawing showing an engine similar in structure and operation to the engine $100^{25}$ of FIG. 25, having two compressors, but differing in that compressor 1 is depicted as a Lysholm rotary compressor, and compressor 2 is depicted as a turbo compressor, and having one air cooler for the secondary compressor, two air coolers for the primary compressor, dual manifolds, with shutter controls, air bypass controls and conduits for different air paths. Also shown is an engine control module (ECM) 27 which can control charge and scavenging air pressures, density and temperatures in order to effect the desired output and emissions characteristics of the engine. Alternate sources of scavenging air are shown, the preferred one being from conduit 110 by way of conduit 32'. Air paths are shown by arrows, hollow arrows for uncooled compressed air and solid arrows for cooled denser air. Also shown are air bypass valves (in this case both closed) which, with the shutter valves (one of which is closed and one of which is partly open, the latter to allow cooling of part of the charge), can control the charge temperature, weight and density as required for best engine performance.

Figure 27:
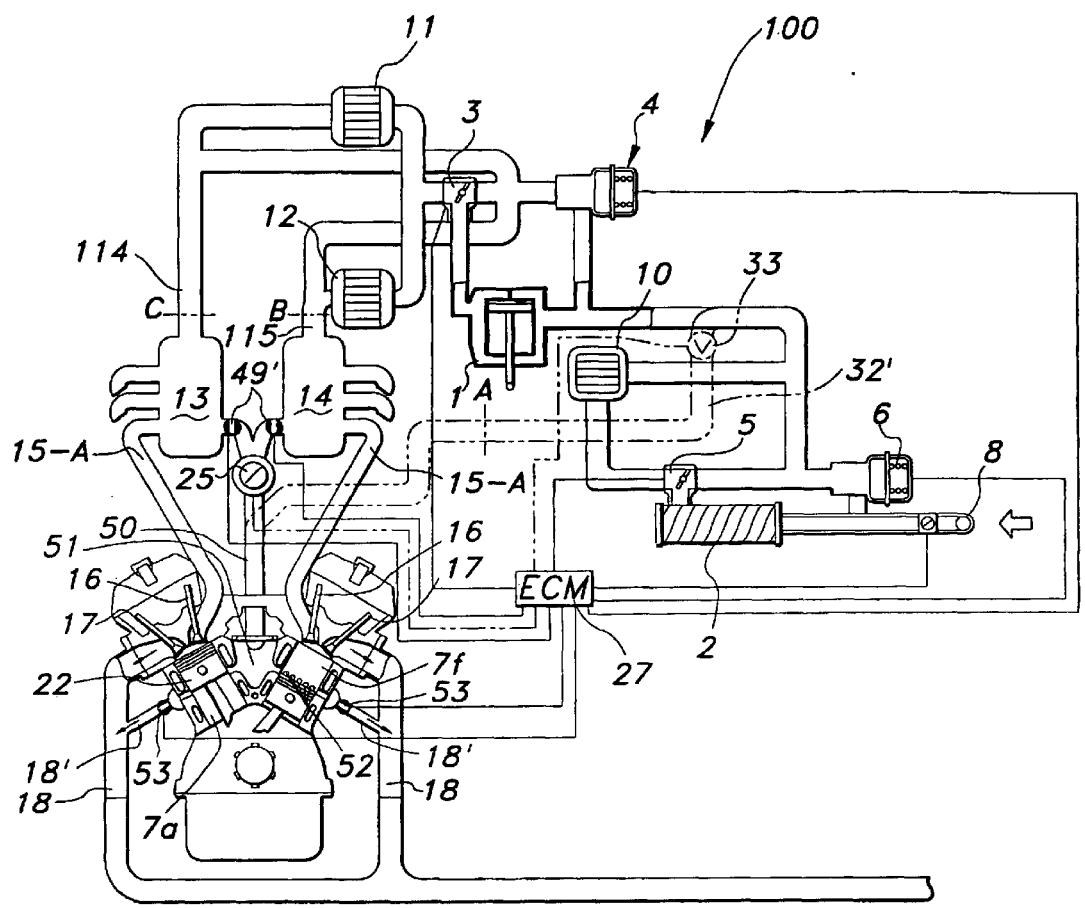
FIG. 27 through FIG. 30 are schematic drawings of the engine of FIG. 25 and FIG. 26 showing four alternate methods suggested for efficient scavenging of the engines.

Referring now to FIG. 27, there is shown one system of efficient scavenging of the exhausted products of the engine of FIG. 25;

Scavenging System A (FIG. 27)

Blowdown of exhaust occurs at from about 40° before bottom dead center to perhaps 40–50° after bottom dead center, with exhaust valves 17 opening at approximately the same time the ports 52 are opened and remaining open after bottom ports are closed by piston 22, and closing later causing a low compression ratio.

Scavenging air can be supplied from a manifold with perhaps a pressure-reducing valve 25 on conduit 50 or, preferably scavenging air can be supplied from conduit 32' from ancillary compressor 2, (shown in phantom). In this case, bottom ports 52 open shortly before exhaust valves 17 open. Blowdown occurs through bottom ports 52 out through bottom exhaust conduit and valve 53 to main exhaust pipe 18, at same time or shortly after, exhaust valves 17 open and blowdown of the exhaust occurs both at the top of the cylinder through exhaust valves 53 and 17, and through exhaust manifold 18' and pipe 18 to the atmosphere. The exhaust valve 17 then stays open through a significant part of the 2nd or exhaust-charge stroke for additional scavenging, this part by positive displacement. During this scavenging-charging stroke the exhaust valve 17 may be closed at any point after the first 20 percent of piston 22 travel. Now at any point with cylinder 7 being now filled with fresh air, exhaust valve 17 can close and intake valve 16' open to admit pressurized air which has its temperature adjusted to what is deemed proper. The later in the exhaust-charging stroke the exhaust valve 17 is closed, the lower is the compression ratio of the engine established. If closed early enough the effective compression ratio can be as much as 13 or 16 to 1, if closed later the effective compression ratio can be as low as 2:1. At any point after exhaust valve 17 has closed, and the compression ratio has been established, and before piston 22 has reached top dead center, the air charge, with temperature density and pressure adjusted may be introduced by opening and then closing intake valve 16. All of the operating parameters suggested would depend on the duty cycle of the engines, e.g., power requirements, efficiency, emissions considerations and the fuel used.

An engine control module (ECM) 27 is shown with connections to the critical control valves of the engine which can be adjusted according the conditions signaled to the ECM 27 from various sensors in the engine.

Figure 28:
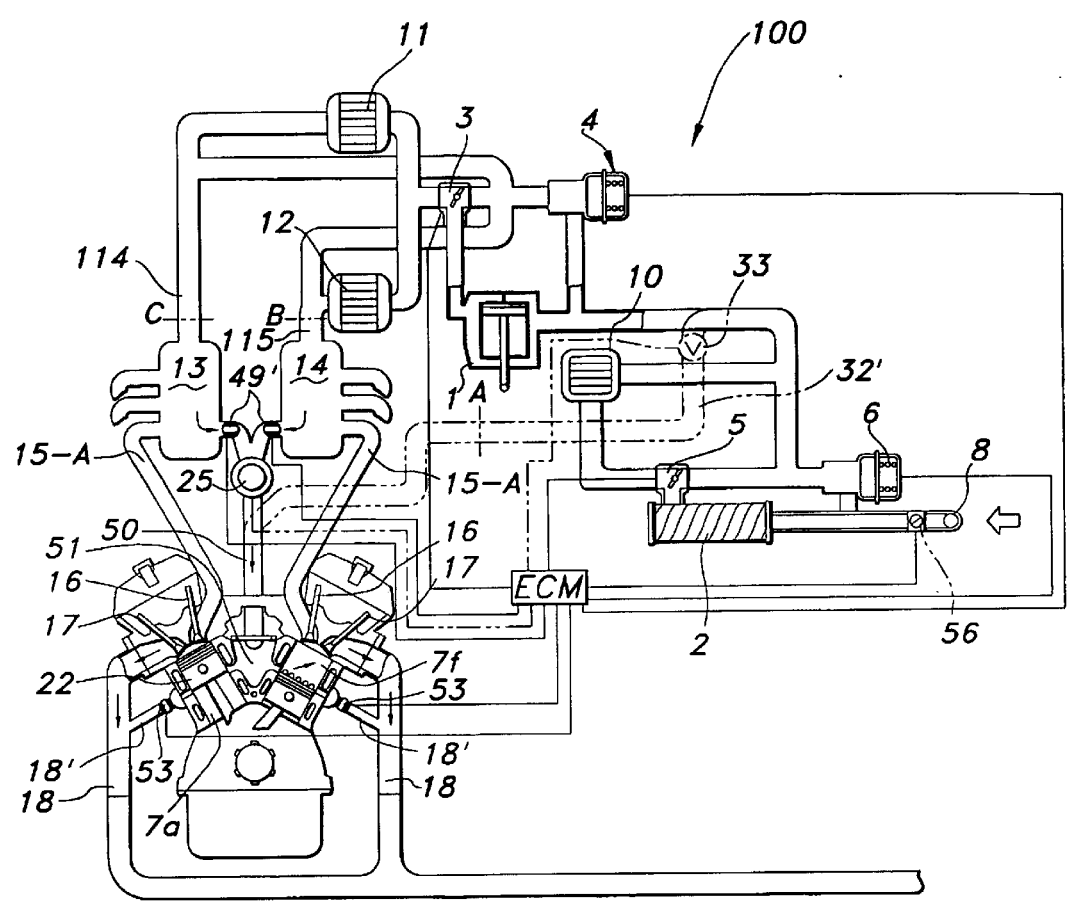

Referring now to FIG. 28, there is shown a second system of efficiently scavenging the engine of FIG. 25;

Scavenging System B (FIG. 28)

Exhaust blowdown occurs through exhaust valves 17 only, with scavenging air being supplied by compressor 2 by way of conduit 32', or alternatively from manifolds 13 and 14 through conduits 50 past control valve 49 and optional pressure control 25 into air box 51 and through scavenging ports 52 in the bottom of the cylinders 7, up through the cylinder 7, out exhaust valves 17 and through exhaust pipe 18, with valve 53 being closed. In this system as piston 22 approaches bottom dead center in the power expansion stroke, ports 52 would be uncovered by piston 22 and as blowdown occurs pressurized air would be injected through all bottom ports 52 and would sweep combusted products through exhaust valves 17 which open perhaps before ports 52 for the exhaust blowdown. The bottom ports can be constructed to open at perhaps 40° before bottom dead center and could close at the same point after piston begins its second stroke. The exhaust valves 17 could remain open after bottom ports 52 are closed to aid in scavenging by positive displacement by piston 22 and to establish the desired compression ratio which is established by the point at which exhaust valves 17 close.

During this scavenging-charging stroke of piston 22 the cylinder 7 being now filled with fresh air, the exhaust valve 17 may be closed at any point after the first 20 percent or so of piston 22 travel. Now at any point exhaust valve 17 can close and intake valve 16 can open to admit highly pressurized air which has its temperature and density adjusted to what is deemed proper. The later in the exhaust-charging stroke the exhaust valve 17 is closed, the lower is the effective compression ratio of the engine established. If closed early enough the effective compression ratio can be as much as 13 or 19 to 1, if closed later the effective compression ratio can be as low as 2:1. All of the operating parameters suggested would depend on the duty cycle of the engines, e.g., power requirements, efficiency and emissions considerations and the fuel used.

An engine control module 27 is suggested for use as shown for controlling the various operating conditions desired and as signaled from the engine s various sensors.

Figure 29:
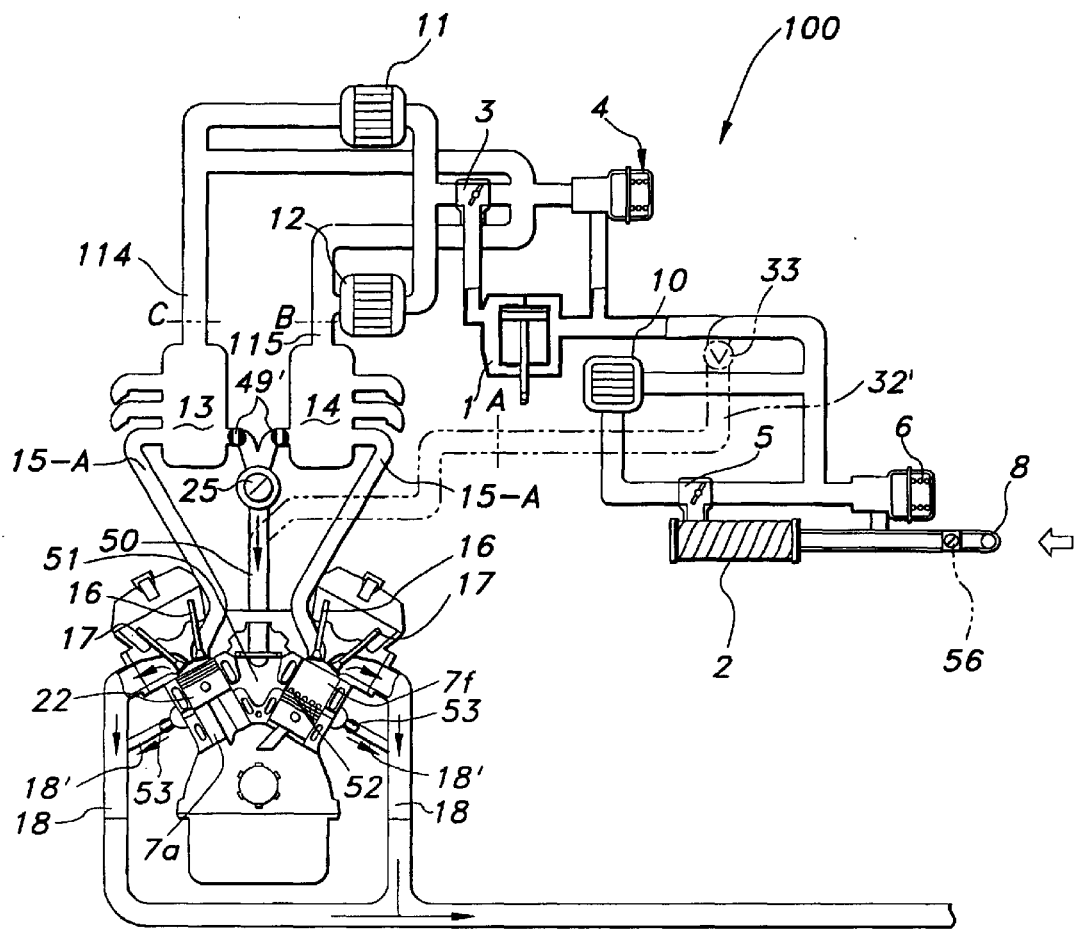

Referring now to FIG. 29, there is shown a third efficient system of scavenging the engine of FIG. 25;

Scavenging System C (FIG. 29)

This scavenging system would be that shut off valves 49' would be closed, (or valves 25 and 49 could be eliminated), with bottom ports opened to the atmosphere by valve 53, one inlet valve 16 leading from manifolds 13 and 14 to cylinder 7 could be opened for a very short period of time by a cam, perhaps by a small lobe on a cam that has a large lobe to open the same valve (as 21-C in FIG. 11) at a different crank angle, at the same time ports 52 were uncovered by piston 22 and exhaust valves 17 were opened. The high pressure air would quickly sweep combusted gases through ports 52 and exhaust valves 17, through their respective exhaust pipes 17 and 17' to the atmosphere. The intake valve 16 would close quickly, no later than the time exhaust ports 52 closed. The exhaust valve would remain open for further scavenging and for the reduction of the compression ratio of the engine. Alternatively bottom exhaust valves 53 would be closed and as bottom ports 52 were uncovered by piston 22, exhaust valves 17 would also open earlier for blowdown, air from the airbox 51 supplied by conduit 32 would blow into ports 52 and scavenge the cylinder 7 through exhaust valves 17.

During this scavenging-charging stroke the exhaust valve 17 is closed at a point after the first 20 percent or so of piston 22 travel. At any point after exhaust valve 17 has closed, the cylinder 7 being now filled with fresh air, and the compression ratio having been established, and before piston 22 has reached top dead center, additional (secondary) air charge, with temperature density and pressure adjusted is introduced when needed by opening a second intake valve 16 and or by another lobe 21-C on the same cam (see 21-C. FIG. 11) opening the same intake valve again. All of the operating parameters suggested would depend on the duty cycle of the engines, e.g., power requirements, efficiency and emissions considerations and the fuel used. The later in the exhaust-charging stroke the exhaust valve 17 is closed, the lower is the compression ratio of the engine established. If closed early enough the effective compression ratio can be as much as 13:1 or 22:1, if closed later the effective compression ratio can be as low as 2:1.

An engine control module could control all of the conditions required of the engine.

Figure 30:
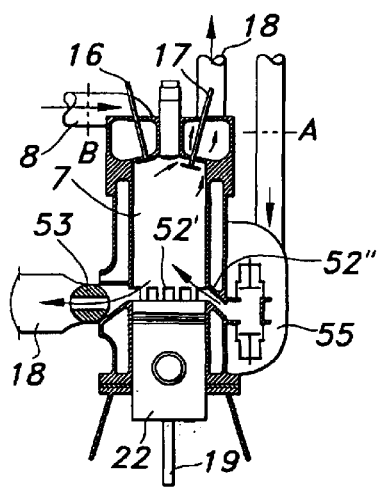

Referring now to FIG. 30, there is shown a fourth system of efficient scavenging the engine of FIG. 25.

Scavenging System D (FIG. 30)

In this system exhaust blowdown occurs through the top exhaust valves 17 and through part of the bottom scavenging ports 52' which open just before bottom dead center, perhaps 40°, and simultaneously with or just after the top exhaust valves open. At the time bottom ports 52' are opened, or shortly after, exhaust valves 17 are also opened, or, valve 53 leading to bottom exhaust line 18 is already open, and exhaust blowdown occurs over the next, 40° or so after bottom dead center, with scavenging air being injected through at least one of the bottom ports 52" which has been constructed to receive pressurized air from air box 55 supplied by conduit 32' or 50 at such a time the ports 52' are opened by piston 22 and the pressure in cylinder 7 has dropped below the pressure in air-box 55. After ports 52' are closed, exhaust valves remain open through a significant part of the second or exhaust-charge stroke of piston 22 for additional scavenging by positive displacement and in order to establish a low compression ratio.

During this scavenging-charging stroke the cylinder 7 being now filled with fresh air, exhaust valve 17 may be closed at any point after the first 20 percent or so of piston 22 travel. Now at any point exhaust valve 17 can close to establish the compression ratio and inlet valve 16 can open to admit a secondary pressurized air charge which has its temperature and pressure adjusted to what is deemed proper. The later in the exhaust-charging stroke the exhaust valve 17 is closed, the lower is the compression ratio of the engine established. If closed early enough the effective compression ratio can be as much as 13:1 or 22:1, if closed later the effective compression ratio can be as low as 2:1. All of the operating parameters suggested would depend on the duty cycle of the engines, e.g., power requirements, efficiency and emissions considerations and the type of fuel used, and can be controlled by an engine control module which receives signals relating conditions in certain engine areas and which are relayed to the ECM 27.

Figure 31:
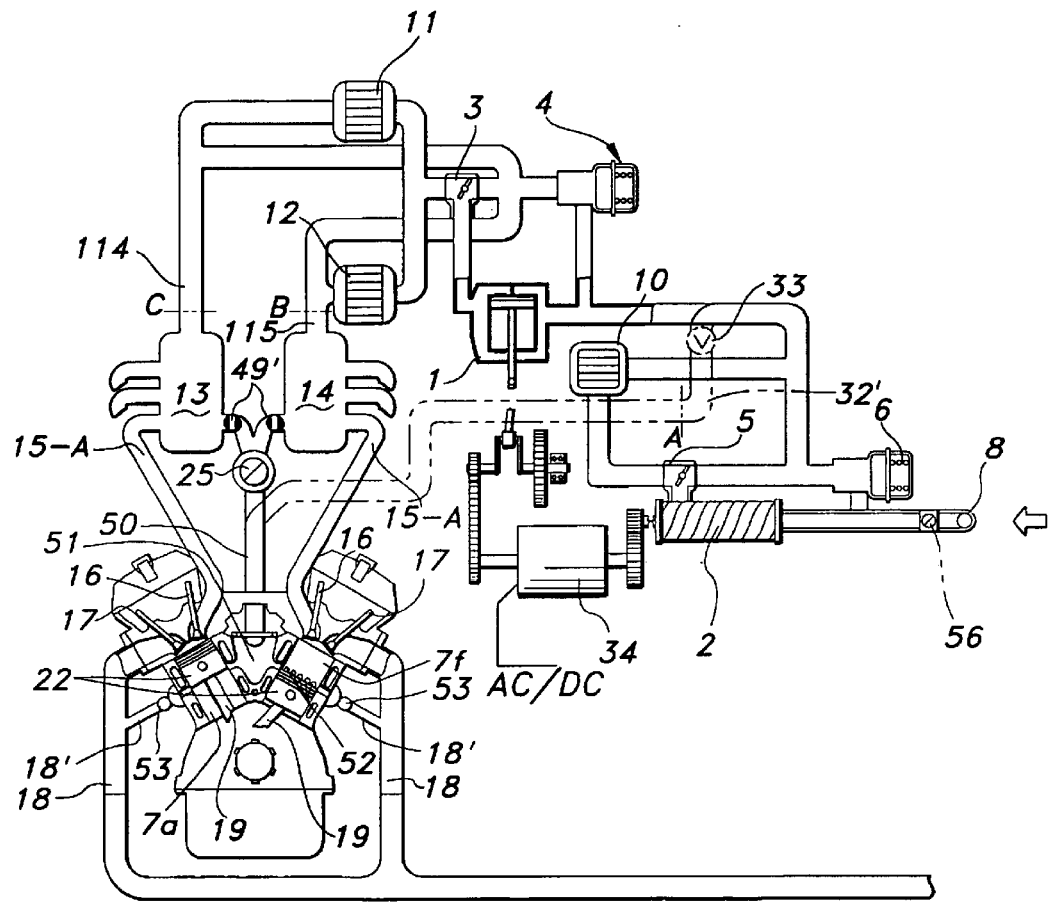
FIG. 31 is a schematic drawing showing suggested optional electric motor drive for the engine's air compressors.

Referring to FIG. 31, there is shown a schematic drawing depicting an alternate arrangement in which an electric motor 34 preferably drives the air compressors of an engine similar to that of FIG. 25.

Figure 32:
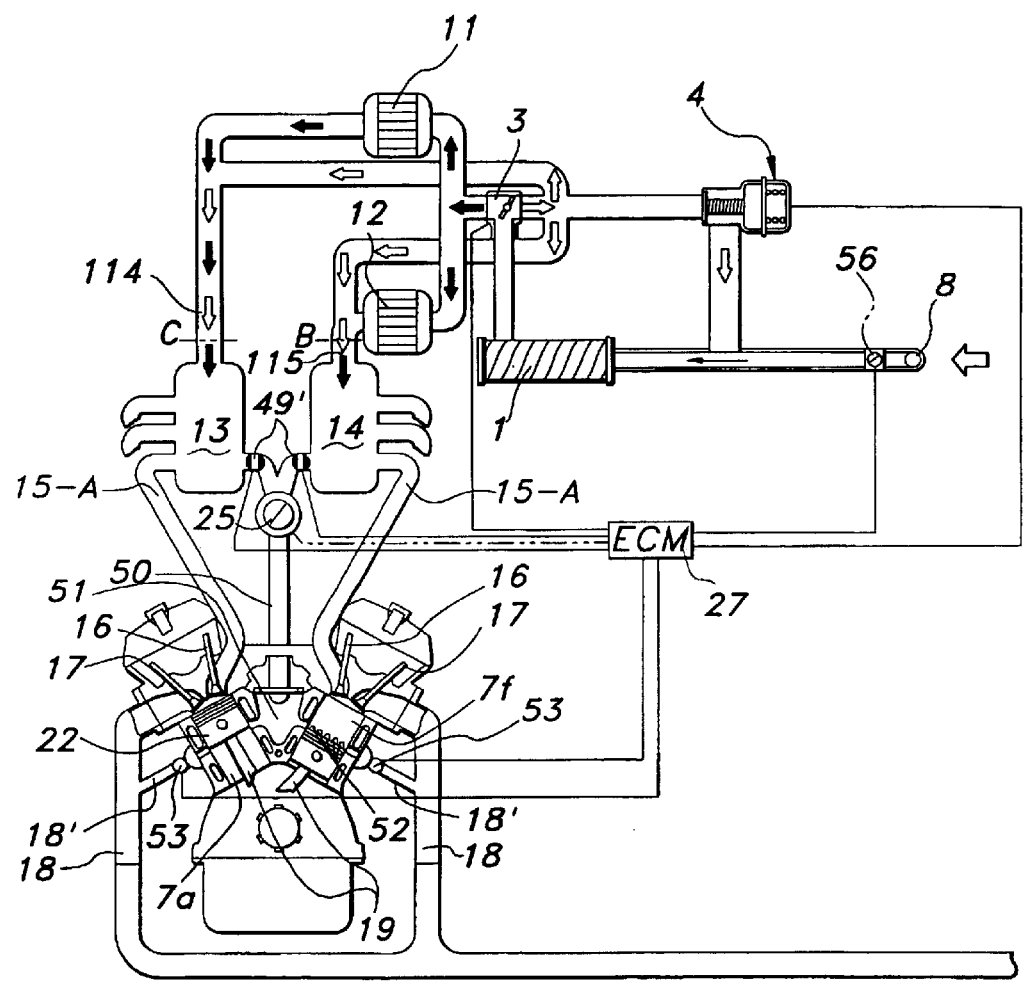
FIG. 32 is a schematic drawing of the 2-stroke engine of FIG. 25 and FIG. 26, having only one compressor for supplying both charge-air and scavenging air, and showing a control system and means of controlling charge and scavenging air at a pressure, density and temperature deemed appropriate for each, and showing means of channeling the air through different paths for the same purpose.

Referring now to FIG. 32, there is shown a schematic drawing showing the 2-stroke engine of FIG. 25 and FIG. 26 and having only one compressor 1 for supplying both scavenging and charge-air. Also shown are a shutter valve 3 and an air bypass valve 4, valves 16 and 17 controlling charge and scavenging air and valves 53 and 53' for releasing exhaust blowdown out of the cylinder bottom ports 52 through exhaust conduit 18 to the atmosphere. Thus the engine of FIG. 32 can perform all of the feats described for the engine of FIG. 25 and described for the engine of FIG. 25, FIG. 26, FIG. 27, FIG. 28, FIG. 29, FIG. 30 and FIG. 32. Also shown is an engine control module (ECM) 27, and connections to various valves in order to manage the charge and scavenging air temperature, density, weight and pressure, and the pressure and path of the scavenging air to achieve the desired results from the engine. Arrows show the paths possible for the heated (hollow arrows) air and the cooled (solid arrows), air, and for the charge-air to pass through the air bypass valve 4, all in order to adjust air pressure, density, weight and temperature for optimum engine performance.

The Engine $100^{33}$ System of FIG. 33

Referring now to FIG. 33, there is illustrated a six cylinder internal combustion engine in which part of the cylinders 62 through 65 are used for producing power and two of the cylinders, cylinders 66 and 67, are used for compressing the air necessary to operate the engine. A supercharger 57, in this case preferably a Lysholm type, is used to boost the atmospheric pressure air received through air intake 8', before the air enters compressor cylinders 66 and 67. A shutter valve 3' and air bypass valve 4' re-circulate the charge-air back through compressor 57 when both are open, to lessen compressor work and reduce charge densities for light-load operation. When air bypass valve 4' is closed shutter valve 3' can open or close to send the air charge to the cylinders cooled or uncooled, respectively, in order to manage combustion temperatures and temperatures for optimum performance.

The second stage of compression is transferred from compression cylinders 66 and 67 through conduits 201, 202 to shutter valve 4" which, when closed, sends the compressed charge through conduit 204 and intercooler 11 and conduit 205 to the engine manifold 58' in a cooled condition. If opened, shutter valve 4" directs the charge away from cooler 11 through conduit 203 and 205 to the power cylinders without cooling.

By having its camshaft arranged to rotate at one-half crankshaft speed, the engine $100^{33}$ operates in a 4-stroke cycle, with a low compression ratio, an extended expansion ratio and high mean effective cylinder pressure ashen operated in a manner just as described herein for the engine of FIG. 3.

Alternatively, the engine of FIG. 33, with one or more of its cylinders acting as compressor cylinders and having its camshaft arranged to rotate at crankshaft speed, operates in a 2-stroke cycle with the low compression ratio, high mean effective cylinder pressure and an extended expansion ratio when operated in the manner described herein for the engines of FIG. 8, FIG. 9 and FIG. 11.

Still referring to FIG. 33 of the drawings, additional fuel savings can be achieved in any of the engines of the present invention described hereinbefore by use of an economizer constructed as an air compressor retarder brake. For discussion of the disclosed retarder brake, this six-cylinder engine $100^{33}$ represents any of the engines of this invention which use externally compressed air (FIG. 1 through FIG. 33) to either fully supply charge-air or which use it to enhance engine performance. The air retarder brake illustrated has a compressor 57A operatively connected to the drive shaft of the vehicle (not shown) or geared to the engines crankshaft 20 and stores energy produced during braking or downhill travel which is utilized to supply compressed air to the engine power cylinders via the transfer manifold 58. Such an economizer is coupled with an air reservoir 59 and during the time in which the economizer reservoir air pressure was sufficiently high for use in the power cylinders of the engine, the engine compressor can be clutchably disengaged or air pumped by the compressor(s) can be bypassed back to the inlet of the compressor(s) so that no compression work would be required of the compressor. A relief valve 60 prevents excess build up of pressure in the air reservoir. A valve 61 (being in this arrangement, a reversible one-way valve) allows air from the reservoir to be transferred to the manifold when the pressure in the reservoir 59 is higher than in the transfer manifold 58, if the air is needed. In the case of engine constructions having compression cylinders, each compression cylinder of the engine can also be deactivated during this reserve air operation time by shutting off the admission valve so that no net work would be done by the compressor(s) until the manifold-reservoir pressure dropped below operating levels. Several systems of deactivating cylinder valves are described in the art and/or have been mentioned previously.

In an alternate arrangement, the compressor 57A is eliminated and the air storage tank 59 is used to store excess air compressed by the compressor cylinders of the engine during braking and downhill travel. In this case, the valve 61 is a two-way valve and a blocking valve 70 is placed in the manifold 58 between the compressor cylinder(s) 66, 67 and the working cylinders 62–65. During downhill travel or during braking, the blocking valve 70 between compressor and working cylinders is, preferably, closed, power cylinders 62–65 are deactivated, and the two-way valve at 61 is utilized in order to divert the air compressed by the compressor cylinder(s) into storage tank 59.

When it is desired to operate the engine normally, the blocking valve 70 between the compressor and the expander cylinders is opened and the two-way valve 61 is closed. During reserve air operation, both the blocking valve 70 and the two-way valve 61 are opened. If desired, the compressor cylinder(s) 66, 67 are deactivated while in the reserve air operation mode, as described earlier. Also, a Jacob brake (a prior art retarder brake) could supply compressed air to the air reservoir tank.

Operating the engine on reserve air supply would improve the mean effective pressure (mep) of the engine for 20 percent improvement in power and efficiency, while reducing polluting emissions, during the time the engine was operating on the reserve air.

This feature would produce additional savings in energy especially in heavy traffic or in hilly country. For example, an engine producing 100 horsepower uses 12.7 pounds of air per minute. Therefore, if energy of braking were stored in the compressed air in the economizer reservoir 59, a ten or fifteen minute supply of compressed air can be accumulated and stored during stops and down hill travel. When the reservoir pressure drops below the desired level for efficient operation, a solenoid (not shown) is used to reactivate the compression cylinder valves and they (with the supercharger, when needed) will begin to compress the air charge needed by the engine.

Using the air reservoir 59, the engine needs no compression build-up for starting and as soon as the shaft was rotated far enough to open the intake valve, the compressed air and fuel would enter and be ignited for "instant" starting. Furthermore, the compressed air could be used to rotate the engine for this means of starting by opening intake valves earlier than usual to the expander cylinders to begin rotation and firing as is common in large diesel engines, thus eliminating the need for a starter motor. Alternatively, the compressed air could be used to charge a "hydrostarter" to crank the engine as is common on some heavy-duty diesel engines.

In an alternate, and still preferred embodiment, the reserve air in reservoir 59 is additionally used to "motor" the engine to allow a vehicle such as a bus to pull away from a stop and operate fuelless for 30–60 seconds or more, which is the time that greatest pollution occurs in bus or stop-and-go delivery vehicle operation.

Remotely Compressed Air Embodiments

Figure 34:
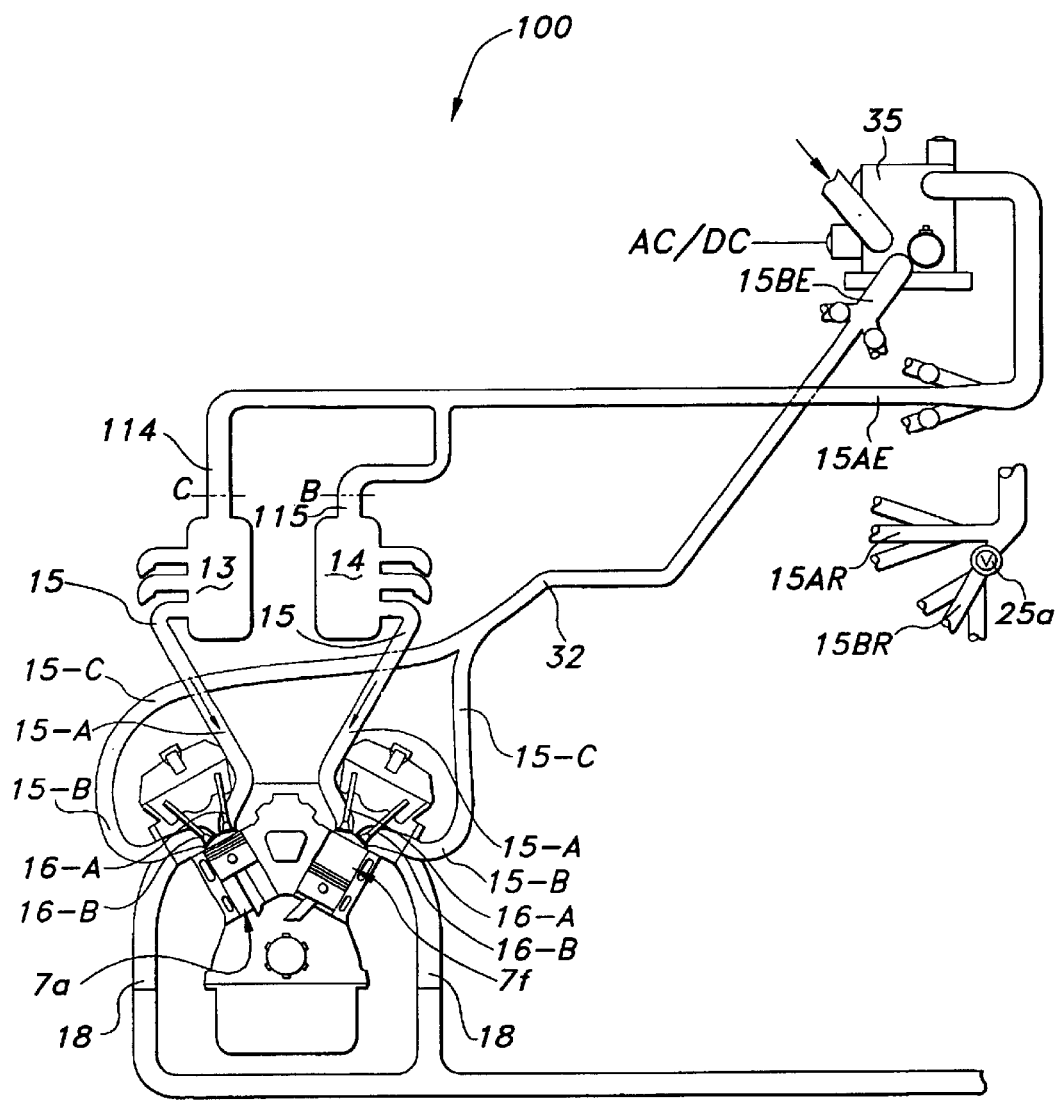
FIG. 34 is a schematic drawing representing any of the engines of the present invention and showing an alternate embodiment which includes a separate, electric-powered air compressor and, alternatively, an entrance conduit leading from a supply of waste or "bleed" compressed air for supplying charge-air to the engine (or to a plurality of engines), whereby the need for engine-powered compressors is eliminated.

Referring now to FIG. 34, there is seen a schematic representation of an engine 100 in accordance with an alternate embodiment of the present invention for externally providing charge-air for marine, locomotive, stationary, or electric power generating engines, or any engine applications of this invention, constant or variable load and speed, which have adequate electric power or waste or "bleed" air available. In FIG. 34, a remote electric air compressor 35 preferably with one or more intercooled compression stages, preferably supplies temperature conditioned charge-air (both high and low pressure, if needed) for one or more engines of this invention. The charge-air, conditioned in temperature and pressure, is supplied directly to manifolds 13 and 14 by conduit 15AE from compressor 35. The engine intake conduit 9 of, for example, FIG. 4, or low-pressure conduits 32 of other engines of this invention receive air from the atmosphere or alternatively receives low pressure air from a low pressure conduit 15BE from compressor 35.

An alternate arrangement, also depicted in FIG. 34, for providing combustion charge-air for any of the engines 100 of the present invention is to provide charge-air from conduit 15AR which supplies waste or "bleed" air produced in industrial processes. The air is supplied either at 1 or 2 pressure levels. The lower pressure, if needed, preferably is supplied by dropping the pressure from the main incoming waste air conduit 15AR with a pressure regulator valve (25*a* leading to low-pressure conduit 15BR). The arrangement is similar to the arrangement of conduits 15-A, 15-B and valve 25 in, for example, FIG. 5, with conduit 15-A representing the supply conduit 15AR from the waste air supply, and with conduit 15-B representing conduit 15BR in FIG. 34.

The use of remotely compressed air, either waste air or from compressor 35, eliminates the engines compressors 1, 2 intercoolers 10, 11, 12, certain conduits and valves 3, 4, 5, 6 of the charge-air supply equipment, providing the air has been conditioned during or after the compression process (and prior to introduction to the manifolds 13, 14). Thus, the equipment of the engine 100 of the various embodiments shown throughout the various drawing figures of the engine 100 embodiments of this invention, is preferably eliminated up to those points designated by dashed lines A, B and C throughout the various drawings. The charge-air from either of the aforementioned remote sources is preferably introduced into the engines near the manifolds 13 and 14 and, in the appropriate embodiments, the low air pressure from the remote sources is introduced at conduit 32, as shown in FIG. 34.

In the remotely charged engines, the fuel can be carbureted prior to compression, can be throttle-body injected, port-injected, or directly cylinder injected.

Regarding Pollution Control

Referring now to FIG. 2 and FIG. 4-C there is shown a method of further reducing polluting emissions in any of the engine embodiments of this invention which includes re-burning a portion of the exhausted gases when and if required. In the 4-stroke engines of FIG. 1–FIG. 3 and in the 2-stroke engines herein depicted having a single air intake, the exhaust outlet conduit(s) 18 have a shunt conduit 202 (refer to FIG. 2) leading from a port 206 in the side of exhaust conduit 18 to a port 204 in the side of intake conduit 8. A proportioning valve 201 is situated at the intake port 204 and is arranged to selectively restrict the flow of fresh air into conduit 8, while at the same time opening the port 204 to the exhaust conduit to selectively allow entry of exhaust gases to the intake conduit 8. This valve is variable and mechanically, electrically or vacuum solenoid operated and preferably controlled by an engine control module (ECM) or control 144 in FIG. 35 and FIG. 36. This allows the re-burning of a portion of the exhausted gases, the amount of percentages thereof being adjusted by the engine control module in response to various sensors, such as an oxygen sensor, placed in strategic positions in the engine. Exhausted gases passing through conduit 202 can be cooled by either optional cooling fins 202*a* or by passing through an optional intercooler (not shown) before reaching the air intake conduit 8.

Figure 4B:
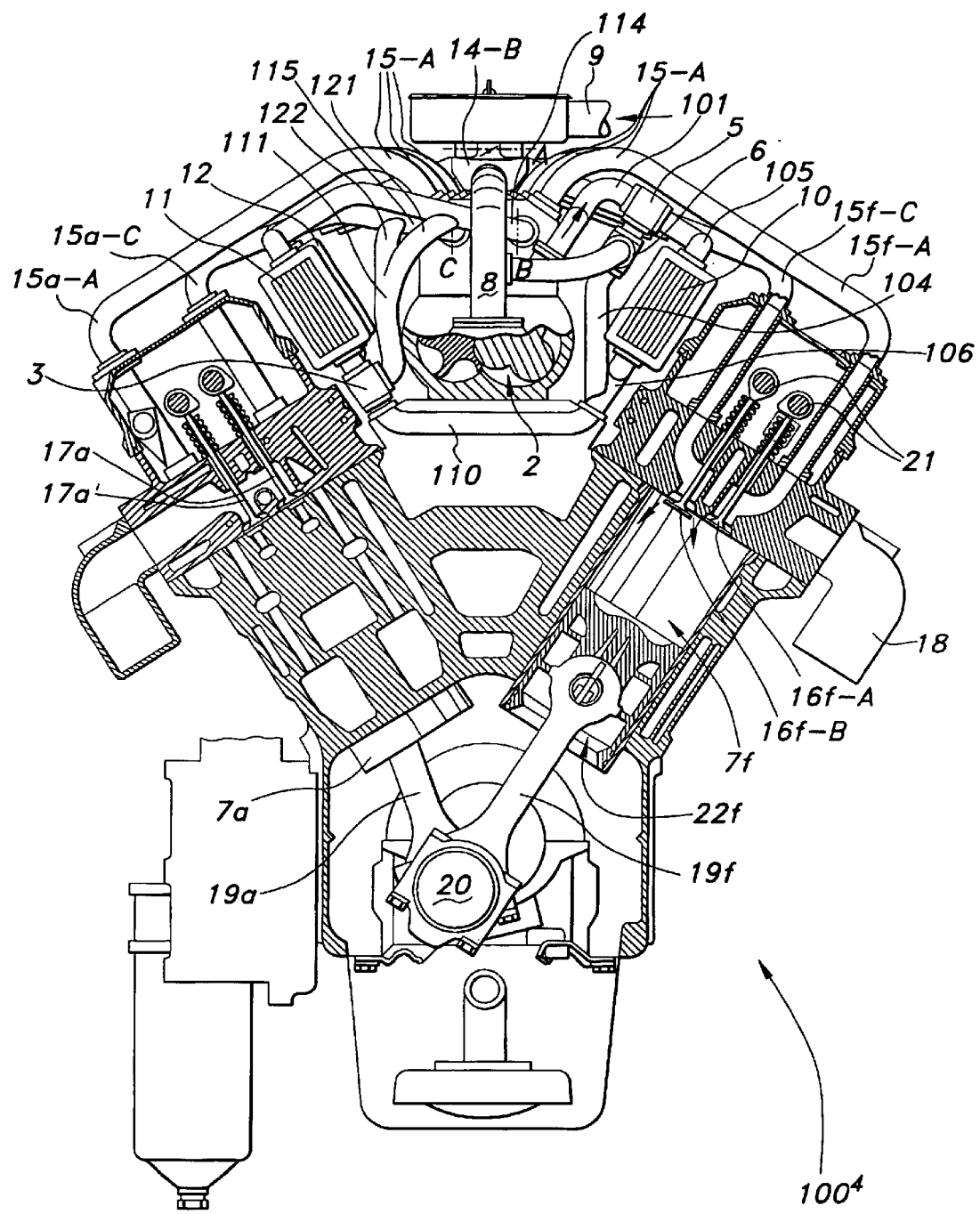

With reference to FIG. 4C, in engines having only one atmospheric intake conduit but having different air paths and conduits, such as conduits 15-A and 15-C of FIG. 4B, a shunt conduit 202' leading from the exhaust conduit 18 is divided into two shunt conduit portions 203*a*, 203*b*, each with a proportioning valve 209a, 209b operating so as to selectively admit exhausted gases to either or both of intake valve 16-B (through conduit 9 and eventually conduit 15-C) or to intake valve 16-A (by way of conduit 8 and conduit 15-A). Each proportioning valve 209a, 209b would allow either a portion or none of the exhausted gases to enter its respective port, meanwhile restricting entrance of fresh air if necessary. The exhausted gases can be cooled by optionally arranging fins 202a on conduit 202' and/or 203a, 203b and 203c or by passing the exhaust through an optional intercooler (not shown) before the gases are introduced into the air intake(s) of the engine.

Alternatively, as shown in phantom on FIG. 4C, one shunt portion 203a is diverted (shown as 203c) directly to conduit 15-C and provided there with a proportioning valve 209c.

In the engines of FIG. 4 and FIG. 7 having dual atmospheric air intakes 8, 9, an arrangement similar to that shown in FIG. 4C is utilized, it being understood, however, that conduit 8 is open to the atmosphere.

In any engines having dual air intake conduits or dual air paths a portion of exhausted gases can be introduced in any amount necessary, in from one to three points and controlled preferably by an engine control module (ECM) for better management of combustion and emissions characteristics.

This re-burn feature is of particular importance with diesel fuel operation.

Constant Load and Speed Engines

Figure 35:
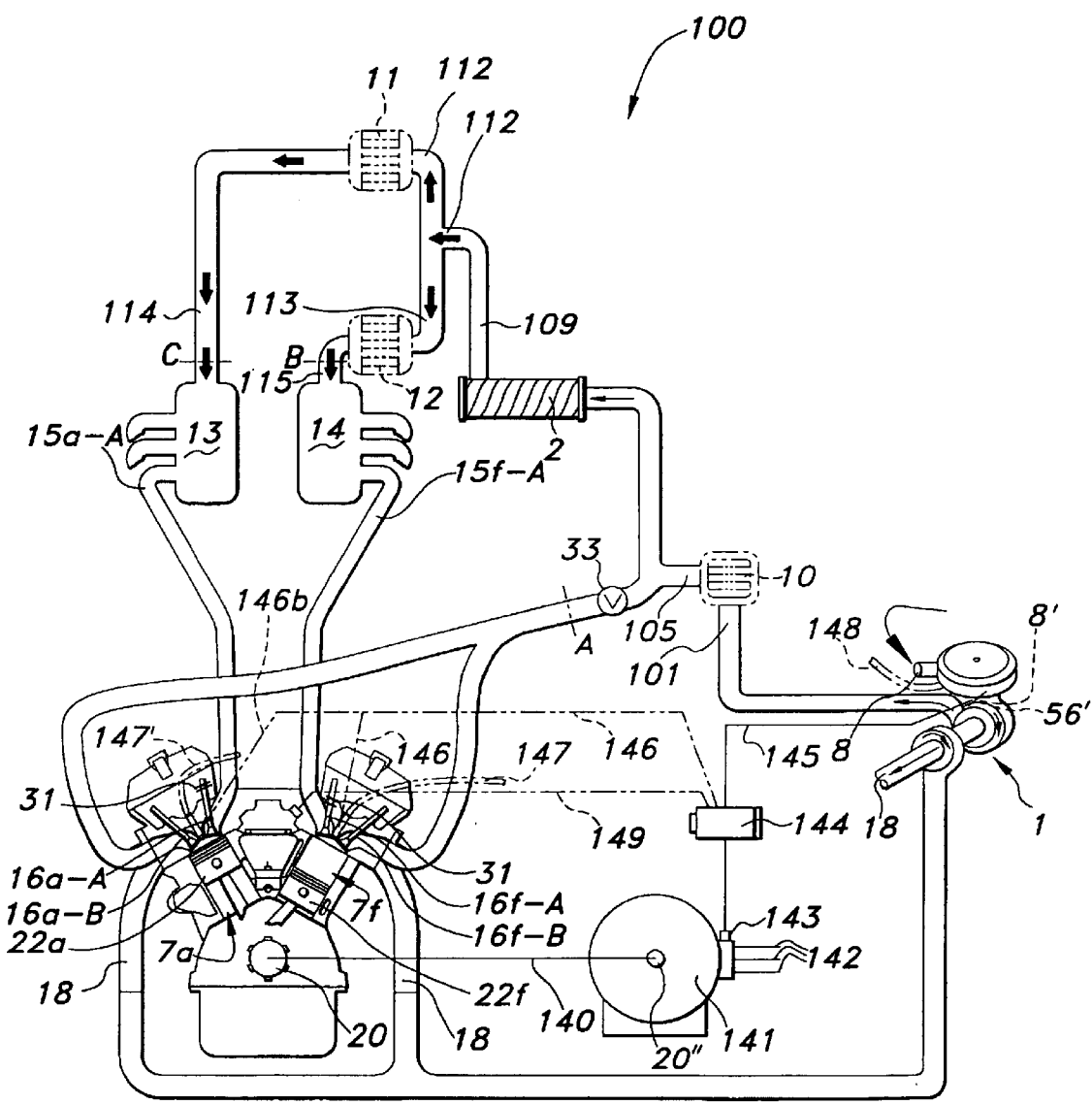
FIG. 35 is a schematic drawing representing any of the engines of the present invention depicted in an alternate embodiment which is configured to operate as a constant load and constant speed engine. This constant load and constant speed engine embodiment of the present invention is shown as including both a primary and an ancillary compressor with optional intercoolers for providing two stages of pre-compressed charge-air, either optionally intercooled or adiabatically compressed.
Figure 36:
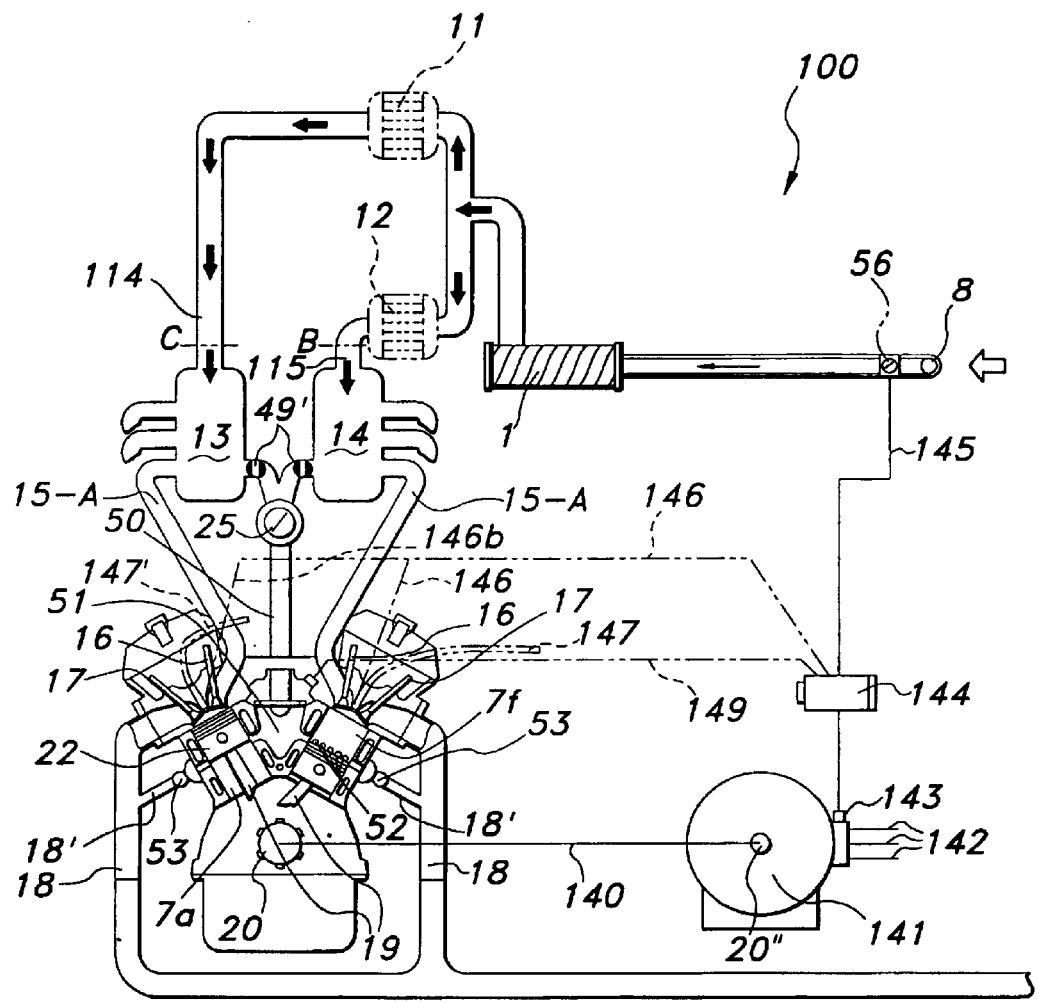
FIG. 36 is a schematic drawing representing any of the engines of the present invention, and depicting a constant load and constant speed engine in accordance with an alternate embodiment of the present invention in which there is provided a single compressor with optional intercoolers for providing a single stage of pre-compressed charge-air, either optionally intercooled or adiabatically compressed.

Whereas the preponderance of the foregoing specification describes embodiments and representative engines of the present invention which are optimized for vehicular (marine, truck, bus, automobile, tank, train and plane) duty cycles and describe systems and methods for varying power, torque and speed, the present invention finds useful application for obtaining high power and torque while maintaining optimum fuel economy and low polluting emissions in less complex engines, such as, for example, constant load and speed engines. FIG. 35 and FIG. 36 depict alternate embodiments of the present invention which embodiments are representative of constant load and speed engines (e.g., for electric power generation and in other stationary or industrial engine applications, e.g., for pumps and compressors) outfitted in accordance with the principles of the present invention.

The Engine of 100 System of FIG. 35

Referring now to FIG. 35 there is shown is a schematic presentation of an engine which represents any of the 4-stroke or 2-stroke engines of the present invention outfitted for constant load and speed operation. The basic components of the engine 100, such as compressors 1, 2 and optional intercoolers 10, 11, 12 (shown in phantom) and their necessary associated conduits are, preferably, designed for optimum operating parameters having only the basic components. The various controls, shutter valves, air bypass valves and their associated bypass conduits such as those in previously described embodiments, are preferably eliminated in order to reduce weight, cost and complexity of operation. In FIG. 35, the engine 100 is shown as outfitted with a first ancillary compressor 1 and a second ancillary compressor 2, optional intercoolers 10, 11, 12 (shown in phantom) and interconnecting conduits, all operating as would be understood with reference to the previous detailed descriptions and operating with two stages of pre-compression of the charge-air, intercooled or adiabatically compressed.

FIG. 35 shows a preferred setup for power generation with any of the engines of this invention. The power output shaft 20 of the engine 100 is coupled schematically by line 140 to power input shaft 20" of generator 141 which has electric power output lines 142. As the shaft 20 of the engine 100 rotates the shaft 20" of generator 141, the amount of electric power produced by generator 141 is detected by sensor 143 and relayed to control unit and governor 144 which contains various relays and integrated circuits to quantify the power output and to send messages by line 145 to fuel/air control (not shown) on fuel line 148 and throttle 56, and/or by line 149 to spark control to advance or retard the spark in spark-ignited engines and/or to send messages through lines 146 and 146b for engines having fuel injection systems, e.g. for natural gas, gasoline or diesel fuel, or to fuel/air controls, all in order to control the fuel input, speed and output of engine 100 and hence the output of generator 141. Control unit 144 also sends signals to control the proportioning valve 201, shown in FIG. 4 and to proportioning valves 209a, 209b, 209c shown in FIG. 2 to control the amount, if any, of exhaust recirculated by these valves for re-burn in any engine of this invention utilizing this feature. Further explanation of the components and operation with the engine 100 of the present invention is deemed unnecessary as it would be understood by those skilled in the art having reference to the present disclosure.

The optional intercoolers 10, 11, 12 (shown in phantom) are preferably used for gaseous or gasoline fueled engines and are preferably eliminated or reduced in number or cooling capacity in the compression-ignited engine, this being made possible by low peak pressures and temperatures in the engines of this invention.

Referring now to FIG. 36 there is shown an engine illustrated as a 2-stroke engine but representing any of the engines of the present invention, 2-stroke or 4-stroke, which is coupled schematically by line 140 with an electric generator 141. The engine and arrangements are similar in structure and operation as that shown and described for the engine of FIG. 35 with the exception that engine of FIG. 36, operating as either 2-stroke or 4-stroke cycle engine 100, has only a single stage of pre-compression, optionally intercooled by intercoolers 11, 12 (shown in phantom), of the charge air. As with the engine of FIG. 35, intercoolers 11, 12 are preferably eliminated or reduced in cooling capacity in compression-ignited versions of the engine 100 of this invention. Also, as with the engine 100 of FIG. 35, the governor, and other controls and the operation of the engine and generator would be understood by those skilled in the art having reference to the present disclosure.

It will be seen by the foregoing description of a plurality of embodiments of the present invention, that the advantages sought from the present invention are common to all embodiments.

While there have been herein described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the equivalents of all means-or-step-plus-function elements in the claims below are intended to include any structure, material, or acts for performing the function as specifically claimed and as would be understood by persons skilled in the art of this disclosure, without suggesting that any of the structure, material, or acts are more obvious by virtue of their association with other elements.

What I claim is:

1. A method of operating an internal combustion engine, the method comprising the steps of:
   lightly compressing a low pressure air charge outside a cylinder;
   directing the low pressure air charge through a first intake port into a cylinder cooperating with a piston, during an intake stroke of the piston;
   compressing a high pressure air charge outside of the cylinder; and,
   directing the high pressure air charge through a second intake port into the cylinder, during a compression stroke of the piston.

2. The method of claim 1, wherein the low pressure air charge is at a first pressure and the high pressure air charge is at a second pressure, the second pressure being greater than the first pressure.

3. The method of claim 1, wherein the low pressure air charge is compressed by a first compressor and the high pressure air charge is compressed by a second compressor.

4. The method of claim 1, wherein a first intake valve selectively occludes the first intake port and a second intake valve selectively occludes the second intake port, the second intake valve occupying an open position only while the first intake valve occupies a closed position.

5. The method of claim 4, further comprising the steps of:
   controlling the time of operation of a compressor generating the high pressure air charge and the timing of the first and the second intake valves; and,
   controlling one or more air charge characteristics selected from the group consisting of turbulence, density, pressure, temperature, mean pressure and peak pressure.

6. The method of claim 1, wherein a first intake valve cooperates with the first intake port and a second intake valve cooperates with the second intake port, the second intake valve occupying an open position only during the compression stroke.

7. The method of claim 6, further comprising the steps of:
   controlling the time of operation of a compressor generating the high pressure air charge and the timing of the first and the second intake valves; and,
   controlling one or more air charge characteristics selected from the group consisting of turbulence, density, pressure, temperature, mean pressure and peak pressure.

8. The method of claim 1, further comprising the step of:
   cooling the low pressure air charge prior to entry thereof into the cylinder.

9. The method of claim 1, further comprising the step of:
   cooling the high pressure air charge prior to entry thereof into the cylinder.

10. A method for operating an internal combustion engine, the method comprising the steps of:
    directing a primary air charge through a first inlet port into a cylinder;
    compressing a secondary air charge outside of the cylinder;
    introducing the secondary air charge through a second inlet port of the cylinder, after compression has begun within the cylinder; and lightly compressing the primary air charge prior to directing thereof into the cylinder.

11. The method of claim 10, wherein the primary air charge is at a first pressure and the secondary air charge is at a second pressure, the second pressure being greater than the first pressure.

12. The method of claim 10, wherein the directing of the primary air charge into the cylinder is completed before the introducing of the secondary air charge into the cylinder.

13. The method of claim 10, wherein a first intake valve selectively occludes the first intake port and a second intake valve selectively occludes the second intake port, the first intake valve occupying an open position only while the second intake valve occupies a closed position.

14. The method of claim 13, further comprising the steps of:
    controlling the time of operation of a compressor generating the secondary air charge and the timing of the first and the second intake valves; and,
    controlling one or more air charge characteristics selected from the group consisting of turbulence, density, pressure, temperature, mean pressure and peak pressure.

15. The method of claim 10, wherein a first intake valve cooperates with the first intake port and a second intake valve cooperates with the second intake port, the second intake valve occupying an open position only during the compression stroke.

16. The method of claim 15, further comprising the steps of:
    controlling the time of operation of a compressor generating the secondary air charge and the timing of the first and the second intake valves; and,
    controlling one or more air charge characteristics selected from the group consisting of turbulence, density, pressure, temperature, mean pressure and peak pressure.

17. The method of claim 10, further comprising the step of:
    cooling the primary air charge prior to entry thereof into the cylinder.

18. The method of claim 10, further comprising the step of cooling the secondary air charge prior to entry thereof into the cylinder.

19. A method for operating an internal combustion engine, the method comprising the steps of:
    directing air through a first intake port to a cylinder during an intake stroke of a piston cooperating with the cylinder;
    directing compressed air through a second intake port to the cylinder only during a compression stroke of the piston;
    controlling the time of operation of a compressor generating the compressed air and the timing of intake valves cooperating with the first and the second intake ports; and,
    controlling one or more air charge characteristics selected from the group consisting of turbulence, density, pressure, temperature, mean pressure and peak pressure.

20. A method of operating an internal combustion engine, the method comprising the steps of:
    introducing air through a first intake port into a cylinder during an intake stroke of a piston cooperating with the cylinder;

introducing compressed air through a second intake port into the cylinder during a compression stroke of the piston;

controlling the time of operation of a compressor generating the compressed air and the timing of the first and the second intake valves; and, controlling one or more air charge characteristics selected from the group consisting of turbulence, density, pressure, temperature, mean pressure and peak pressure.

21. A method of operating an internal combustion engine, the method comprising the steps of:

introducing air through a first intake port into a cylinder during an intake stroke of a piston cooperating with the cylinder;

introducing compressed air through a second intake port into the cylinder during a compression stroke of the piston;

controlling the time of operation of a compressor generating the compressed air and the timing of the first and the second intake valves; and, controlling one or more air charge characteristics selected from the group consisting of turbulence, density, pressure, temperature, mean pressure and peak pressure.

22. A method of operating an internal combustion engine, the method comprising the steps of:

directing air through a first intake port into a cylinder during an intake stroke of a piston cooperating with the cylinder;

increasing the air charge density and turbulence in the engine, including the step of directing compressed air through a second intake port into the cylinder during a compression stroke of the piston;

controlling the time of operation of a compressor generating the compressed air and the timing of intake valves cooperating with the first and the second intake ports; and, controlling one or more air charge characteristics selected from the group consisting of turbulence, density, pressure, temperature, mean pressure and peak pressure.

23. A method of operating an internal combustion engine having a crankshaft driven by at least one piston moving through a plurality of power cycles, each power cycle involving at least a compression stroke and an expansion stroke aided by combustion taking place within a cylinder, wherein the compression stroke results in compressing of air and fuel within the cylinder, said method comprising the steps of introducing during each power cycle air through a first port into a cylinder;

introducing during each power cycle a compressed air charge through a second port into the cylinder;

wherein a first intake valve cooperates with the first port and a second intake valve cooperates with the second port, the second intake valve occupying an open position only while the first intake valve occupies a closed position;

controlling the time of operation of a compressor generating the compressed air and the timing of the first and the second intake valves; and, controlling one or more air charge characteristics selected from the group consisting of turbulence, density, pressure, temperature, mean pressure and peak pressure.

24. A method of operating an internal combustion engine having a crankshaft driven by at least one piston moving through a plurality of power cycles, each power cycle involving at least a compression stroke and an expansion stroke aided by combustion taking place within a cylinder, wherein the compression stroke results in compressing of air and fuel within the cylinder, said method comprising the steps of introducing during each power cycle air through a first port into a cylinder;

introducing during each power cycle a compressed air charge through a second port into the cylinder;

wherein a first intake valve cooperates with the first port and a second intake valve cooperates with the second port, the second intake valve occupying an open position only during the compression stroke;

controlling the time of operation of a compressor generating the compressed air and the timing of the first and the second intake valves; and, controlling one or more air charge characteristics selected from the group consisting of turbulence, density, pressure, temperature, mean pressure and peak pressure.

25. The method of claim 19, 20, 21, 22, 23 or 24, comprising the step of producing a super-charged air density and increasing turbulence in allow compression engine.

26. The method of claim 19, 20, 21, 22, 23 or 24, wherein compressed air is introduced through a second port into the cylinder after compression has begun.

27. The method of claim 23 or 24, wherein the step of introducing during each power cycle a compressed air charge through a second port into the cylinder, includes the step of varying the compressed air charge introduced in one cycle of the plurality of power cycles from the compressed air charge introduced during another of the cycles of the plurality of power cycles.

28. A method of operating an internal combustion engine, the method comprising the step of:

lightly compressing a low pressure air charge outside a cylinder;

directing the low pressure air charge into a cylinder cooperating with a piston, during an intake stroke of the piston;

compressing a high pressure air charge outside of the cylinder;

ceasing the step of directing the low pressure air charge; and, directing the high pressure air charge into the cylinder, after the ceasing step and during a compression stroke of the piston.

29. The method of claim 28, wherein the low pressure air charge is at a first pressure and the high pressure air charge is at a second pressure, the second pressure being greater than the first pressure.

30. The method of claim 28, wherein the low pressure air charge is compressed by a first compressor and the high pressure air charge is compressed by a second compressor.

31. The method of claim 28, wherein the low pressure air charge is directed into the cylinder through a first intake port and the high pressure air charge is directed into the cylinder through a second intake port different from the first intake port.

32. The method of claim 30, wherein a first intake valve selectively occludes the first intake port and a second intake valve selectively occludes the second intake port, the second intake valve occupying an open position only while the first intake valve occupies a closed position.

33. The method of claim 32, further comprising the step of:

controlling the time of operation of a compressor generating the high pressure air charge and the timing of the first and the second intake valves; and, controlling one or more air charge characteristics selected from the group consisting of turbulence, density, pressure, temperature, mean pressure and peak pressure.

34. The method of claim 31, wherein a first intake valve cooperates with the first intake port and a second intake valve cooperates with the second intake port, the second intake valve occupying an open position only during the compression stroke.

35. The method of claim 34, further comprising the steps of:

controlling the time of operation of a compressor generating the high pressure air charge and the timing of the first and the second intake valuve; and, controlling one or more air charge characteristics selected from the group consisting of turbulence, density, pressure, temperature, mean pressure and peak pressure.

36. The method of claim 28, further comprising the step of:

cooling the low pressure air charge prior to entry thereof into the cylinder.

37. The method of claim 28, further comprising the step of:

cooling the high pressure air charge prior to entry thereof into the cylinder.

38. A method of operating an internal combustion engine, the method comprising the steps of:

directing a first air charge component into a cylinder of the engine;

increasing the air charge density and turbulence in the engine, including the step of directing a second air charge component into the cylinder;

controlling the timing of the step of directing a second air charge component;

controlling one or more air charge characteristics selected from the group consisting of turbulence, density, pressure, temperature, mean pressure and peak pressure;

compressing the second air charge component prior to introduction to the chamber; and compressing the first air charge component prior to introduction into the chamber.

39. The method of claim 38, wherein the second air charge component is more highly compressed than the first air charge component.

* * * * *

(12) INTER PARTES REEXAMINATION CERTIFICATE (0154th)
United States Patent
Bryant

(10) Number: US 7,281,527 C1
(45) Certificate Issued: Apr. 13, 2010

(54) INTERNAL COMBUSTION ENGINE AND WORKING CYCLE

(75) Inventor: Clyde C. Bryant, Alpharetta, GA (US)

(73) Assignee: Entec Engine Corporation, Atlanta, GA (US)

Reexamination Request:
No. 95/000,307, Oct. 14, 2007

Reexamination Certificate for:
Patent No.: 7,281,527
Issued: Oct. 16, 2007
Appl. No.: 09/632,739
Filed: Aug. 4, 2000

Related U.S. Application Data

(63) Continuation of application No. 08/863,103, filed on May 23, 1997, now Pat. No. 6,279,550, and a continuation-in-part of application No. 08/841,488, filed on Apr. 23, 1997, now abandoned.

(60) Provisional application No. 60/040,630, filed on Mar. 7, 1997, provisional application No. 60/029,260, filed on Oct. 25, 1996, provisional application No. 60/023,460, filed on Aug. 6, 1996, and provisional application No. 60/022,102, filed on Jul. 17, 1996.

(51) Int. Cl.
*F02B 33/00* (2006.01)

(52) U.S. Cl. .................. 123/564; 123/316; 123/432; 60/69

(58) Field of Classification Search .................. None
See application file for complete search history.

(56) References Cited

U.S. PATENT DOCUMENTS 1,792,028 A 2/1931 Peterson (Continued)

FOREIGN PATENT DOCUMENTS

CH 236463 6/1945

(Continued)

OTHER PUBLICATIONS

Office Action dated Feb. 26, 2009, for co–pending U.S. Appl. No. 11/930,683.

(Continued)

*Primary Examiner*—David O. Reip

(57) ABSTRACT

The invention is concerned with a method of deriving mechanical work from a combustion gas in internal combustion engines and reciprocating internal combustion engines for carrying out the method. The invention includes methods and apparatuses for managing combustion charge densities, temperatures, pressures and turbulence in order to produce a true mastery within the power cylinder in order to increase fuel economy, power, and torque while minimizing polluting emissions. In its preferred embodiments, the method includes the steps of (i) producing an air charge, (ii) controlling the temperature, density and pressure of the air charge, (iii) transferring the air charge to a power cylinder of the engine such that an air charge having a weight and density selected from a range of weight and density levels ranging from below atmospheric weight and density to heavier-than-atmospheric weight and density is introduced into the power cylinder, and (iv) then compressing the air charge at a lower-than-normal compression ratio, (v) causing a pre-determined quantity of charge-air and fuel to produce a combustible mixture, (vi) causing the mixture to be ignited within the power cylinder, and (vii) allowing the combustion gas to expand against a piston operable in the power cylinders with the expansion ratio of the power cylinders being substantially greater than the compression ratio of the power cylinders of the engine. In addition to other advantages, the invented method is capable of producing mean effective cylinder pressures ranging from lower-than-normal to higher-than-normal. In the preferred embodiments, the mean effective cylinder pressure is selectively variable (and selectively varied) throughout the mentioned range during the operation of the engine. In an alternate embodiment related to constant speed-constant load operation, the mean effective cylinder pressure is selected from the range and the engine is configured, in accordance with the present invention, such that the mean effective cylinder pressure range is limited, being varied only in the amount required for producing the power, torque and speed of the duty cycle for which the engine is designed.

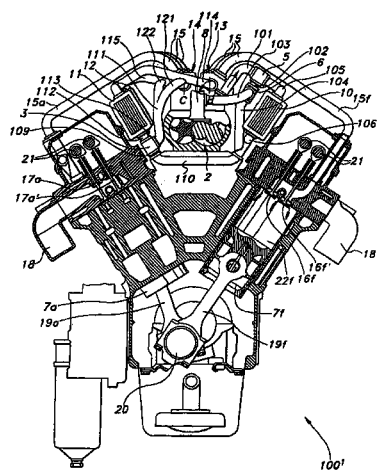

U.S. PATENT DOCUMENTS

| | | |
|---|---|---|
| 1,893,006 A | 1/1933 | Trechsel |
| 2,189,106 A | 2/1940 | Garve et al. |
| 2,292,233 A | 8/1942 | Lysholm |
| 2,818,931 A | 1/1958 | Mallory |
| 3,182,645 A | 5/1965 | Wilson |
| 3,686,972 A | 8/1972 | McWhorter |
| 3,735,740 A | 5/1973 | Hunt |
| 3,877,848 A | 4/1975 | Solem |
| 4,016,839 A | 4/1977 | Morton |
| 4,367,662 A | 1/1983 | Greene |
| 4,385,496 A | 5/1983 | Yamane |
| 4,416,115 A | 11/1983 | Iida |
| 4,498,429 A | 2/1985 | Satow et al. |
| 4,507,066 A | 3/1985 | Duffy |
| 4,577,597 A | 3/1986 | Tomita |
| 4,641,613 A | 2/1987 | Delesalle |
| 4,672,813 A | 6/1987 | David |
| 4,821,695 A | 4/1989 | Freudenstein |
| 4,852,353 A | 8/1989 | Holmér |
| 4,917,066 A | 4/1990 | Freudenstein et al. |
| 5,219,397 A | 6/1993 | Jones |
| 5,249,484 A | 10/1993 | Matsuoka et al. |

FOREIGN PATENT DOCUMENTS

| | | |
|---|---|---|
| JP | 02-211318 | 8/1990 |
| WO | WO 88/01696 | 3/1988 |

OTHER PUBLICATIONS

Office Action dated Feb. 26, 2009, for co–pending U.S. Appl. No. 11/936,100.
Office Action dated Apr. 6, 2009, for co–pending U.S. Appl. No. 11/936,101.
Ex Parte ReExamination Certificate which issued for co–pending U.S. Patent No. 6,279,550.
Office Action dated Feb. 5, 2009, for co–pending U.S. Appl. No. 11/236,765.
Office Action dated Apr. 3, 2009, for co–pending U.S. Appl. No. 11/936,102.
Inter Partes Office Action dated Mar. 20, 2009, for co–pending Inter Partes ReExamination No. 95/000,265.
Action Closing Prosecution (37 CFR 1.949) in Inter Partes ReExamination dated Jan. 5, 2009, for ReExamination of U.S. Patent No. 6,951,211—ReExamination U.S. Appl. No. 95/000,135.
Notice of Intent to Issue Ex Parte Reexamination Certificate dated Mar. 31, 2008, for ReExamination of U.S. Patent No. 6,279,550—ReExamination U.S. Appl. No. 90/007,971.
3$^{rd}$ Party (Caterpillar Corporation) Claim Charts to claims of U.S. Appl. No. 10/996,695.
Patent Owner's Response to Final Office Action for Ex Parte ReExamination filed Dec. 11, 2007, for ReExamination of U.S. Patent No. 6,279,550—ReExamination U.S. Appl. No. 90/007,971.
Office Action dated Jun. 3, 2003, for co–pending U.S. Appl. No. 10/385,588.
Preliminary Amendment filed Jun. 2, 2003, for co–pending U.S. Appl. No. 10/385,588.
First Amendment & Response to Office Action Dated Jun. 3, 2003 & Response to Request for Corrected Filing Receipt Dated Aug. 7, 2003 filed Nov. 24, 2003, for co–pending U.S. Appl. No. 10/385,588.
Office Action dated Feb. 3, 2004, for co–pending U.S. Appl. No. 10/385,588.
Second Amendment & Response to Office Action Dated Jun. 3, 2003 & To Office Action Dated & Response to Request for Corrected Filing Receipt Dated Aug. 7, 2003 filed Mar. 23, 2004, for co–pending U.S. Appl. No. 10/385,588.
Office Action dated Apr. 29, 2004, for co–pending U.S. Appl. No. 10/385,588.
Third Amendment & Response to Office Action Dated Jun. 3, 2003 & To Office Action Dated Feb. 3, 2004 & Response to Request for Corrected Filing Receipt Dated Aug. 7, 2003 filed May 4, 2004, for co–pending U.S. Appl. No. 10/385,588.
Office Action dated Jun. 18, 2004, for co–pending U.S. Appl. No. 10/385,588.
Amendment & Response to Restriction Requirement dated Jun. 18, 2004 filed Aug. 4, 2004, for co–pending U.S. Appl. No. 10/385,588.
Second Preliminary Amendment filed Sep. 17, 2004, for co–pending U.S. Appl. No. 10/385,588.
Office Action dated Oct. 8, 2004, for co–pending U.S. Appl. No. 10/385,588.
Response to Previous Final Office Action Submitted With RCE filed Apr. 1, 2005, for co–pending U.S. Appl. No. 10/385,588.
Office Action dated Jul. 9, 1999, for co–pending U.S. Appl. No. 08/863,103.
Amendment & Response to Jul. 9, 1999 Office Action filed Aug. 9, 1999, for co–pending U.S. Appl. No. 08/863,103.
Supplement Amendment filed filed Aug. 17, 1999, for co–pending U.S. Appl. No. 08/863,103.
Office Action dated Sep. 8, 1999, for co–pending U.S. Appl. No. 08/863,103.
Response to Restriction Requirement and Third Preliminary Amendment filed Jan. 6, 2000, for co–pending U.S. Appl. No. 08/863,103.
Office Action dated Feb. 10, 2000, for co–pending U.S. Appl. No. 08/863,103.
First Amendment & Response to Feb. 10, 2000 Office Action filed Aug. 9, 2000, for co–pending U.S. Appl. No. 08/863,103.
Office Action dated Oct. 12, 2000, for co–pending U.S. Appl. No. 08/863,103.
Interview Summary dated Mar. 7, 2001, for co–pending U.S. Appl. No. 08/863,103.
Second Amendment & Response to Oct. 12, 2000 Office Action filed Mar. 12, 2001, for co–pending U.S. Appl. No. 08/863,103.
Heywood, J., Internal Combustion Engine Fundamentals, International Edition, McGraw–Hill Book Co. (1988), 5 pages (including pp. 9–11).
Lilly, L, Diesel Engine Reference Book, Butterworth and Co., (1984), pp. 2/29–2/34, 3/7, 22/7–22/8.
English language translation of CH 236,463.
Office Action in *Ex Parte* Reexamination dated Oct. 29, 2007 of U.S. patent No. 6,279,550—ReExam Control U.S. Appl. No. 90/007,971.
Patent Owner's Response to Office Action in *Inter Partes* Reexamination dated Nov. 6, 2007 of U.S. patent No. 7,222,614—ReExam Control U.S. Appl. No. 95/000,265.
Petition for Entry of Late Papers for Revival of Reexamination Proceeding Under 37 CFR §1.137(b) in *Inter Partes* Reexamination dated Nov. 6, 2007 of U.S. patent No. 7,222,614—ReExam Control U.S. Appl. No. 95/000,265.
Submission in *Inter Partes* Reexamination dated Nov. 6, 2007 of U.S. patent No. 7,222,614—ReExam Control U.S. Appl. No. 95/000,265.

under 35 U.S.C. 316

INTER PARTES
REEXAMINATION CERTIFICATE
ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 21 and 39 are cancelled.

Claims 1, 10, 19, 20, 22–26, 28, 32 and 38 are determined to be patentable as amended.

Claims 2–9, 11–18, 27, 29–31 and 33–37 dependent on an amended claim, are determined to be patentable.

New claims 40–51 are added and determined to be patentable.

1. A method of operating an internal combustion engine, the method comprising the steps of:
  lightly compressing a low pressure air charge outside a cylinder;
  directing the low pressure air charge through a first intake port into a cylinder cooperating with a piston, during an intake stroke of the piston;
  compressing a high pressure air charge outside of the cylinder; [and,]
  directing the high pressure air charge through a second intake port into the cylinder, during a compression stroke of the piston; *and*
  *controlling air charge volumes to provide a compression ratio lower than the expansion ratio of the engine.*

10. A method for operating an internal combustion engine, the method comprising the steps of:
  directing a primary air charge through a first inlet port into a cylinder;
  compressing a secondary air charge outside of the cylinder;
  introducing the secondary air charge through a second inlet port of the cylinder, after compression has begun within the cylinder; [and]
  lightly compressing the primary air charge prior to directing thereof into the cylinder, *and*
  *controlling air charge volumes to provide a compression ratio lower than an expansion ratio of the engine.*

19. A method for operating an internal combustion engine, the method comprising the steps of:
  directing air through a first intake port to a cylinder during an intake stroke of a piston cooperating with the cylinder;
  directing compressed air *that is at a higher pressure than the air directed through the first intake port* through a second intake port to the cylinder only during a compression stroke of the piston;
  controlling the time of operation of a compressor generating the compressed air and the timing of intake valves cooperating with the first and the second intake ports *to provide a compression ratio lower than the expansion ratio of the engine*; and,
  controlling one or more air charge characteristics selected from the group consisting of turbulence, density, pressure, temperature, mean pressure and peak pressure.

20. A method of operating an internal combustion engine, the method comprising the steps of:
  introducing air through a first intake port into a cylinder during an intake stroke of a piston cooperating with the cylinder;
  introducing compressed air *that is at a higher pressure than the air introduced through the first intake port* through a second intake port into the cylinder during a compression stroke of the piston;
  controlling the time of operation of a compressor generating the compressed air and the timing of the first and the second intake valves *to provide a compression ratio lower than the expansion ratio of the engine*; and,
  controlling one or more air charge characteristics selected from the group consisting of turbulence, density, pressure, temperature, mean pressure and peak pressure.

22. A method of operating an internal combustion engine, the method comprising the steps of:
  directing air through a first intake port into a cylinder during an intake stroke of a piston cooperating with the cylinder;
  increasing the air charge density and turbulence in the engine, including the step of directing compressed air *that is at a higher pressure than the air directed through the first intake port* through a second intake port into the cylinder during a compression stroke of the piston;
  controlling the time of operation of a compressor generating the compressed air and the timing of intake valves cooperating with the first and the second intake ports *to provide a compression ratio lower than an expansion ratio of the engine*; and,
  controlling one or more air charge characteristics selected from the group consisting of turbulence, density, pressure, temperature, mean pressure and peak pressure.

23. A method of operating an internal combustion engine having a crankshaft driven by at least one piston moving through a plurality of power cycles, each power cycle involving at least a compression stroke and an expansion stroke aided by combustion taking place within a cylinder, wherein the compression stroke results in compressing of air and fuel within the cylinder, said method comprising the steps of
  introducing during each power cycle air through a first port into a cylinder;
  introducing during each power cycle a compressed air charge through a second port into the cylinder, *the compressed air charge is at a higher pressure than the air introduced through the first port*;
  wherein a first intake valve cooperates with the first port and a second intake valve cooperates with the second port, the second intake valve occupying an open position only while the first intake valve occupies a closed position;
  controlling the time of operation of a compressor generating the compressed air and the timing of the first and the second intake valves *to provide a compression ratio lower than an expansion ratio of the engine*; and, controlling one or more air charge characteristics selected from the group consisting of turbulence, density, pressure, temperature, mean pressure and peak pressure.

24. A method of operating an internal combustion engine having a crankshaft driven by at least one piston moving through a plurality of power cycles, each power cycle involving at least a compression stroke and an expansion stroke aided by combustion taking place within a cylinder, wherein the compression stroke results in compressing of air and fuel within the cylinder, said method comprising the steps of introducing during each power cycle air through a first port into a cylinder;

introducing during each power cycle a compressed air charge through a second port into the cylinder, *the compressed air charge is at a higher pressure than the air introduced through the first port*;

wherein a first intake valve cooperates with the first port and a second intake valve cooperates with the second port, the second intake valve occupying an open position only during the compression stroke;

controlling the time of operation of a compressor generating the compressed air and the timing of the first and the second intake valves *to provide a compression ratio lower than an expansion ratio of the engine*; and, controlling one or more air charge characteristics selected from the group consisting of turbulence, density, pressure, temperature, mean pressure and peak pressure.

25. The method of claim 19, 20 [21,] 22, 23, 24, comprising the step of producing a super-charged air density and increasing turbulence in a low compression engine.

26. The method of claim 19, 20, [21,] 22, 23, or 24, wherein compressed air is introduced through a second port into the cylinder after compression has begun.

28. A method of operating an internal combustion engine, the method comprising the step of:

lightly compressing a low pressure air charge outside a cylinder; directing the low pressure air charge *through a first intake port* into a cylinder cooperating with a piston, during an intake stroke of the piston;

compressing a high pressure air charge outside of the cylinder;

ceasing the step of directing the low pressure air charge; [and,]

directing the high pressure air charge *through a second intake port* into the cylinder, after the ceasing step and during a compression stroke of the piston; *and*

*controlling air charge volumes to provide a compression ratio lower than the expansion ratio of the engine.*

32. The method of claim [30] *31*, wherein a first intake valve selectively occludes the first intake port and a second intake valve selectively occludes the second intake port, the second intake valve occupying an open position only while the first intake valve occupies a closed position.

38. A method of operating an internal combustion engine, the method comprising the steps of:

directing a first air charge component *through a first intake port* into a cylinder of the engine;

increasing the air charge density and turbulence in the engine, including the step of directing a second air charge component *through a second intake port* into the cylinder *during a compression stroke of the piston*;

controlling the timing of the step of directing a second air charge component;

controlling one or more air charge characteristics selected from the group consisting of turbulence, density, pressure, temperature, mean pressure and peak pressure;

compressing the second air charge component prior to introduction to the [chamber] *cylinder;* [and]

compressing the first air charge component prior to introduction into the [chamber] *cylinder, wherein the second air charge component is more highly compressed than the first air charged component, and*

*controlling air charge volumes to provide a compression ratio lower than an expansion ratio of the engine.*

*40. A method of operating an internal combustion engine having a cylinder and a piston that is moveable in the cylinder through an intake stroke, a compression stroke, an expansion stroke, and an exhaust stroke, the method comprising:*

*opening a first intake valve to direct a first air charge at a first pressure into the cylinder during at least a portion of the intake stroke;*

*compressing a second air charge to a second pressure, the second pressure is greater than the first pressure;*

*closing the first intake valve at a point other than the bottom dead center position of the intake stroke; and*

*opening the second intake valve to direct the second air charge into the cylinder during the compression stroke at a point after the piston passes the point in the cylinder wherein the first intake valve closes.*

*41. The method of claim 40 further comprising controlling the opening and closing of the first and second intkae valves, wherein one of the intake valves occupies an open position only while the other of the intake valves occupies a closed position.*

*42. The method of claim 40 wherein the closing the first intake valve occurs at a point after bottom dead center of the intake stroke that is at least about 10% of the compression stroke and the opening the second intake valve occurs after the first intake valve closes.*

*43. The method of claim 42 wherein the closing the first intake valve occurs at a point after bottom dead center of the intake stroke that is at least about 50% of the compression stroke and the opening the second intake valve occurs after the first intake valve closes.*

*44. The method of claim 42 wherein the opening the second intake valve occurs late in the compression stroke.*

*45. The method of claim 42 wherein the opening the second intake valve occurs near top dead center of the compression stroke.*

*46. The method of claims 40, wherein said first charge of air is a first compressed air charge, and said second charge of air is a second compressed air charge.*

*47. The method of claim 40, wherein the closing the first intake valve occurs prior to bottom dead center of the intake stroke and the opening the second intake valve occurs at or after the piston has reached a position during the compression stroke corresponding to the first valve closing position.*

*48. The method of claim 40, wherein the engine is characterized by a compression ratio less than 90% of the expansion ratio.*

*49. The method of claim 48 wherein the engine is characterized by a compression ratio less than 50% of the expansion ratio.*

*50. The method of claim 49 wherein the opening the second intake valve occurs late in the compression stroke.*

*51. The method of claim 49 wherein the opening the second intake valve occurs near top dead center of the compression stroke.*

\* \* \* \* \*